US012566498B2

(12) United States Patent
Hung et al.

(10) Patent No.: US 12,566,498 B2
(45) Date of Patent: Mar. 3, 2026

(54) DEVICES, METHODS, AND GRAPHICAL USER INTERFACES FOR DISPLAYING PRESENTATION ENVIRONMENTS FOR A PRESENTATION APPLICATION

(71) Applicant: Apple Inc., Cupertino, CA (US)

(72) Inventors: Amy W. Hung, San Francisco, CA (US); Peter G. Berger, Pittsburgh, PA (US); Zachariah N. Paine, Pittsburgh, PA (US); Daniel H. Mai, Los Angeles, CA (US); Nathan Gitter, Cupertino, CA (US); Ryan M. Olshavsky, San Jose, CA (US); James M. Dessero, Morgan Hill, CA (US); Alan C. Dye, San Francisco, CA (US); Jonathan P. Ive, San Francisco, CA (US); Stephen O. Lemay, Palo Alto, CA (US); William A. Sorrentino, III, Kentfield, CA (US); Peter D. Anton, Portola Valley, CA (US); David M. Findlay, Freeport, PA (US); Andrew L. Harding, Portola Valley, CA (US); Scott W. Wilson, San Jose, CA (US); Daniel S. Shervheim, San Jose, CA (US); Raymond T. Stewart, Stone Mountain, GA (US); Alexander J. Haworth, San Rafael, CA (US); Ryan Bullock, Marysville, WA (US); Ji won Park, Santa Clara, CA (US); Ying-Chih Chen, Seattle, WA (US); Eric Hartz, Half Moon Bay, CA (US); Daniel J. Rubenfield, Mercer Island, WA (US); Peter Dollar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/731,148

(22) Filed: May 31, 2024

(65) Prior Publication Data

US 2025/0110551 A1     Apr. 3, 2025

Related U.S. Application Data

(60) Provisional application No. 63/506,126, filed on Jun. 4, 2023.

(51) Int. Cl.
*G06F 3/01* (2006.01)
*G06T 19/00* (2011.01)
(52) U.S. Cl.
CPC ............ *G06F 3/013* (2013.01); *G06T 19/006* (2013.01)
(58) Field of Classification Search
CPC ............ G06F 3/011; G06F 3/041–057; G06F 2203/041–04114; G06F 3/04815;
(Continued)

(56) References Cited

U.S. PATENT DOCUMENTS 6,323,846 B1    11/2001    Westerman et al.
6,570,557 B1     5/2003    Westerman et al.
(Continued)

FOREIGN PATENT DOCUMENTS

WO        2013169849 A2    11/2013
WO        2014105276 A1     7/2014
WO        2022/066535 A2     3/2022

OTHER PUBLICATIONS

International Search Report received for PCT Patent Application No. PCT/US2024/032144, mailed on Nov. 7, 2024, 6 pages.
(Continued)

*Primary Examiner* — Sanjiv D. Patel
(74) *Attorney, Agent, or Firm* — Kubota & Basol LLP

(57) ABSTRACT
Some embodiments described in this disclosure are directed to one or more computer systems that display virtual environments associated with a presentation application. In some embodiments, the computer system displays a virtual environment selected by a user of the computer system that simulates a real-world setting in which a presentation would be delivered in.

19 Claims, 38 Drawing Sheets

(58) Field of Classification Search
CPC .......... G06F 3/00; G06F 3/14; G06F 3/04845;
G06F 3/017; G06F 3/147; G06F 3/0304;
G02B 27/017; G02B 2027/0138; G02B
2027/0141; G02B 27/0093; G06T 19/006;
G06V 20/20
See application file for complete search history.

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,452,354 | B2 | 9/2016 | Rimon |
| 9,473,758 | B1 | 10/2016 | Long et al. |
| 9,573,062 | B1 | 2/2017 | Long et al. |
| 9,616,338 | B1 | 4/2017 | Hooper et al. |
| 9,749,367 | B1 | 8/2017 | Kirby et al. |
| 9,865,089 | B2 | 1/2018 | Burns et al. |
| 9,886,682 | B2 | 2/2018 | Marin |
| 9,933,937 | B2 | 4/2018 | Lemay et al. |
| 10,463,962 | B2 | 11/2019 | Marks et al. |
| 10,474,336 | B2 | 11/2019 | Smith |
| 10,924,709 | B1 | 2/2021 | Faulkner et al. |
| 11,163,588 | B2 | 11/2021 | Rubenfield et al. |
| 11,169,824 | B2 | 11/2021 | Rubenfield et al. |
| 11,222,298 | B2 | 1/2022 | Abelow |
| 11,394,925 | B1 | 7/2022 | Faulkner et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2015/0178044 | A1* | 6/2015 | Ehlen ................... G06F 3/0483 |
| | | | 715/728 |
| 2016/0011729 | A1 | 1/2016 | Flores et al. |
| 2017/0199639 | A1 | 7/2017 | O'hara et al. |
| 2018/0356878 | A1 | 12/2018 | Dudekula et al. |
| 2019/0065027 | A1* | 2/2019 | Hauenstein .......... G06F 3/0484 |
| 2019/0139318 | A1 | 5/2019 | Tierney et al. |
| 2020/0225844 | A1 | 7/2020 | Lerner et al. |
| 2020/0336518 | A1 | 10/2020 | Huynh et al. |
| 2020/0351384 | A1 | 11/2020 | Ruistola et al. |
| 2020/0356136 | A1 | 11/2020 | Aimone et al. |
| 2021/0076002 | A1 | 3/2021 | Peters et al. |
| 2021/0311608 | A1 | 10/2021 | Sommer et al. |
| 2021/0346811 | A1 | 11/2021 | Khan et al. |
| 2022/0094724 | A1 | 3/2022 | Stahl et al. |
| 2022/0103566 | A1 | 3/2022 | Faulkner |
| 2022/0150083 | A1 | 5/2022 | Faulkner |
| 2022/0197403 | A1 | 6/2022 | Hughes et al. |
| 2022/0253146 | A1* | 8/2022 | Erivantcev .............. G06F 3/016 |
| 2022/0374136 | A1 | 11/2022 | Chang et al. |
| 2023/0092103 | A1* | 3/2023 | Puyol ..................... G06F 3/011 |
| | | | 715/205 |
| 2023/0208663 | A1 | 6/2023 | Jovanovic et al. |
| 2023/0262406 | A1 | 8/2023 | Messingher Lang et al. |
| 2023/0379649 | A1 | 11/2023 | Gonzalez Delgado et al. |
| 2023/0403386 | A1 | 12/2023 | Da Veiga et al. |
| 2024/0054736 | A1 | 2/2024 | Burns et al. |
| 2024/0054746 | A1 | 2/2024 | Burns et al. |
| 2024/0056492 | A1 | 2/2024 | Burns et al. |
| 2025/0110607 | A1 | 4/2025 | Cazamias et al. |

OTHER PUBLICATIONS

Bigscreen VR Launches On-Demand Content in Response To Increased Traffic, Available Online at: <https://vrscout.com/news/bigscreen-increased-traffic-on-demand/>, [Retrieved on Oct. 3, 2024], Apr. 25, 2020, 9 pages.

Here's What It's Like to Attend a Press Conference in Virtual Reality, Available Online at: <https://www.theverge.com/2015/9/15/9326357/altspacevr-product-gearvr-support-virtual-reality>, [Retrieved on Oct. 3, 2024], Sep. 15, 2015, 8 pages.

Introducing Horizon Workrooms: Remote Collaboration Reimagined, Available Online at: <https://about.fb.com/news/2021/08/introducing-horizon-workrooms-remote-collaboration-reimagined/>, [Retrieved on Oct. 3, 2024], Aug. 19, 2021, 11 pages.

Introducing 'ShapesXR,' a New Tool for Real-Time Collaboration and Prototyping in VR, Available Online at: <https://about.fb.com/news/2021/11/horizon-worlds-open-in-us-and-canada>, [Retrieved on Oct. 3, 2024], Nov. 11, 2021, 5 pages.

Mesh for Microsoft Teams Aims to Make Collaboration in the 'metaverse' Personal and Fun, Available Online at: <https://news.microsoft.com/source/features/innovation/mesh-for-microsoft-teams/>, [Retrieved on Oct. 3, 2024], Nov. 2, 2021, 13 pages.

Opening Horizon Worlds to Everyone 18+ in the US and Canada, Available Online at <https://about.fb.com/news/2021/12/horizon-worlds-open-in-us-and-canada>, Dec. 9, 2021, 7 pages.

Social Gaming Platform Rec Room Announces New Funding at $1.25 Billion Valuation, Available Online at: <https://www.prnewswire.com/news-releases/social-gaming-platform-rec-room-announces-new-funding-at-1-25-billionvaluation-301254699.html>, [Retrieved on Oct. 3, 2024], Mar. 24, 2021, 3 pages.

Spatial to Focus on Becoming a Metaverse Platform for Cultural Events and Announces $25M in New Funding, Available Online at: <https://www.auganix.org/spatial-to-focus-on-becoming-a-metaverse-platform-for-cultural-events-andannounces-25m-in-new-funding/>, [retrieved on Oct. 3, 2024], Dec. 14, 2021, 4 pages.

The Same Video Game in 2D, 3D or Virtual Reality—How Does Technology Impact Game Evaluation on Brand Placements?, Available Online at: <Web page <https://journals.plos.org/plosone/article?id=10.1371/journal.pone.0200724> [Retrieved on Oct. 3, 2024], Jul. 20, 2018, 17 pages.

Virbela, Available Online at: <<https://virtualeventsgroup.org/project/virbela/>, [Retrieved on Oct. 3, 2024], Jan. 12, 2021, 7 pages.

Wang, et al., "VR-Replay: Capturing and Replaying Avatars in VR for Asynchronous 3D Collaborative Design", 2019 IEEE Conference on Virtual Reality and 3D User Interfaces, Mar. 23-27, 2019, pp. 2215-2216.

* cited by examiner

Figure 1A

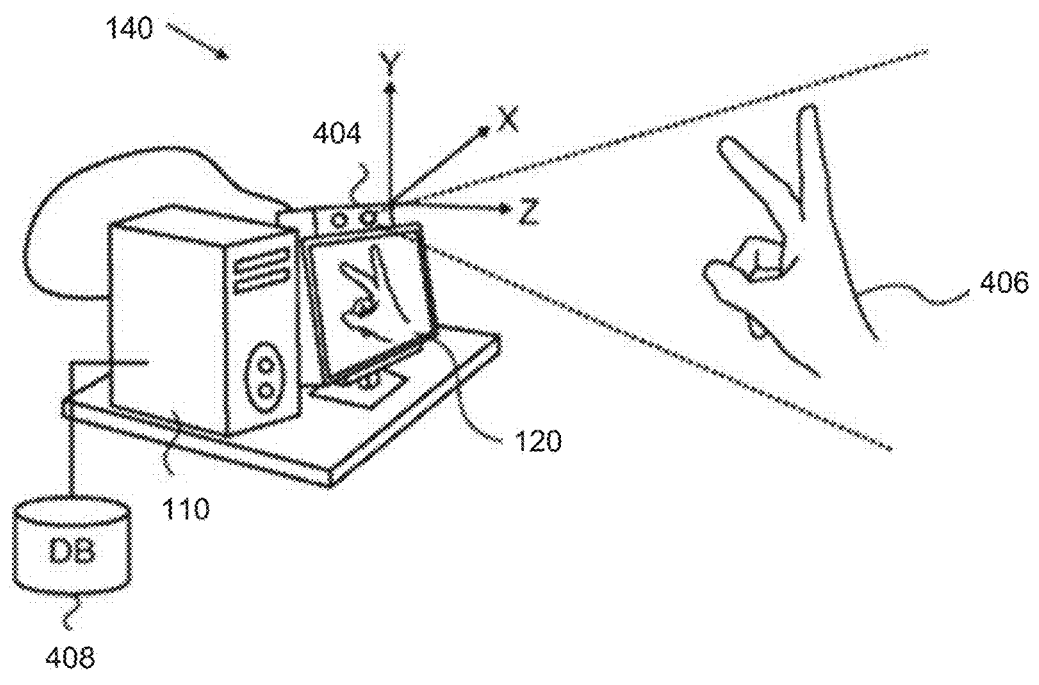
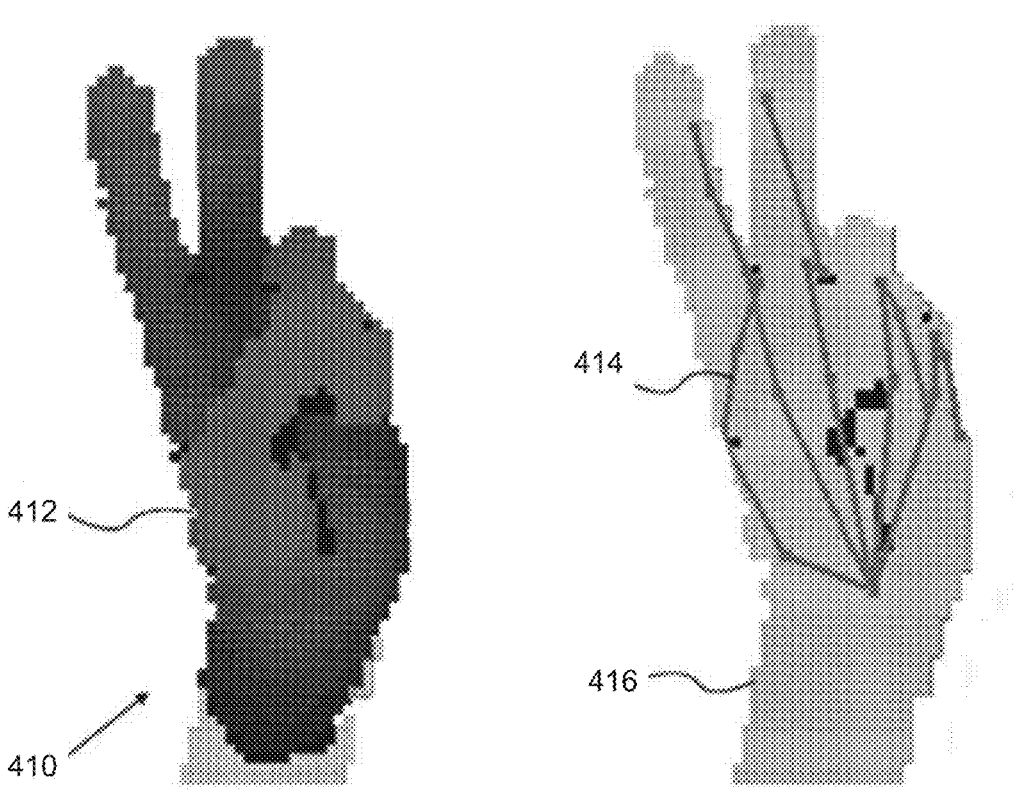
Figure 4

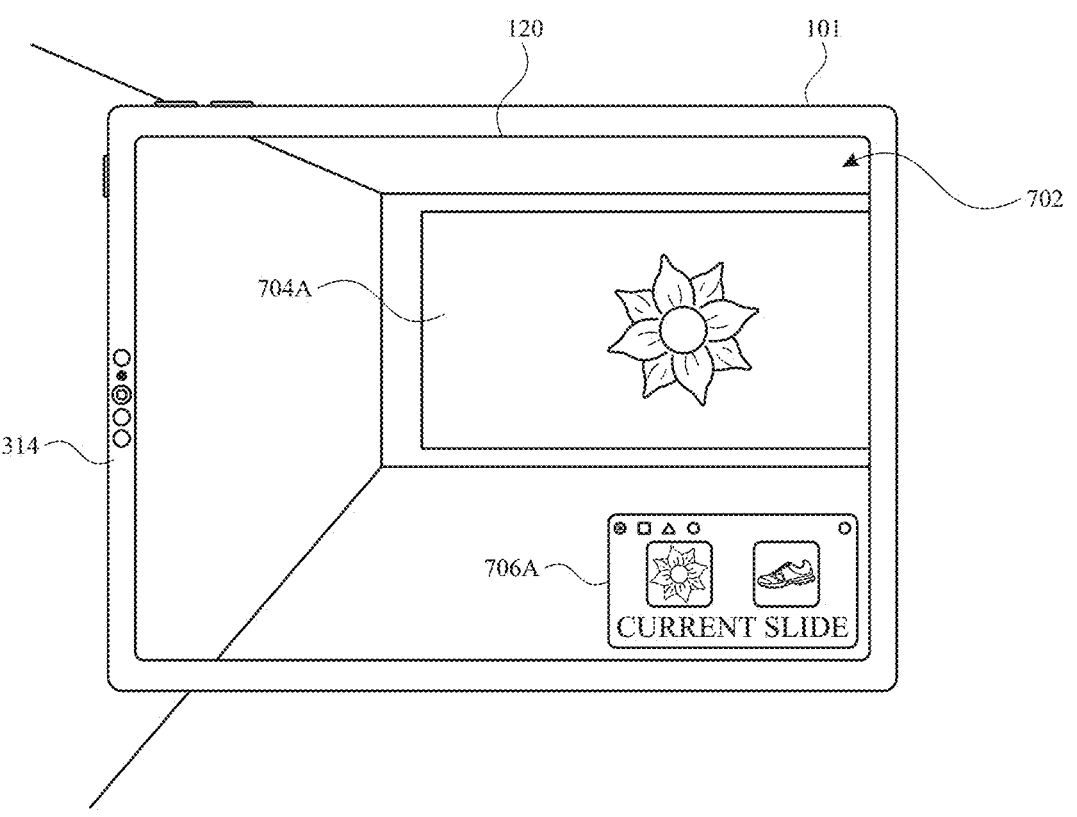
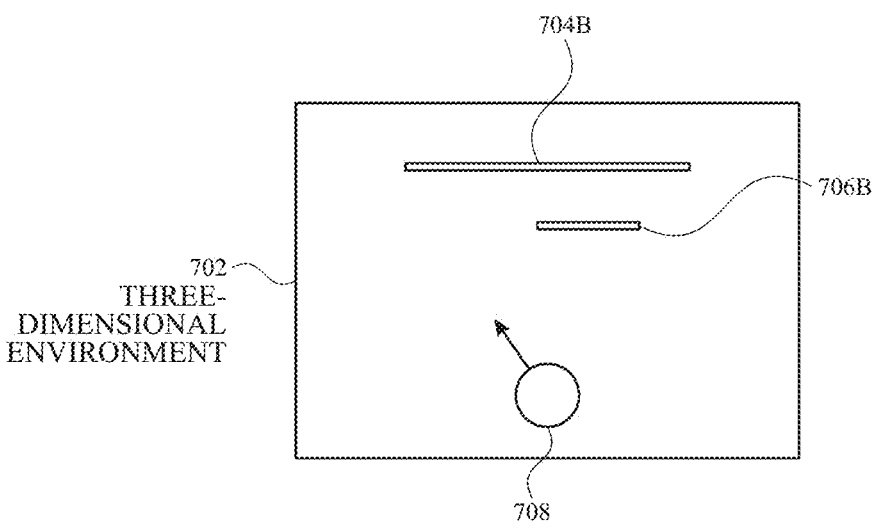
*FIG. 7C*

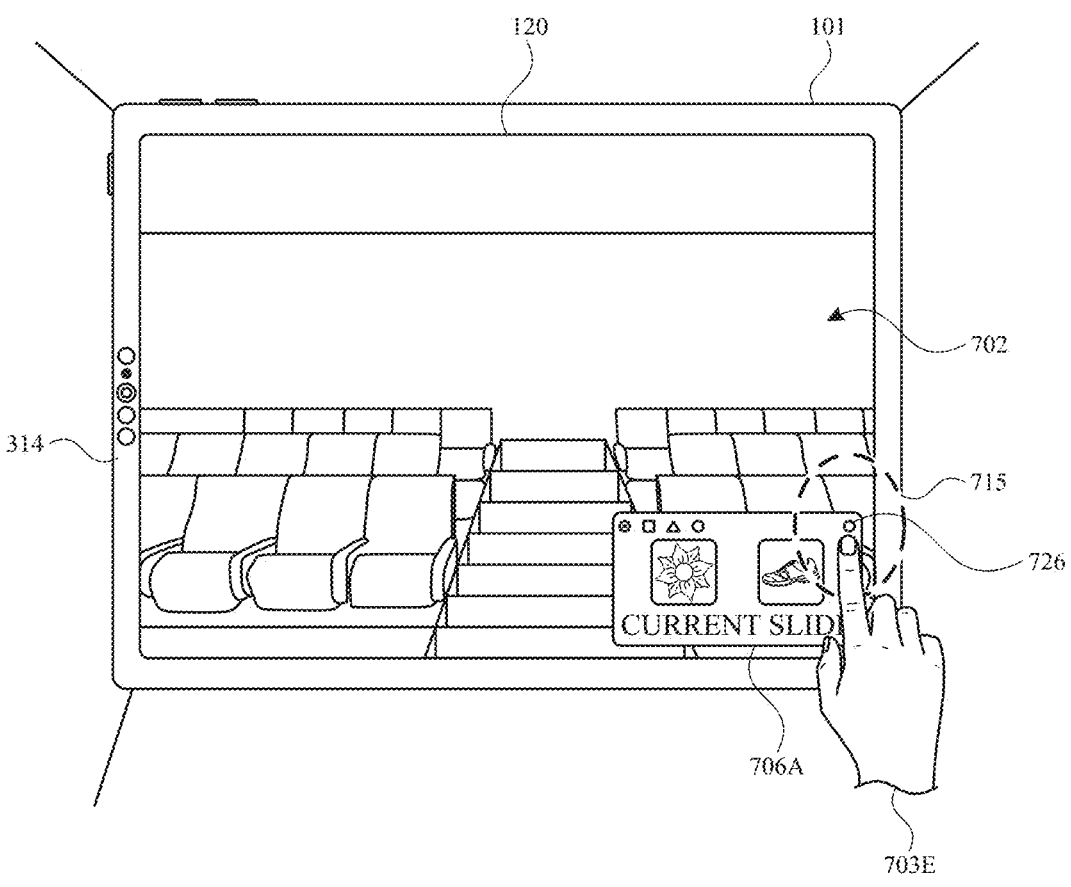
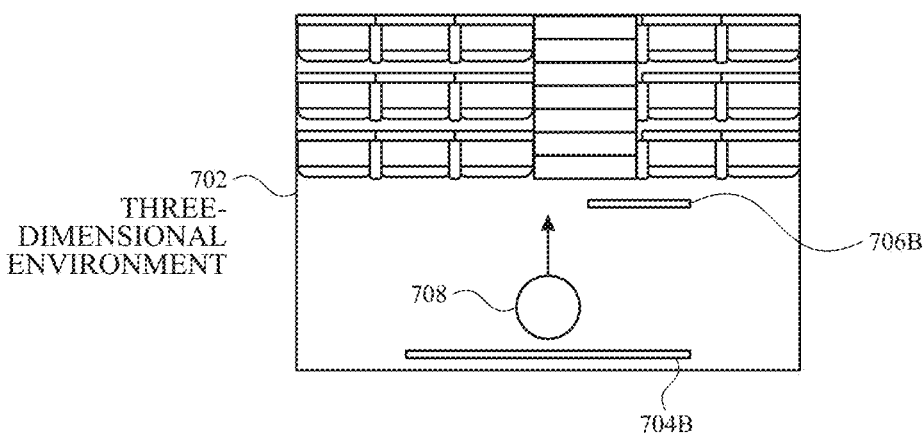
FIG. 7E

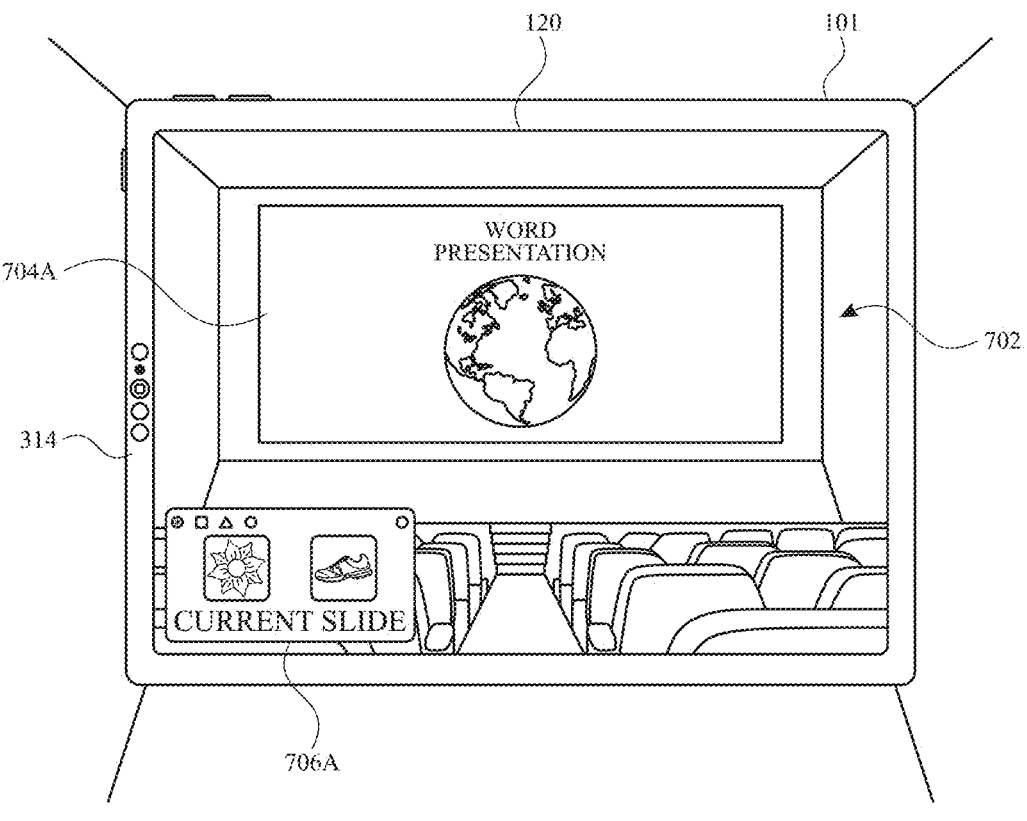
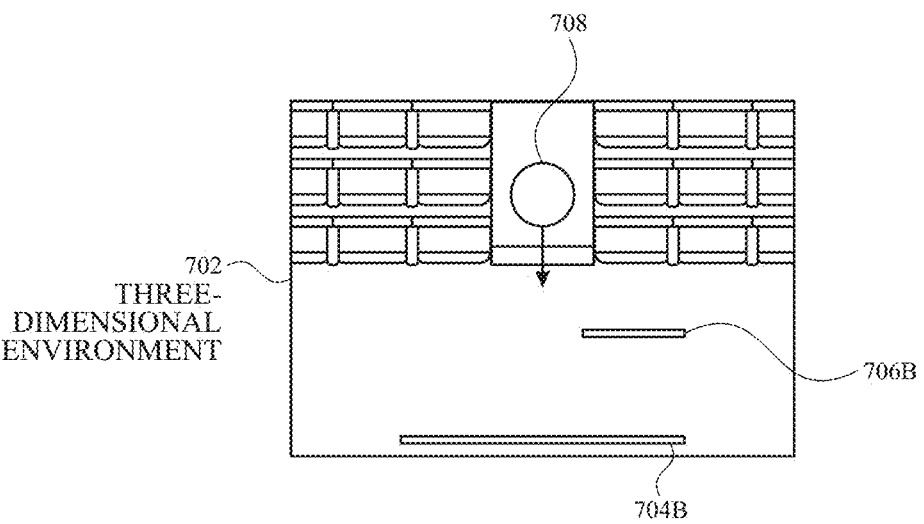
*FIG. 7G*

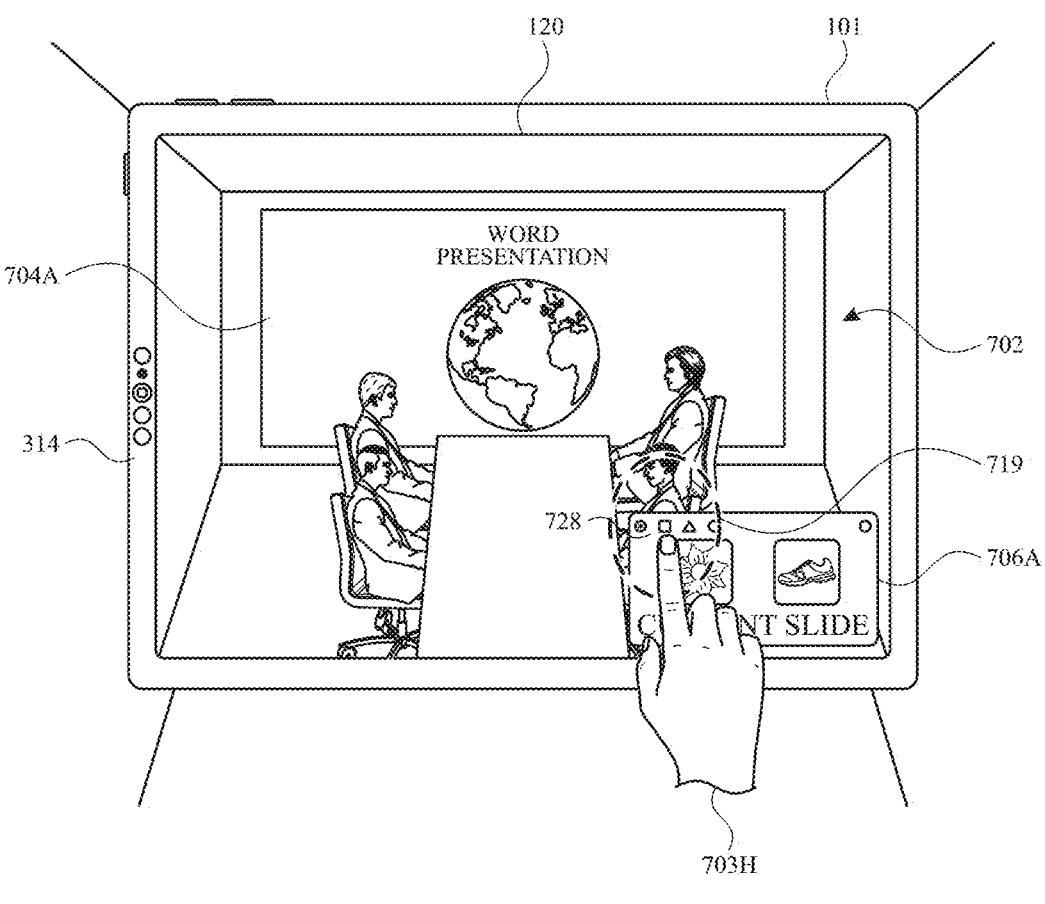
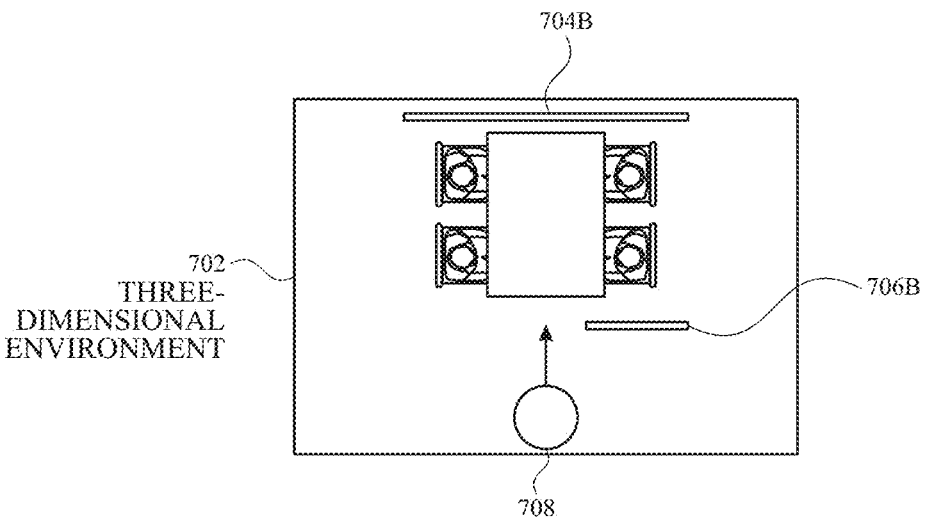
*FIG. 7H*

<u>800</u>

802a

While displaying, via a display generation component, a virtual presentation associated with a presentation application in a first three-dimensional environment, wherein the first three-dimensional environment includes a portion of a physical environment of a user of the computer system and the virtual presentation is presented in a first mode of the presentation application, receive, via one or more input devices, a first input corresponding to a request to display the virtual presentation in a second mode of the presentation application, different from the first mode of the presentation application In response to receiving the first input:

802b

Initiate a process to display the virtual presentation in a respective virtual environment, different from the first three-dimensional environment, wherein while displaying the virtual presentation in the respective virtual environment, the portion of the physical environment of the user is not visible via the display generation component 802c

FIG. 8

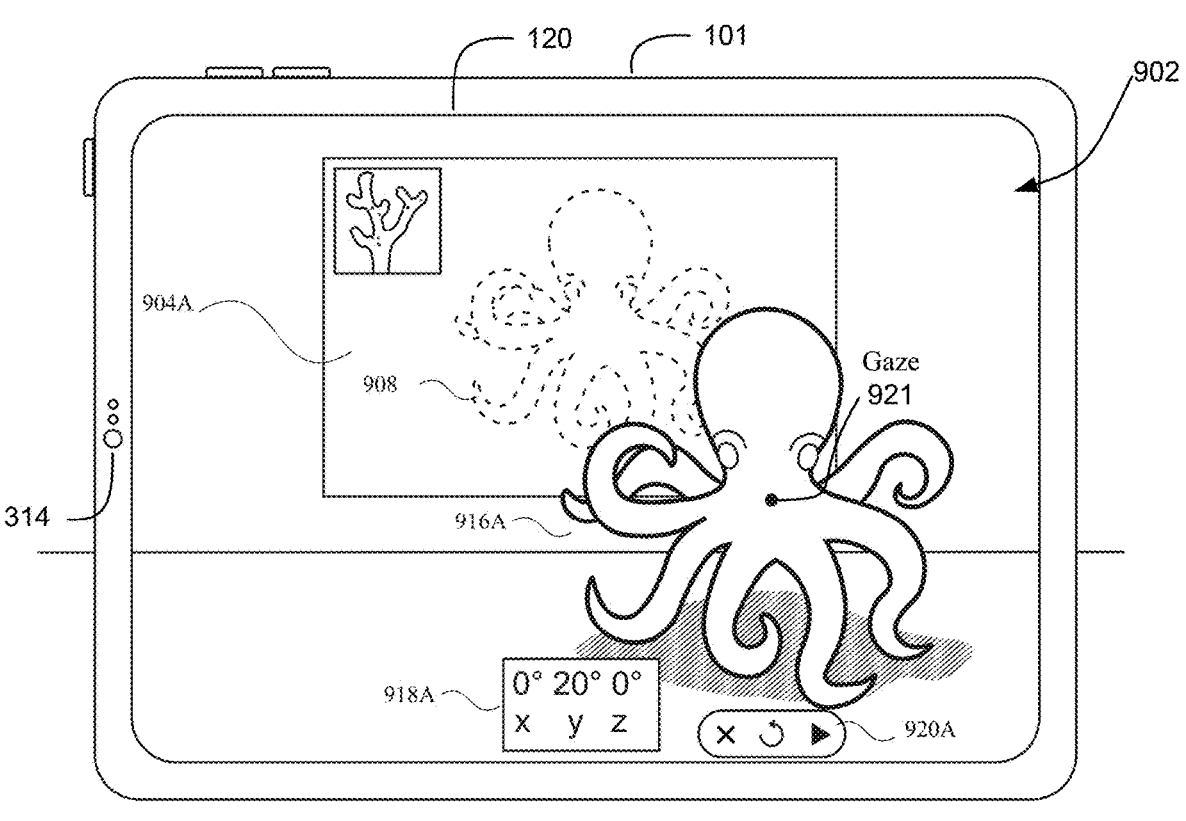
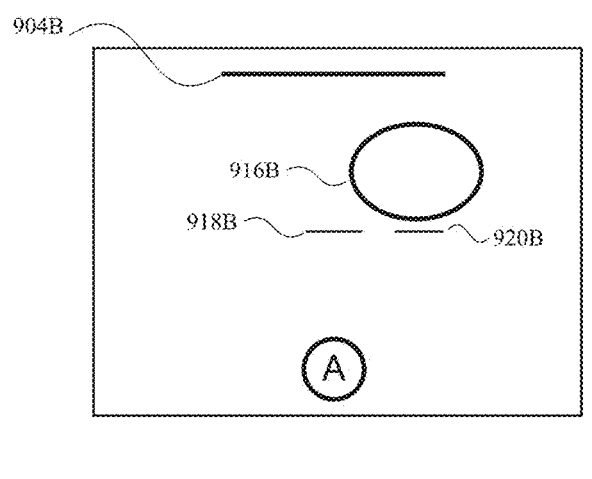
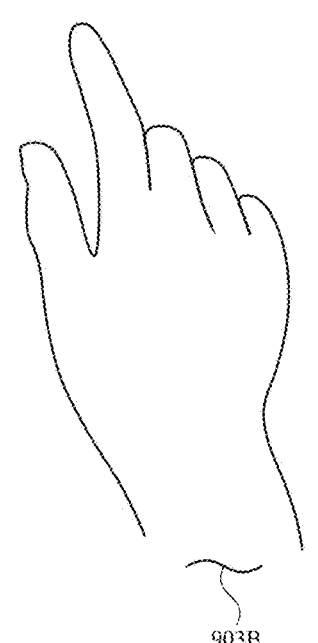
FIG. 9C

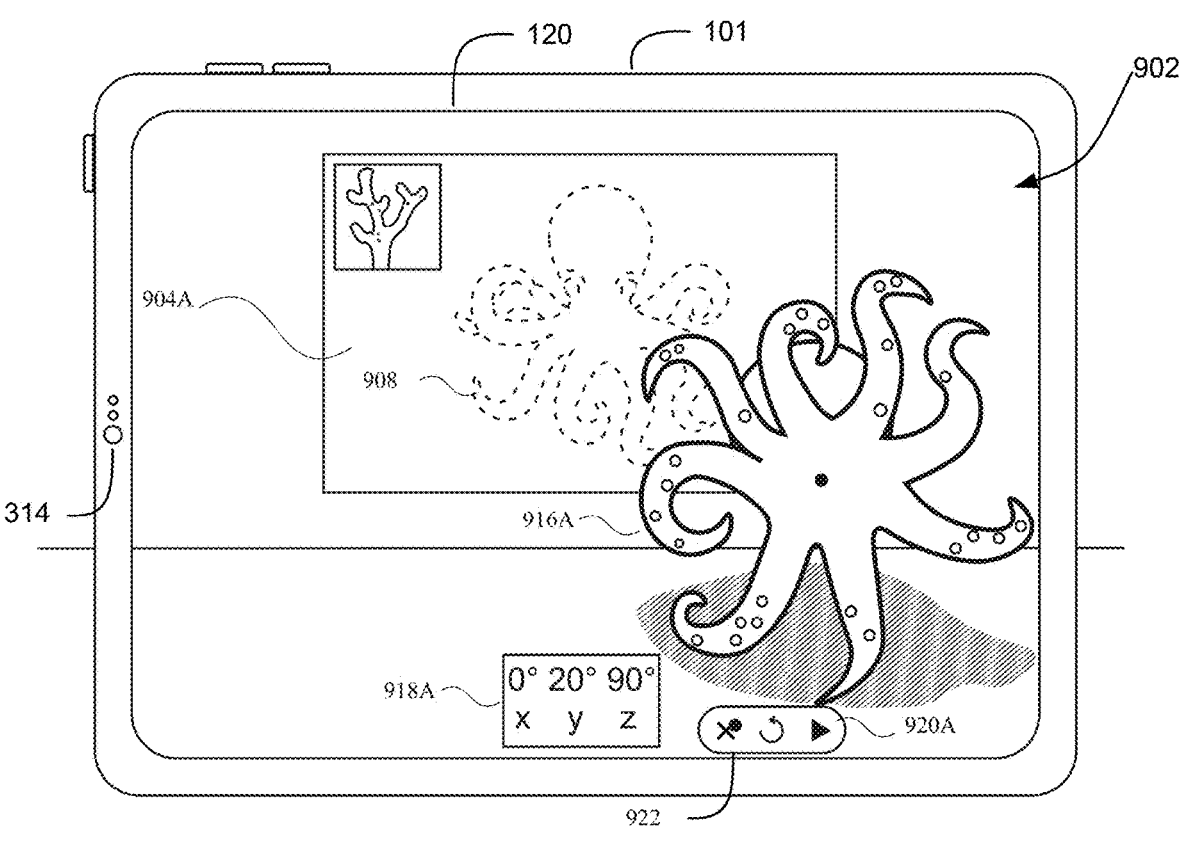
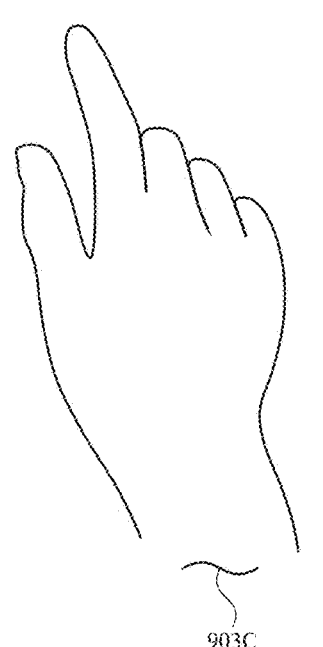
FIG. 9D

<u>1000</u>

While displaying, via a display generation component, a virtual presentation, associated with a presentation application, at a first location in a three-dimensional environment, wherein the virtual presentation includes a two-dimensional representation of a first three-dimensional virtual object, receive, via one or more input devices, a first input directed to the two-dimensional representation of the first three-dimensional virtual object 1002a In response to receiving the first input, display a three-dimensional representation of the three-dimensional virtual object at a second location in the three-dimensional environment, different from the first location in the three-dimensional environment, wherein the second location is outside of the virtual presentation 1002b

FIG. 10

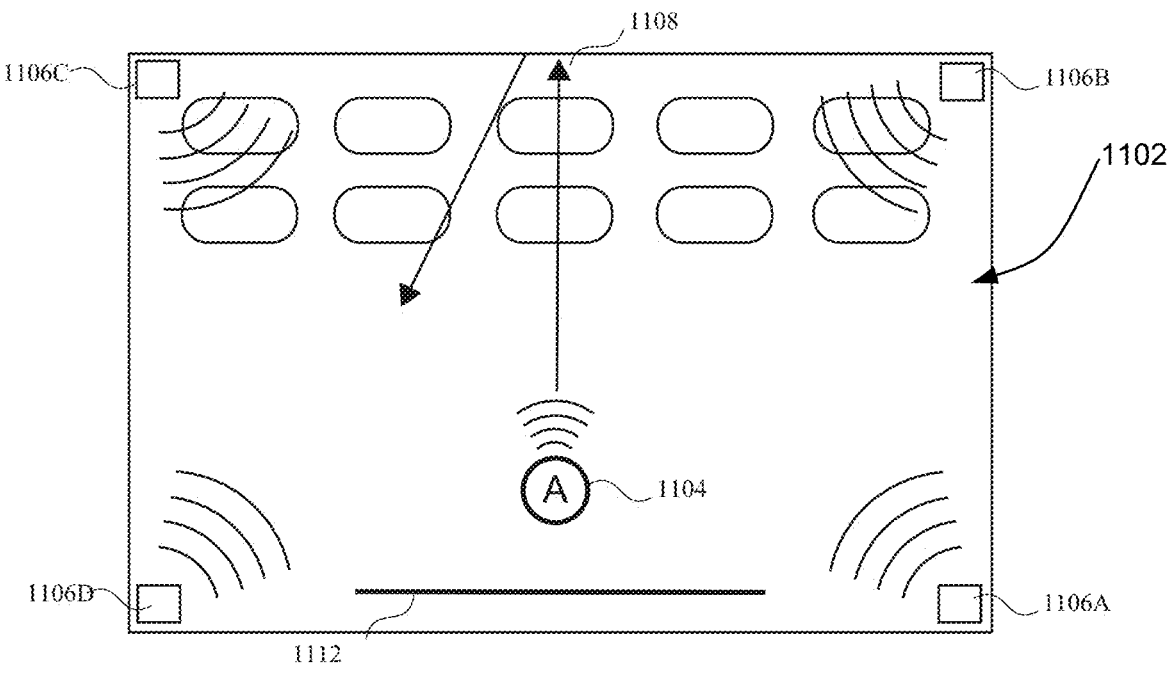
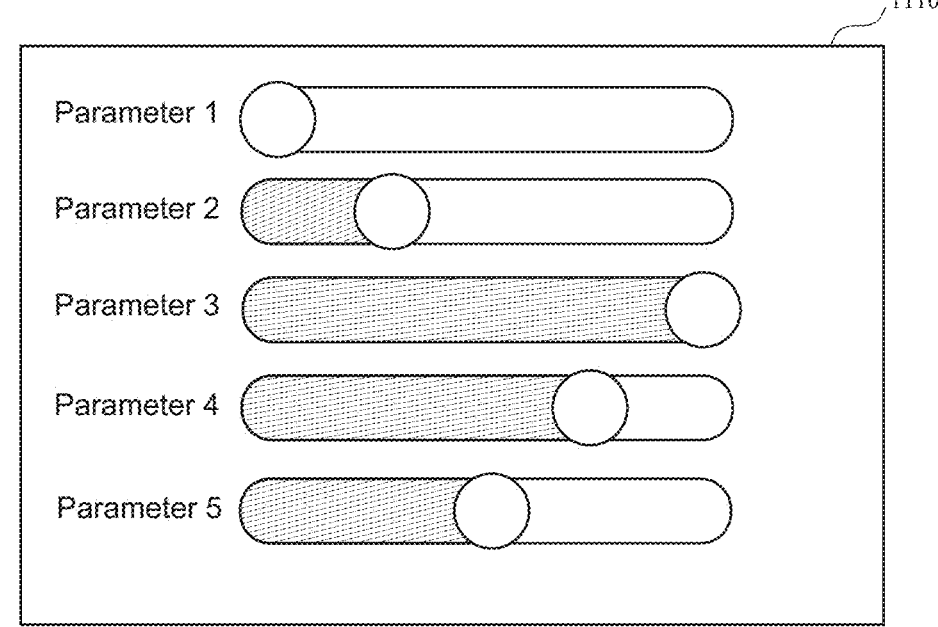
FIG. 11A

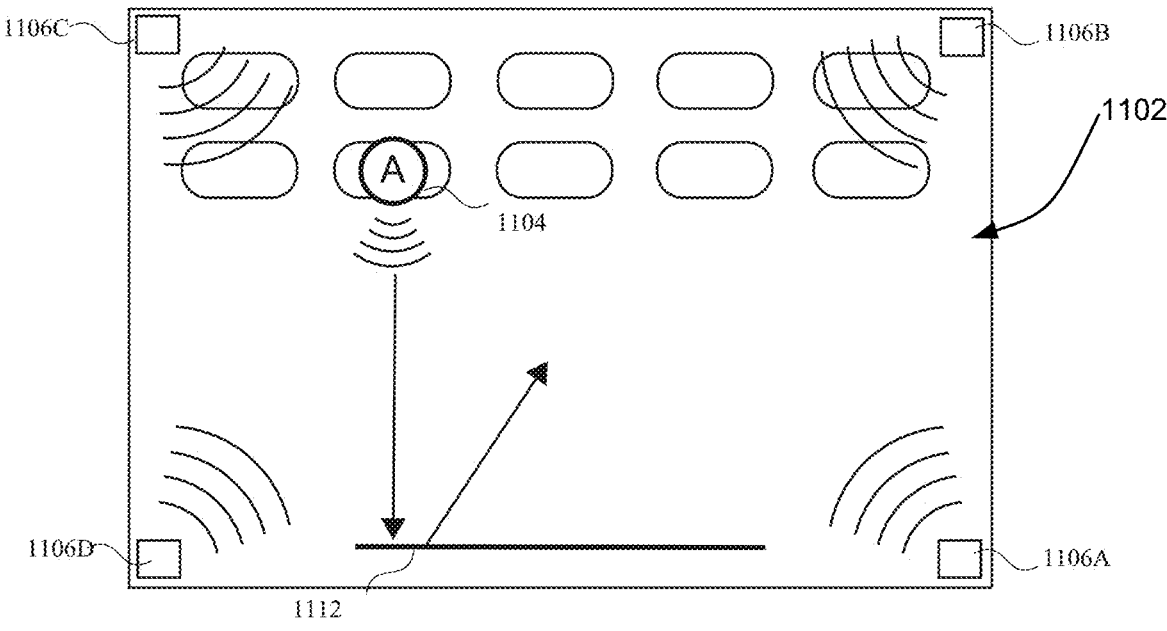
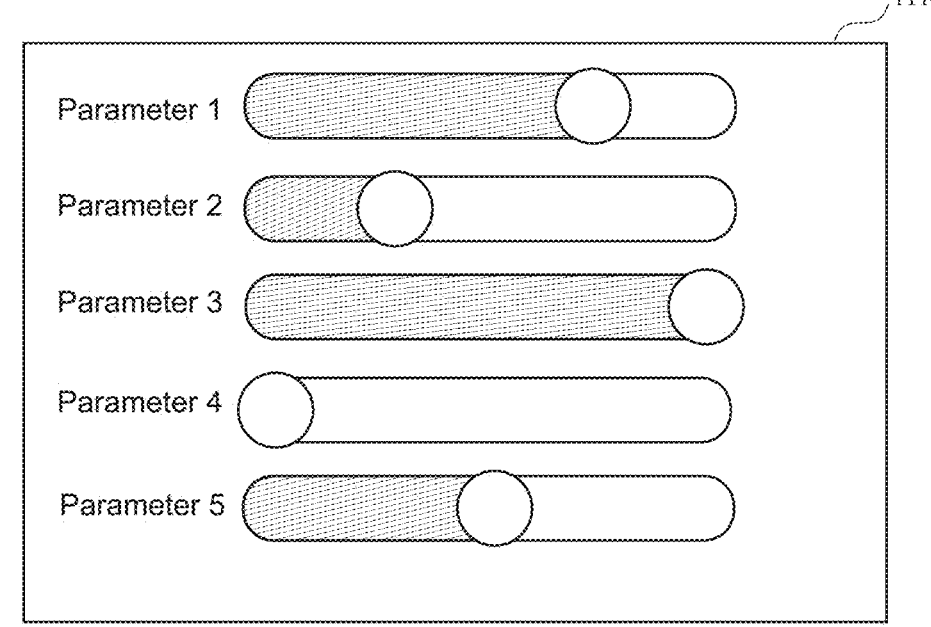
FIG. 11B

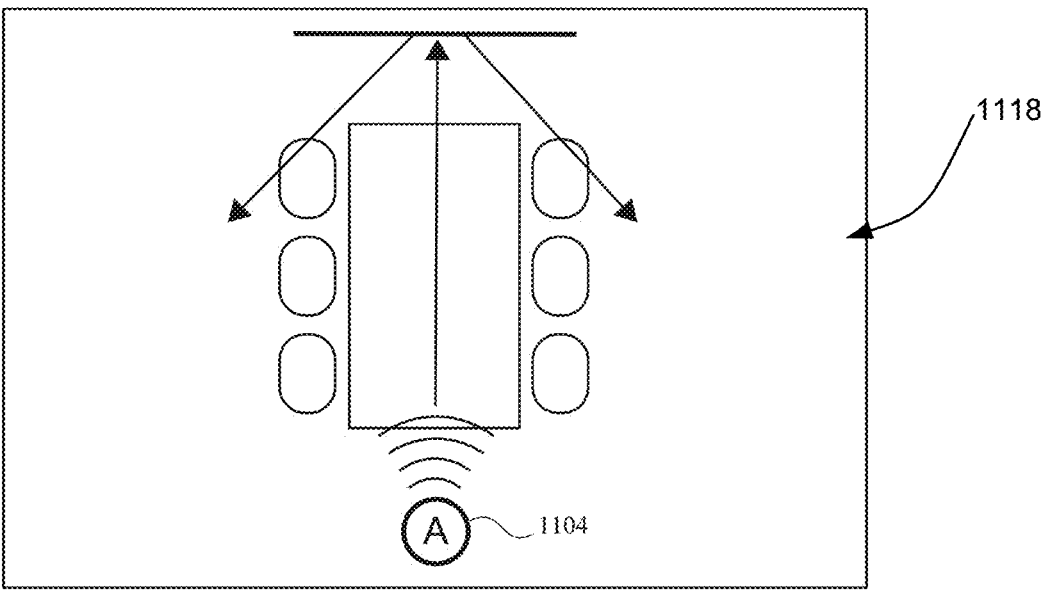
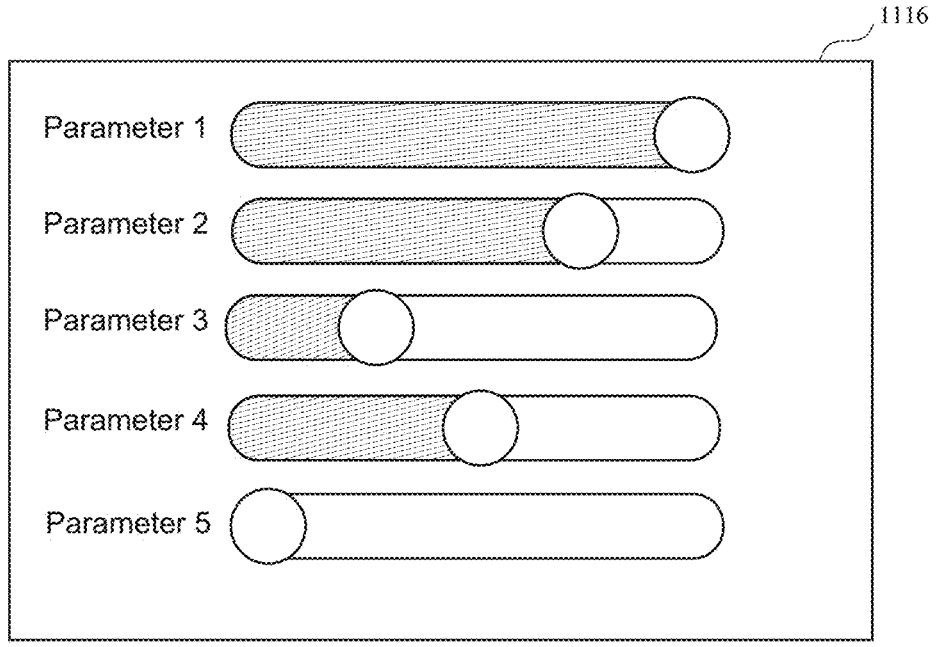
FIG. 11C

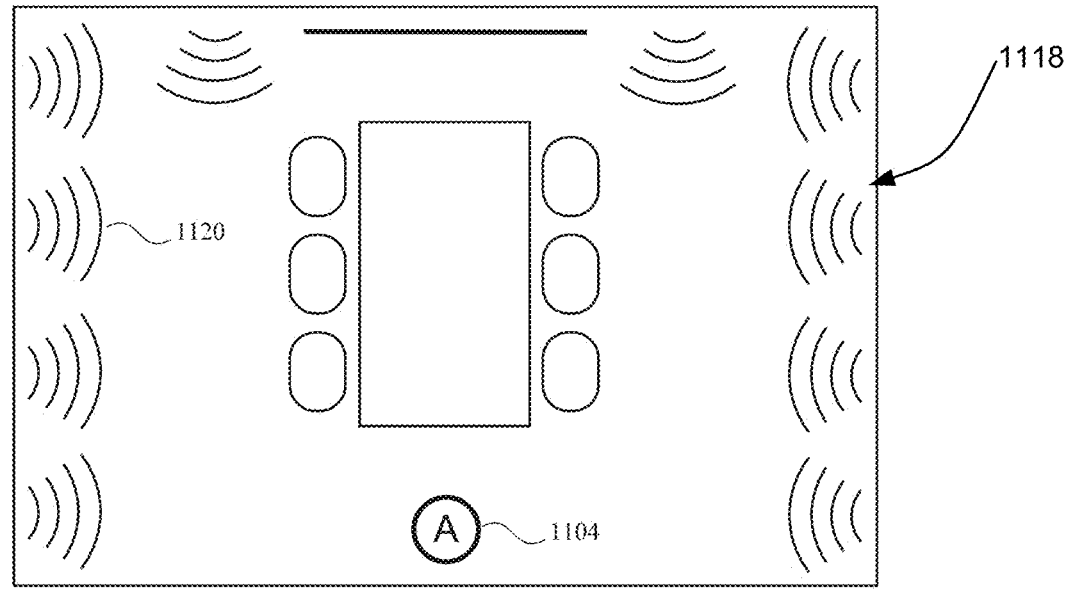
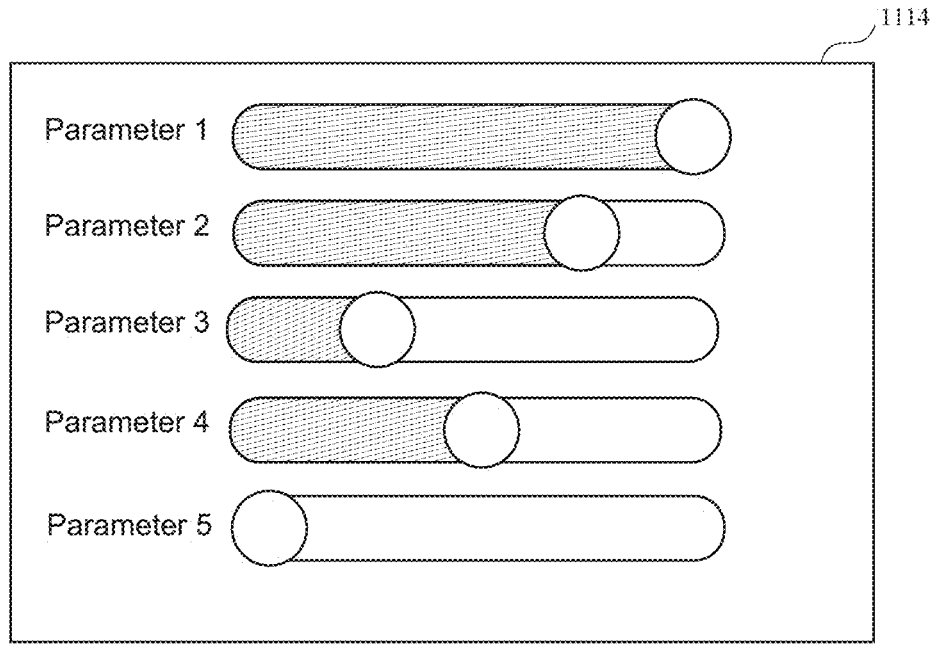
FIG. 11D

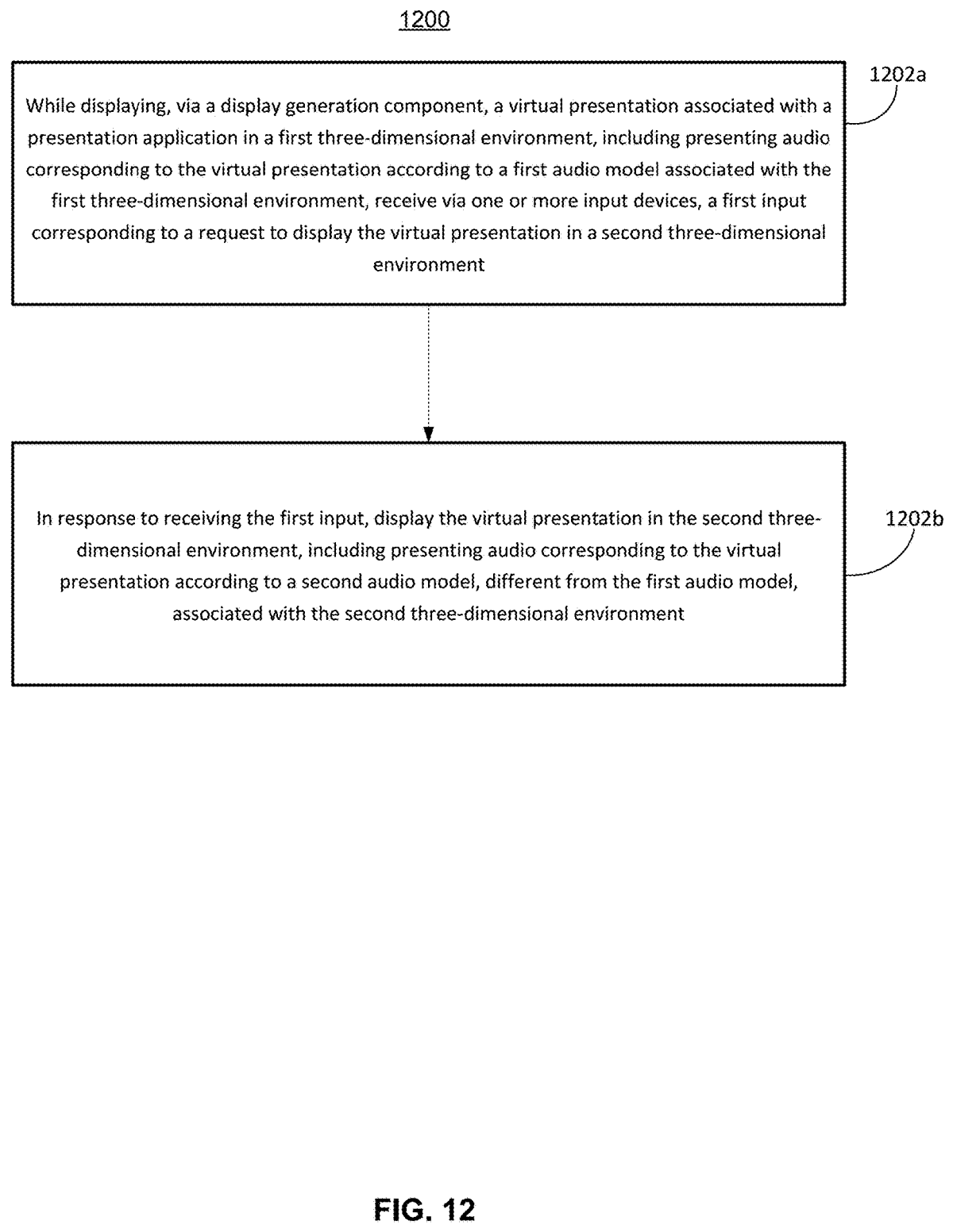

1200

While displaying, via a display generation component, a virtual presentation associated with a presentation application in a first three-dimensional environment, including presenting audio corresponding to the virtual presentation according to a first audio model associated with the first three-dimensional environment, receive via one or more input devices, a first input corresponding to a request to display the virtual presentation in a second three-dimensional environment 1202a In response to receiving the first input, display the virtual presentation in the second three-dimensional environment, including presenting audio corresponding to the virtual presentation according to a second audio model, different from the first audio model, associated with the second three-dimensional environment 1202b

FIG. 12

DEVICES, METHODS, AND GRAPHICAL USER INTERFACES FOR DISPLAYING PRESENTATION ENVIRONMENTS FOR A PRESENTATION APPLICATION

CROSS-REFERENCE TO RELATED APPLICATIONS

This application claims the benefit of U.S. Provisional Application No. 63/506,126, filed Jun. 4, 2023, the entire disclosure of which is herein incorporated by reference for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, c-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays one or more virtual environments associated with a presentation application. In some embodiments, the computer system initially displays a virtual presentation in a first three-dimensional environment. In some embodiments, and in response to receiving an indication to change the displayed three-dimensional environment to a second three-dimensional environment, the computer system displays the second three-dimensional environment and also changes an audio model applied to audio emitted in the second three-dimensional environment according to an audio model that is different from the audio model used in the first three-dimensional environment. In some embodiments, the computing system displays three-dimensional representations of virtual objects that are represented in two-dimensions on a virtual Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for read-ability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corre-sponding parts throughout the figures.

FIG. 4 is a block diagram illustrating a hand tracking unit of a computer system that is configured to capture gesture inputs of the user in accordance with some embodiments.

FIGS. 7A-7J illustrate exemplary user interfaces for dis-playing virtual environments associated with a presentation application in accordance with some embodiments.

FIG. 8 is a flow diagram illustrating a process for dis-playing virtual environments associated with a presentation application in accordance with some embodiments.

FIGS. 9A-9E illustrate exemplary user interfaces for displaying three-dimensional representations of a virtual object associated with a virtual presentation in accordance with some embodiments.

FIG. 10 is a flow diagram illustrating a process for displaying three-dimensional representations of a virtual object associated with a virtual presentation in accordance with some embodiments.

FIGS. 11A-11D illustrate exemplary audio models for presenting audio in virtual environments associated with a presentation application in accordance with some embodi-ments.

FIG. 12 is a flow diagram illustrating a process for presenting audio in virtual environments associated with a presentation application in accordance with some embodi-ments.

DESCRIPTION OF EMBODIMENTS

Figure 1B:
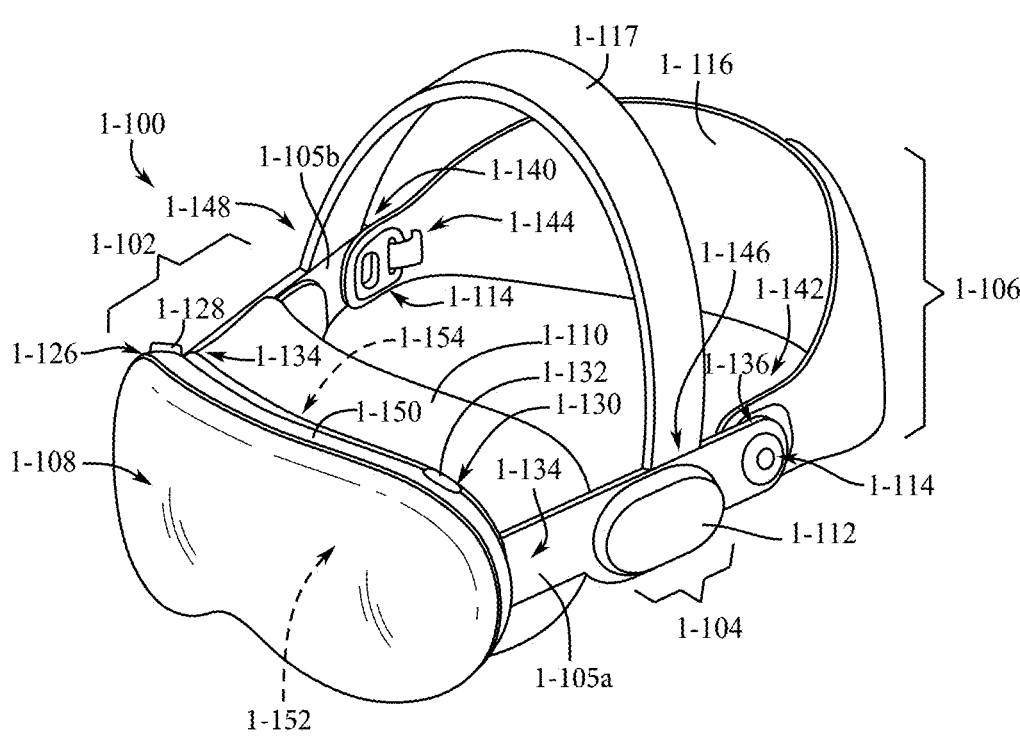
FIGS. 1B-1P are examples of a computer system for providing XR experiences in the operating environment of FIG. 1A.

The present disclosure relates to user interfaces for pro-viding an extended reality (XR) experience to a user, in accordance with some embodiments.

The systems, methods, and GUIs described herein improve user interface interactions with virtual/augmented reality environments in multiple ways.

In some embodiments, a computer system displays a virtual presentation associated with a presentation applica-tion in one or more pre-determined virtual environments. In some embodiments, while displaying, via the display gen-eration component, a virtual presentation associated with a presentation application in a first three-dimensional envi-ronment, wherein the first three-dimensional environment includes a portion of a physical environment of a user of the computer system and the virtual presentation is presented in a first mode of the presentation application, the computer system receives, via the one or more input devices, a first input corresponding to a request to display the virtual presentation in a second mode of the presentation applica-tion different from the first mode of the presentation appli-cation.

In some embodiments, a computer system displays a three-dimensional representation of a virtual object associ-ated with a virtual presentation. In some embodiments, while displaying, via the display generation component, a virtual presentation, associated with a presentation applica-tion, at a first location in a three-dimensional environment, wherein the virtual presentation includes a two-dimensional representation of a first three-dimensional virtual object, the computer system receives, via the one or more input devices, a first input directed to the two-dimensional representation of the first three-dimensional virtual object. In response to receiving the first input, the computer system displays a three-dimensional representation of the three-dimensional virtual object at a second location in the three-dimensional environment, different from the first location in the three-dimensional environment, wherein the second location is outside of the virtual presentation.

In some embodiments, a computer system presents audio in a virtual environment associated with a presentation application according to an audio model. In some embodi-ments, while displaying, via the display generation compo-nent, a virtual presentation associated with a presentation application in a first three-dimensional environment, includ-ing presenting audio corresponding to the virtual presenta-tion according to a first audio model associated with the first three-dimensional environment, the computer system receives, via the one or more input devices, a first input corresponding to a request to display the virtual presentation in a second three-dimensional environment. In some embodiments, in response to receiving the first input, the computer system displays the virtual presentation in the second three-dimensional environment including presenting audio corresponding to the virtual presentation according to a second audio model, different from the first audio model, associated with the second three-dimensional environment.

FIGS. 1A-6 provide a description of example computer systems for providing XR experiences to users (such as described below with respect to methods 800, 1000 and/or 1200). FIGS. 7A-7J illustrate example techniques for dis-playing virtual environments associated with a presentation application, in accordance with some embodiments. FIG. 8 depicts a flow diagram illustrating a process for displaying virtual environments associated with a presentation appli-cation, in accordance with various embodiments. The user interfaces in FIGS. 7A-7J are used to illustrate the processes in FIG. 8. FIGS. 9A-9E illustrate example techniques for displaying three-dimensional representations of a virtual object associated with a virtual presentation, in accordance with some embodiments. FIG. 10 depicts a flow diagram illustrating a process for displaying three-dimensional representations of a virtual object associated with a virtual presentation, in accordance with various embodiments. The user interfaces in FIGS. 9A-9E are used to illustrate the processes in FIG. 10. FIGS. 11A-11D illustrate example audio models for presenting audio in virtual environments associated with a presentation application, in accordance with some embodiments. FIG. 12 depicts a flow diagram illustrating a process for presenting audio in virtual environments associated with a presentation application, in accordance with various embodiments. The user interfaces in FIGS. 11A-11D are used to illustrate the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
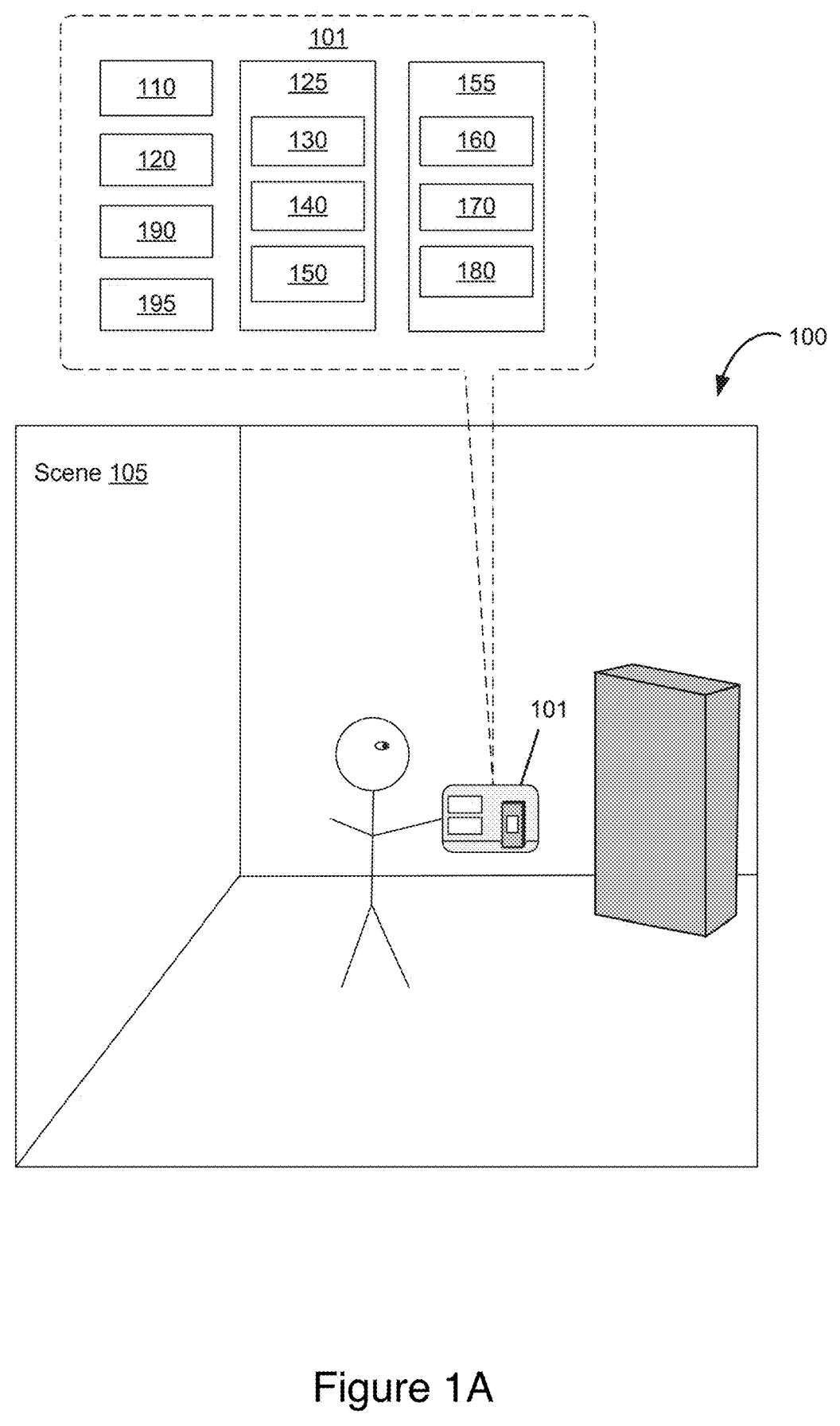
Figure 1C:
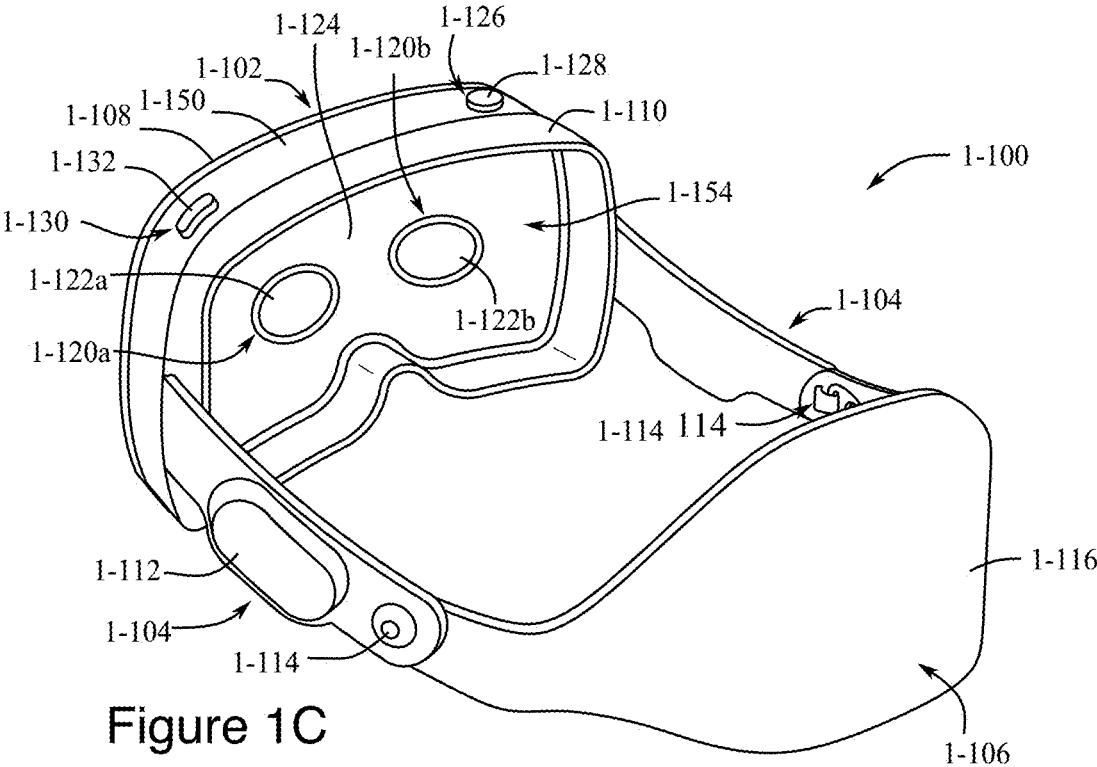
FIG. 1A is a block diagram illustrating an operating environment of a computer system for providing XR expe-riences in accordance with some embodiments.
Figure 1D:
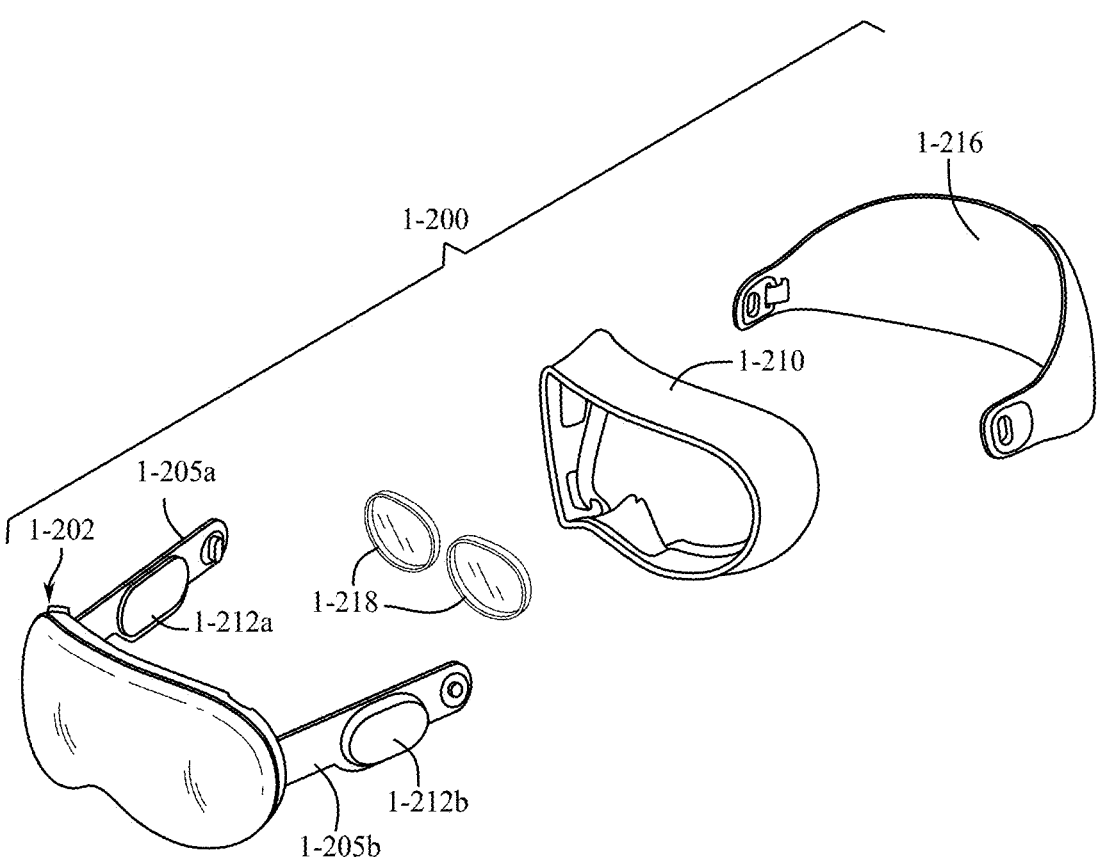
Figure 1E:
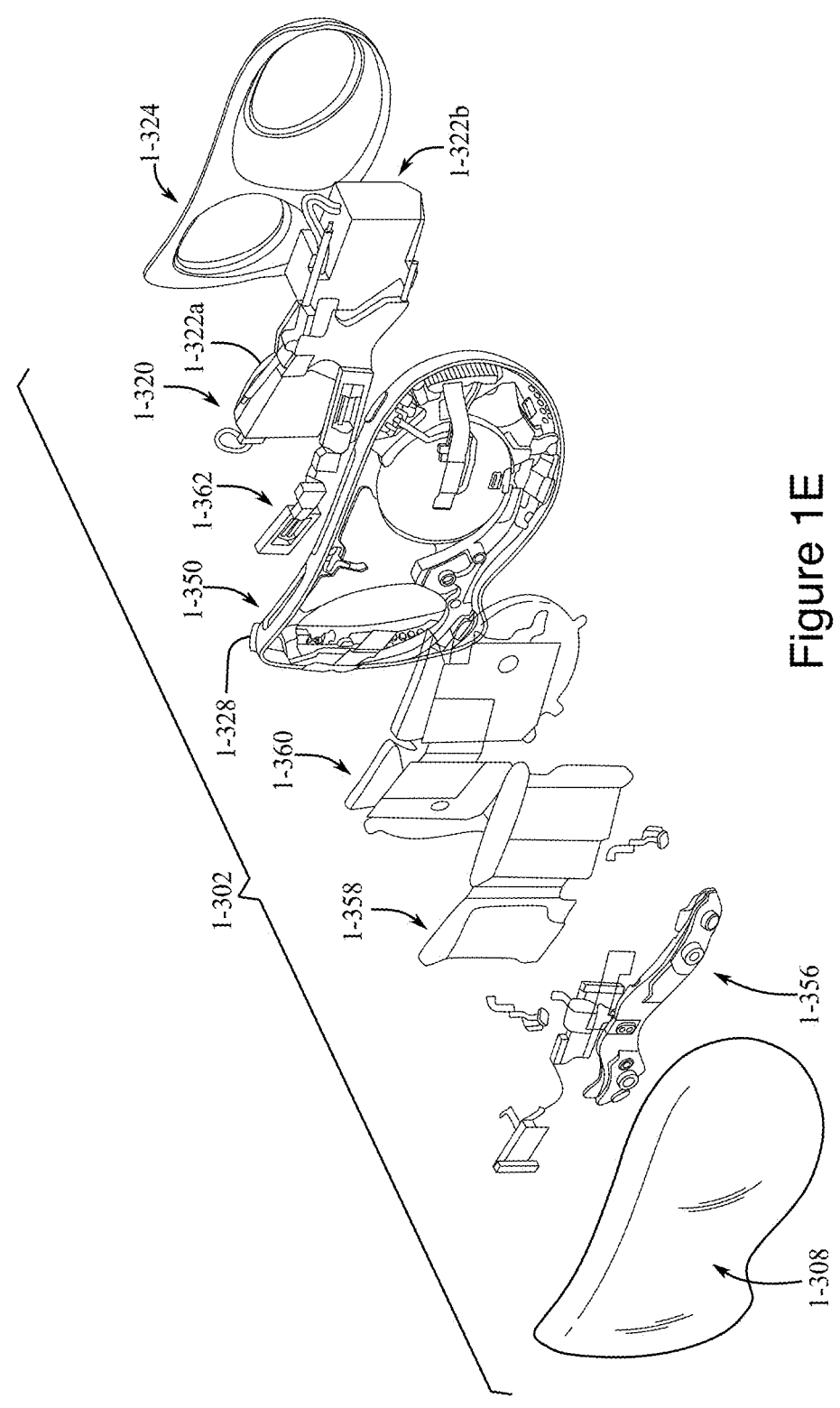
Figure 1F:
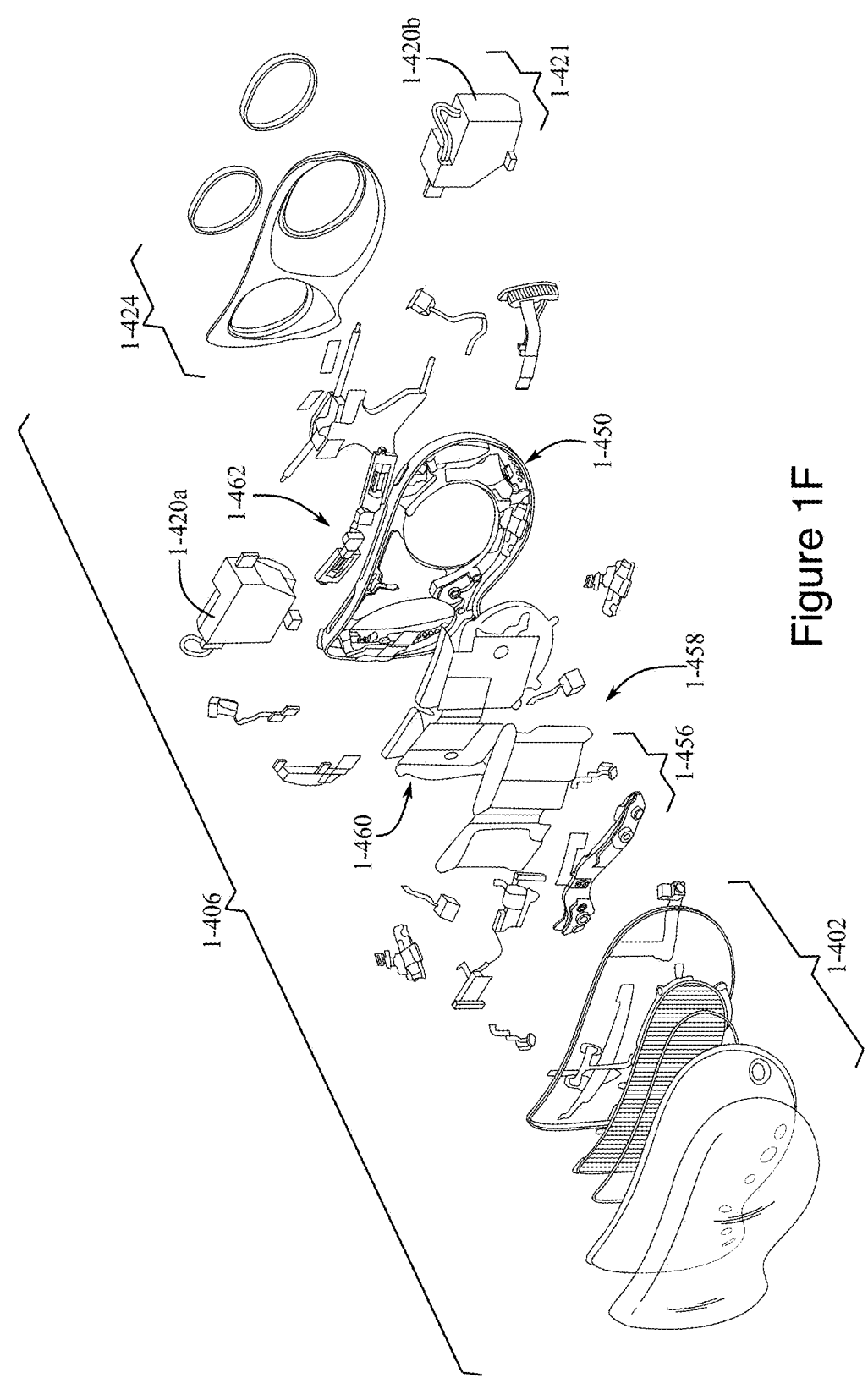
Figure 1G:
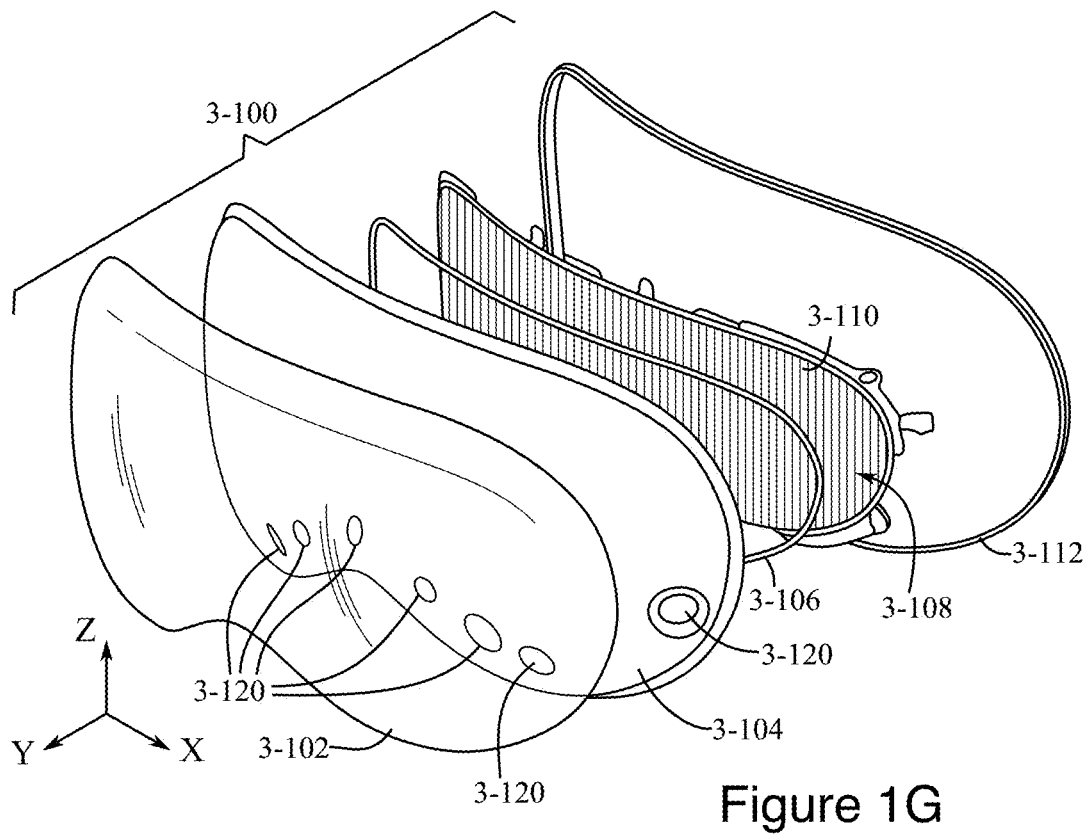
Figure 1H:
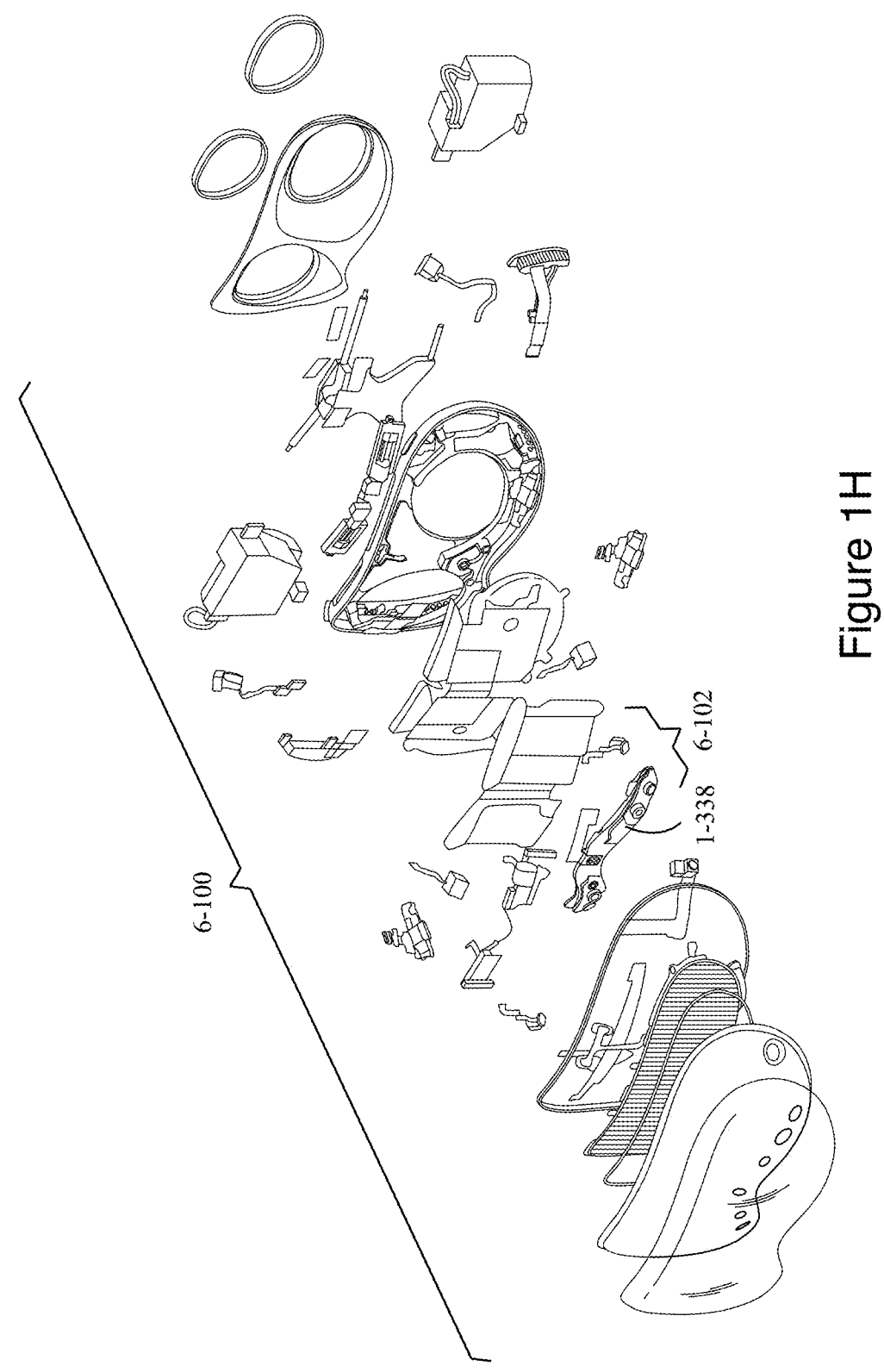
Figure 1I:
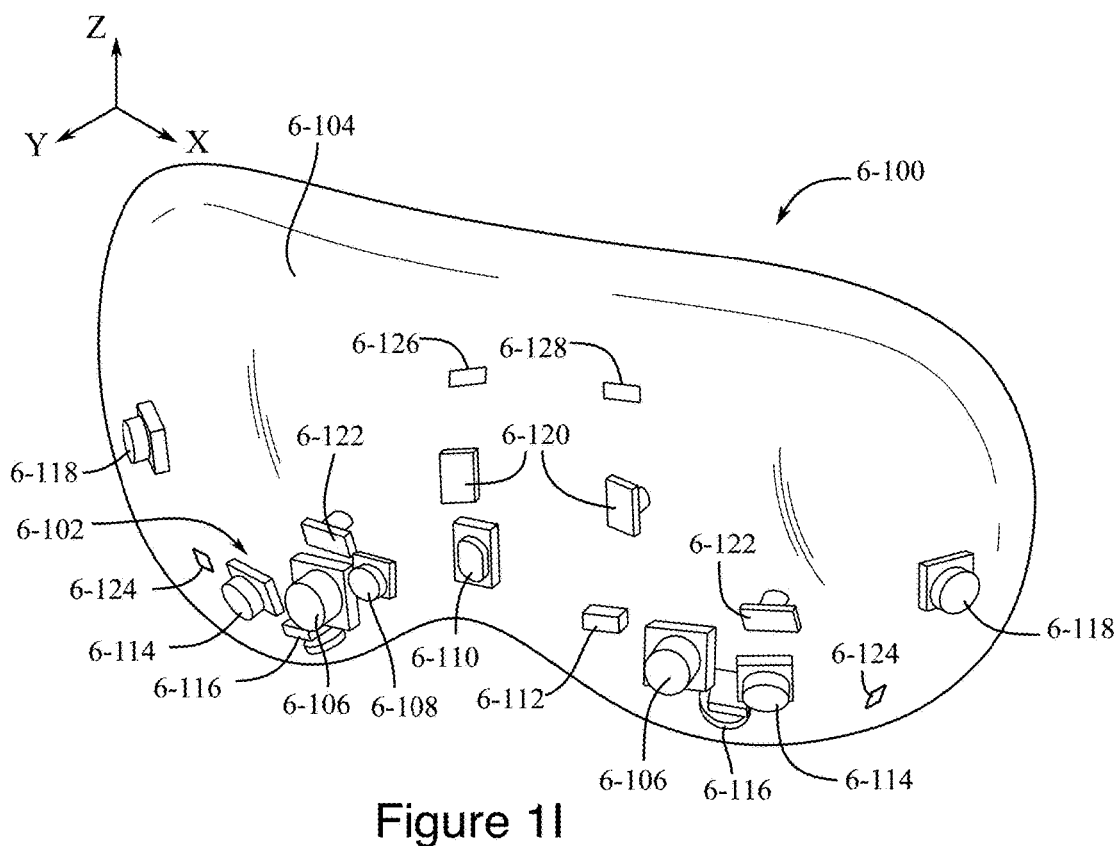
Figure 1J:
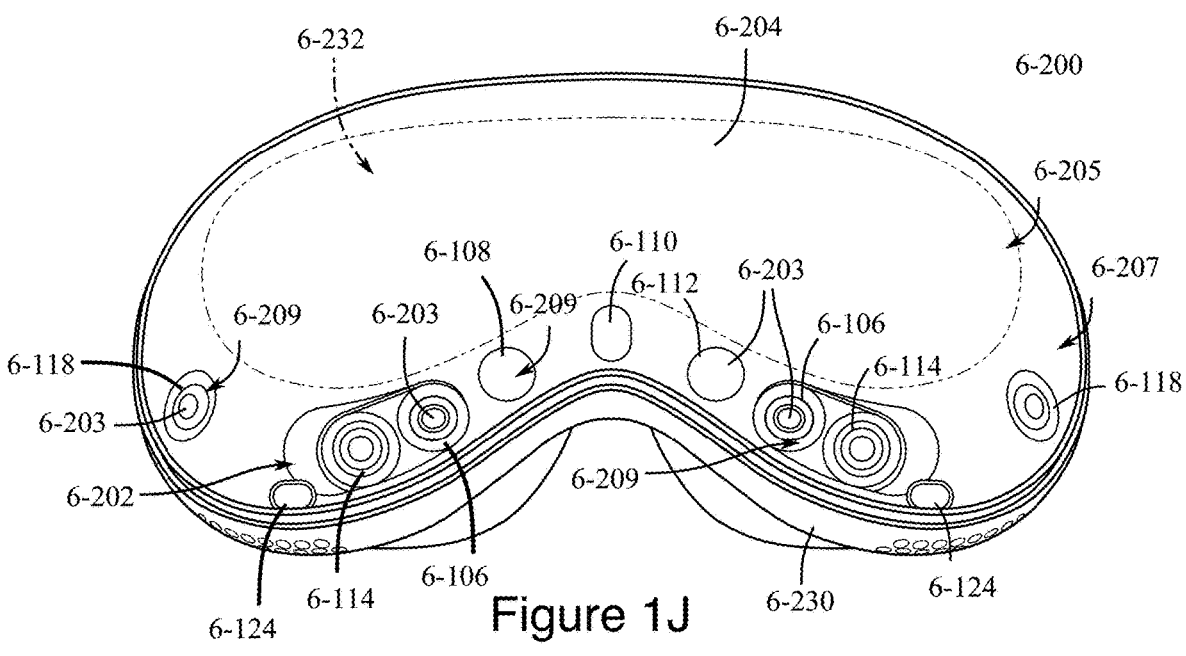
Figure 1K:
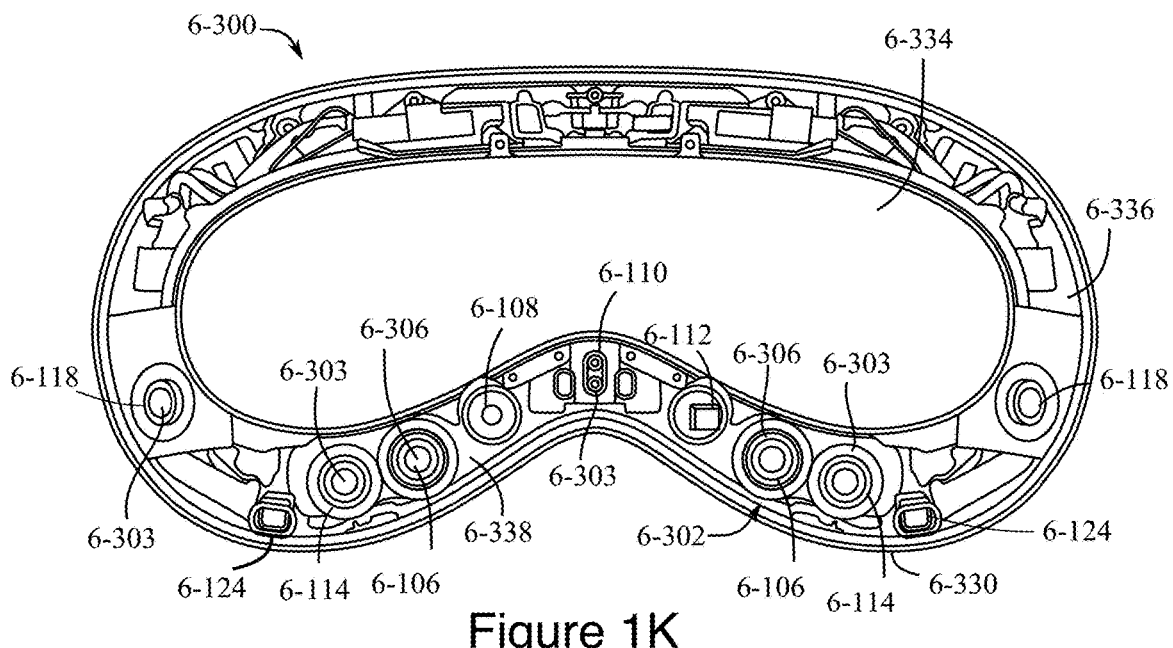
Figure 1L:
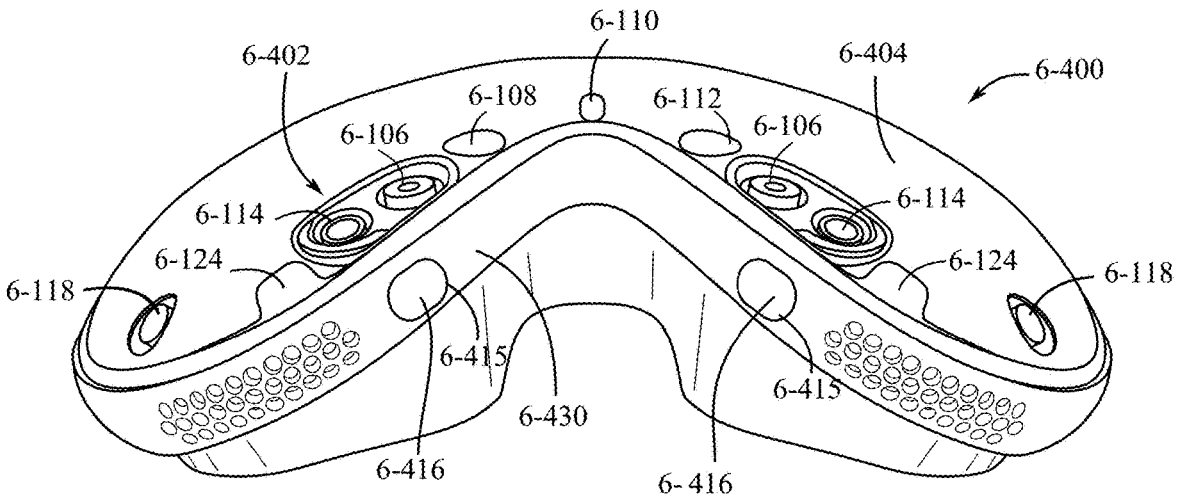
Figure 1M:
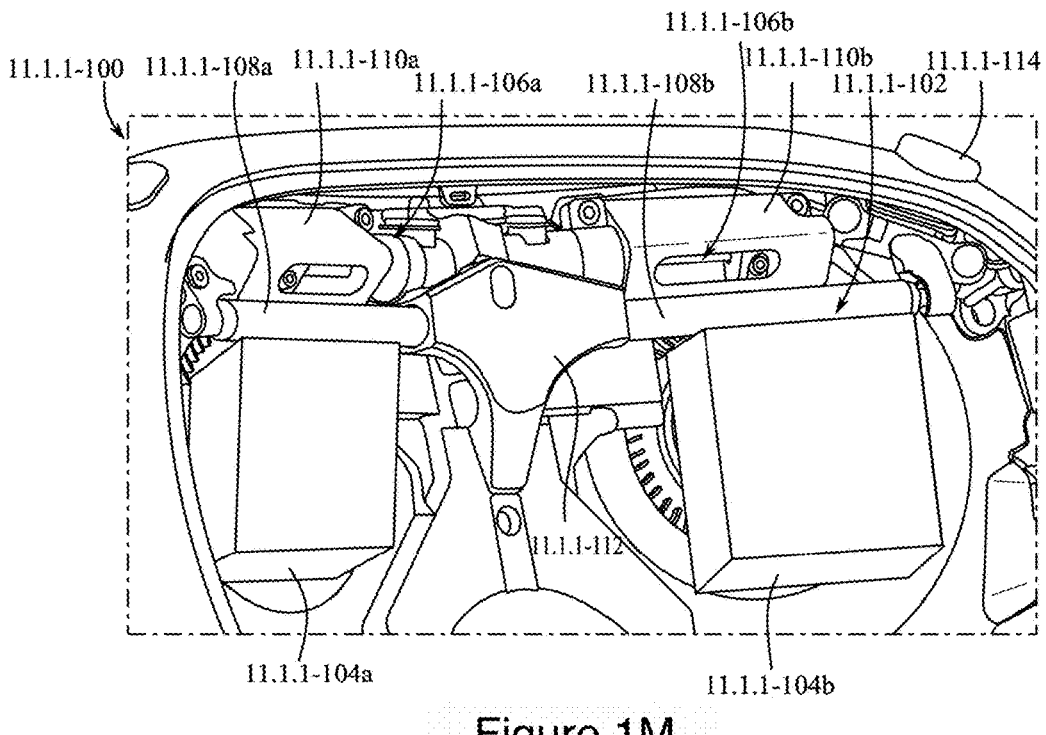
Figure 1N:
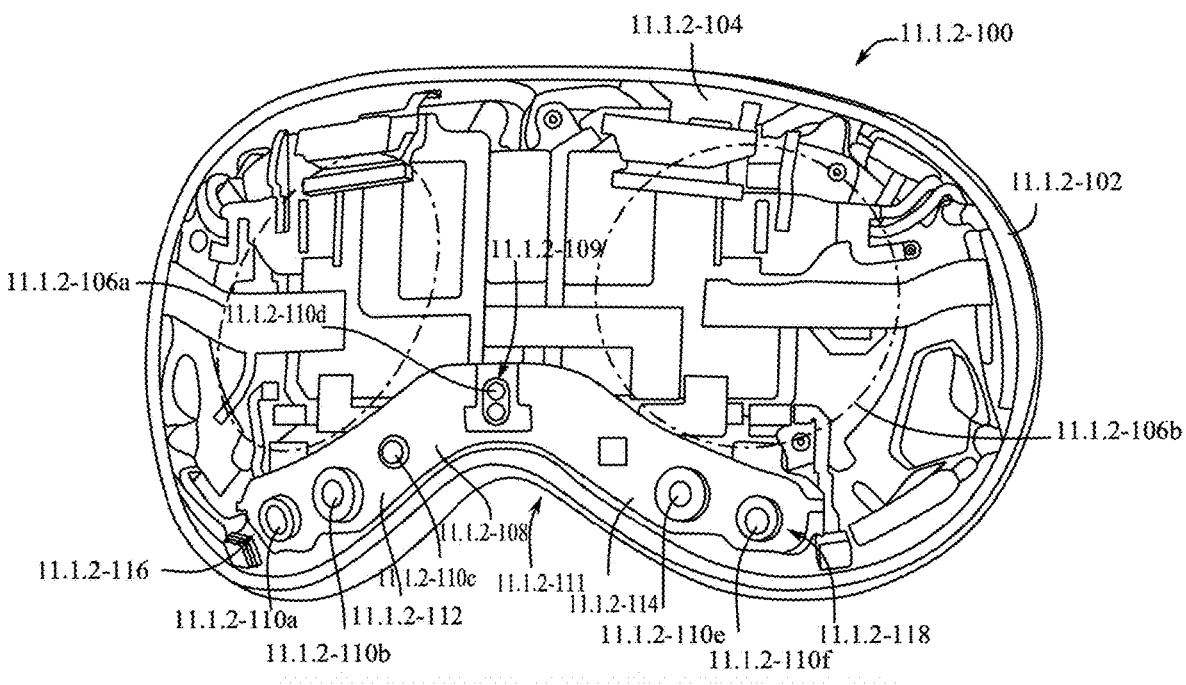
Figure 1O:
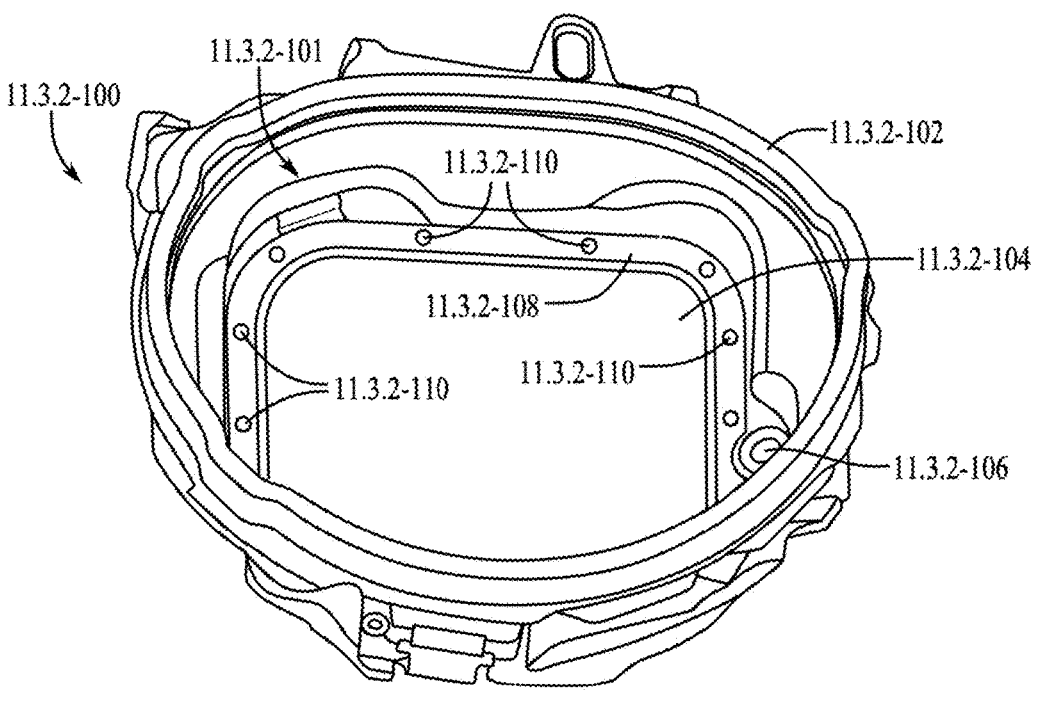
Figure 1P:
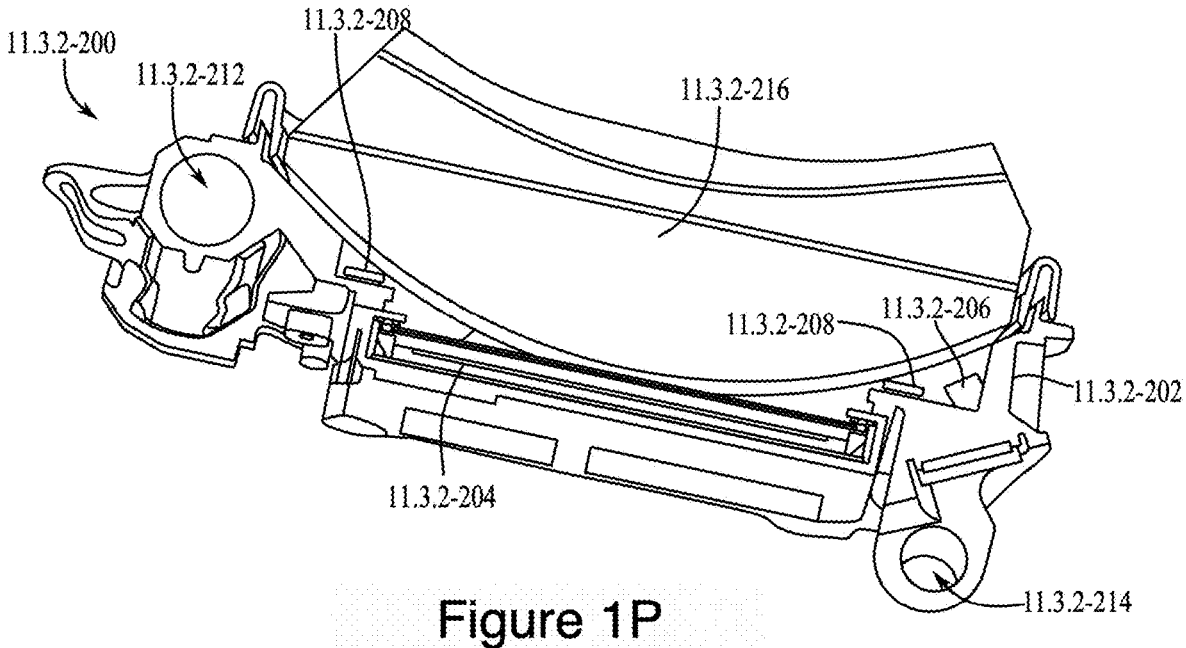

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first secure-ment strap 1-205a can include a first electronic component 1-212a and the second securement strap 1-205b can include a second electronic component 1-212b. In at least one example, the first and second straps 1-205a-b can be remov-ably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned.

The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
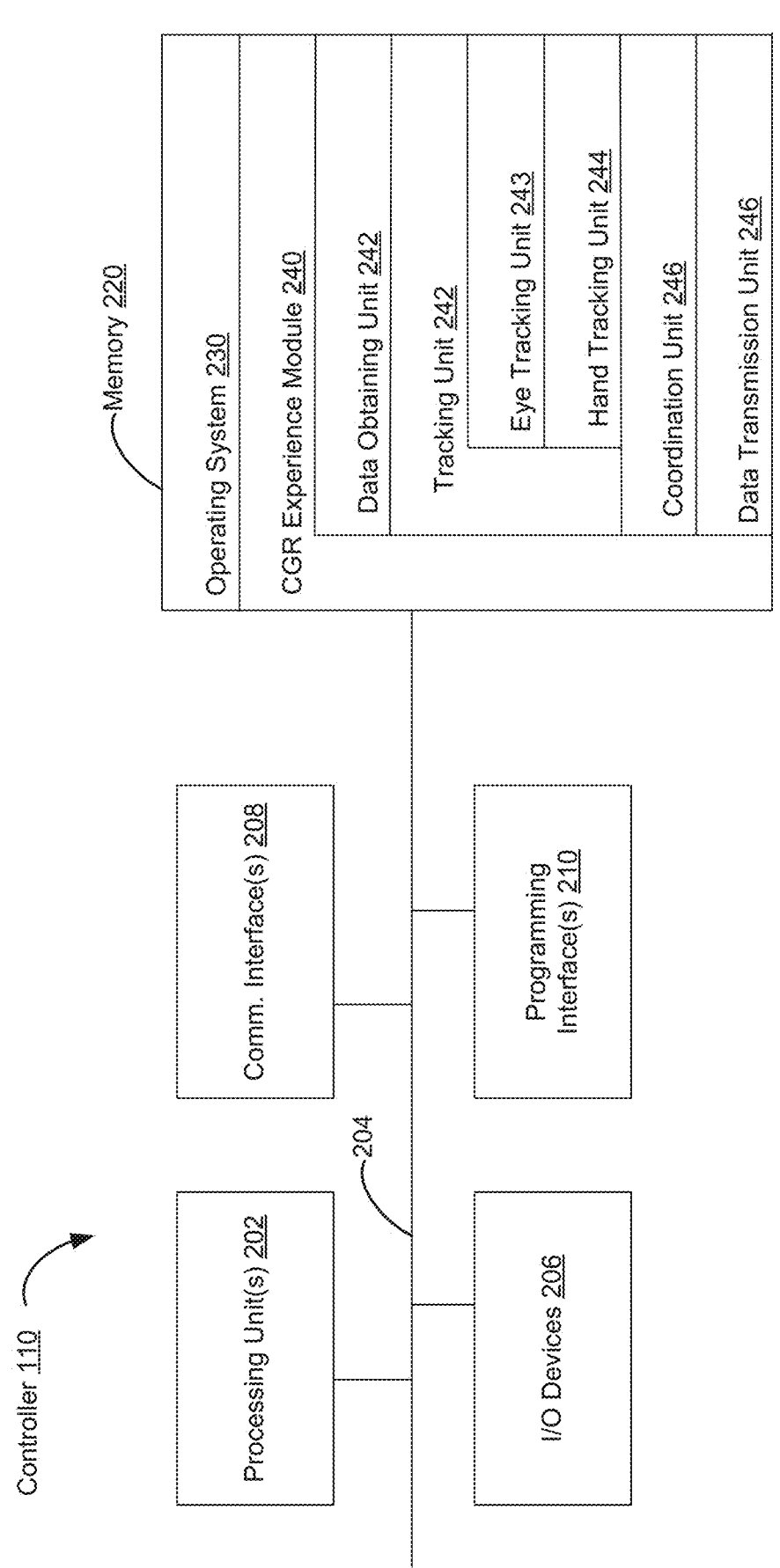
FIG. 2 is a block diagram illustrating a controller of a computer system that is configured to manage and coordi-nate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
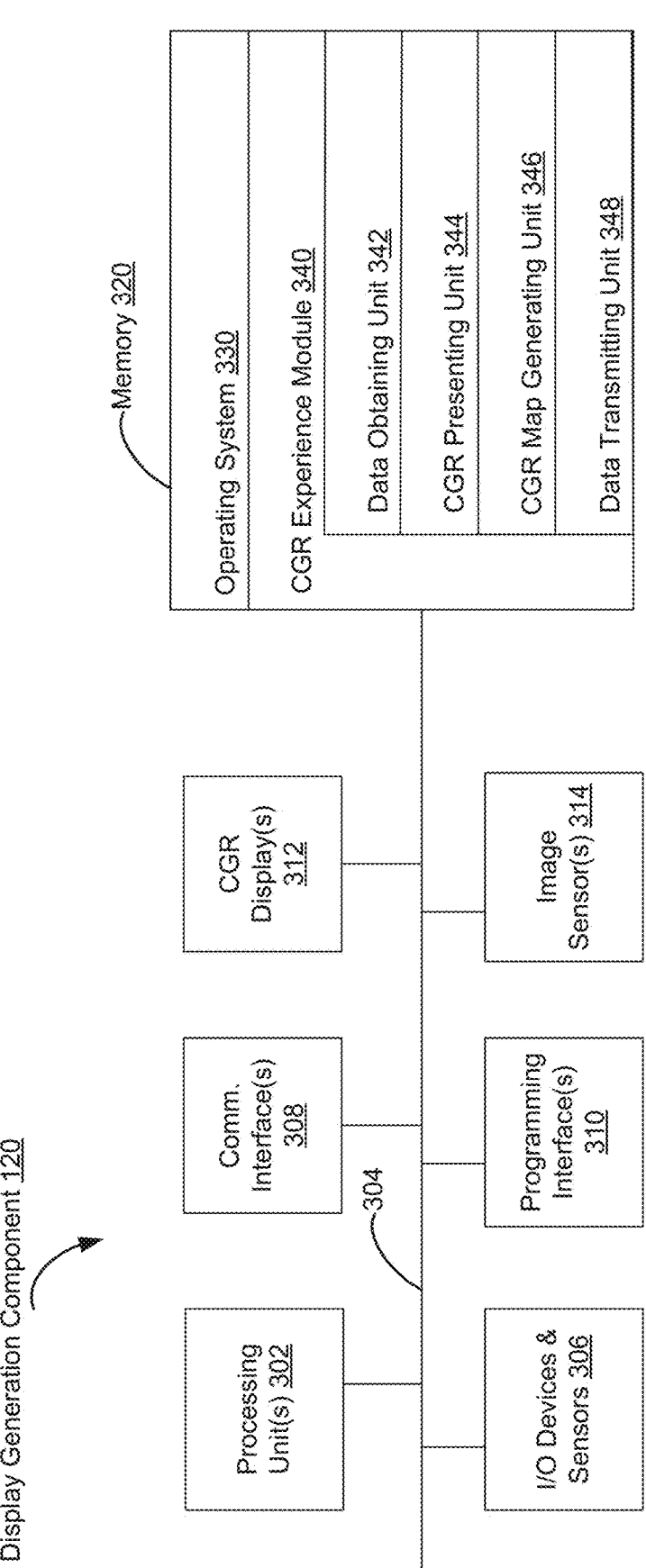
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether inter-active elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, over-all size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
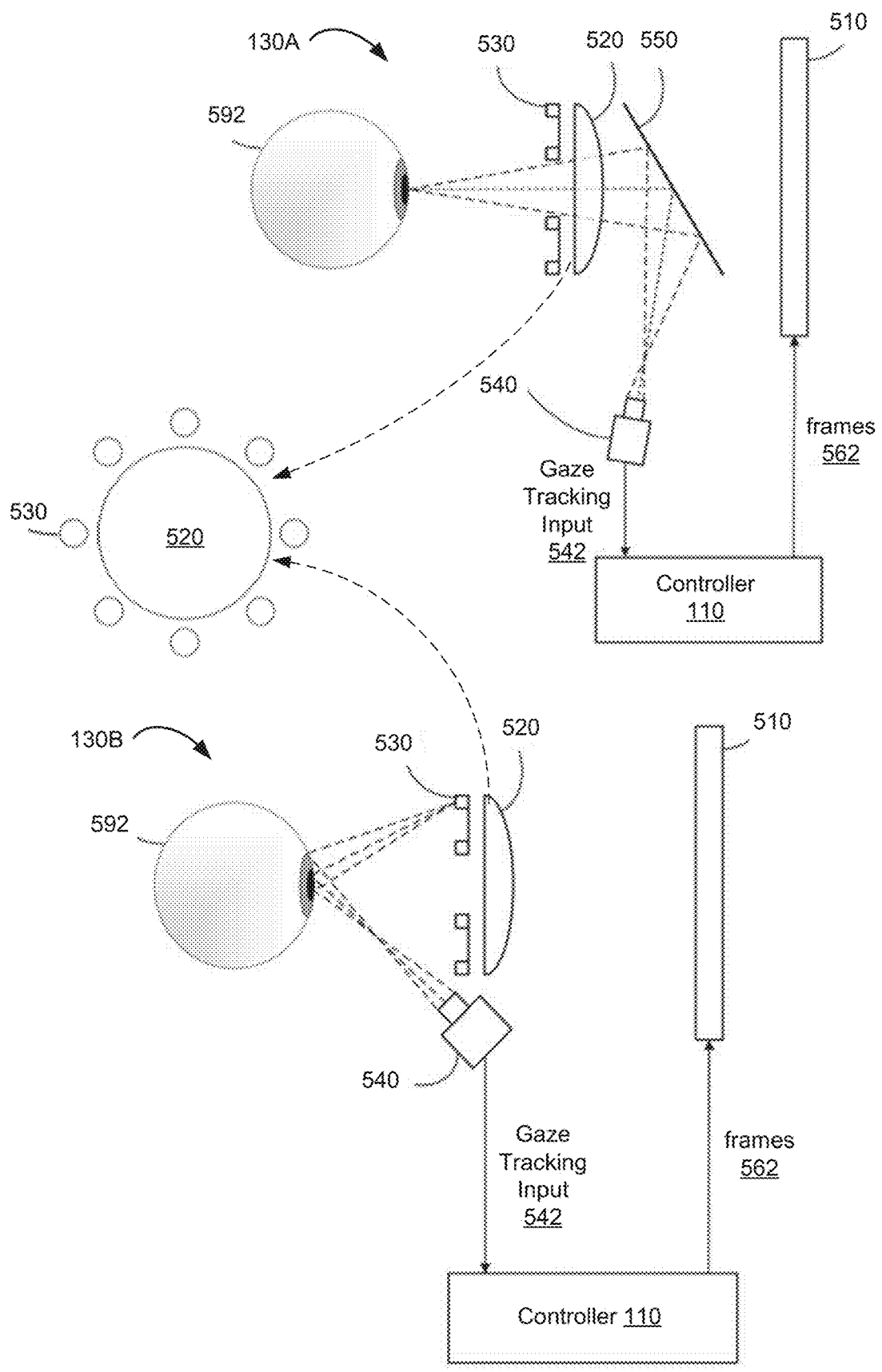
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as a headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR cham-ber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display genera-tion component that is not head-mounted. In some embodi-ments, the eye tracking device 130 is not a head-mounted device, and is optionally used in conjunction with a head-mounted display generation component. In some embodi-ments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent dis-play. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cam-eras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration pro-cess may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
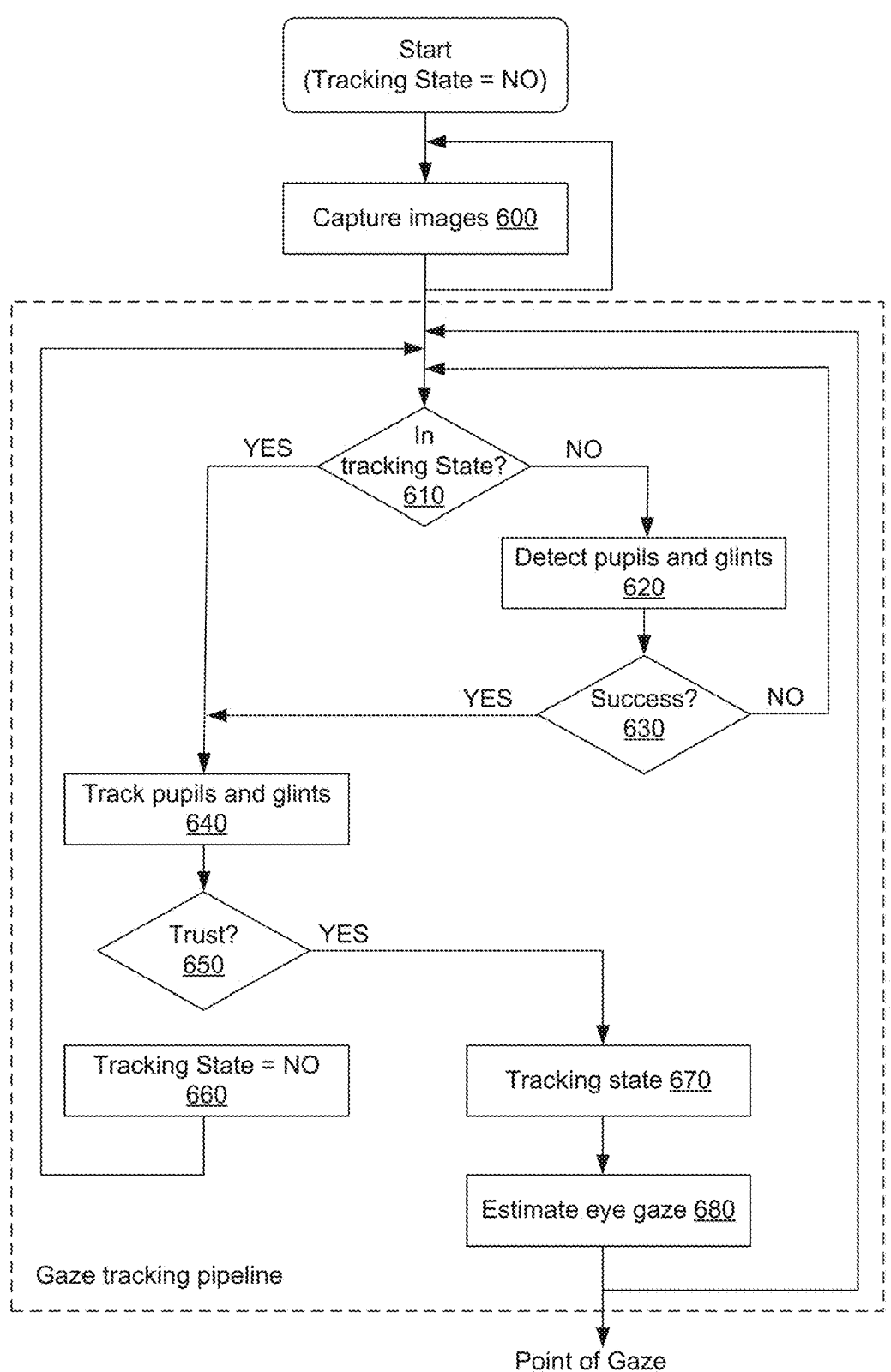
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7J illustrate examples of a computer system implementing three-dimensional virtual presentation rehearsal environments associated with a presentation application in accordance with some embodiments.

Figure 7A:
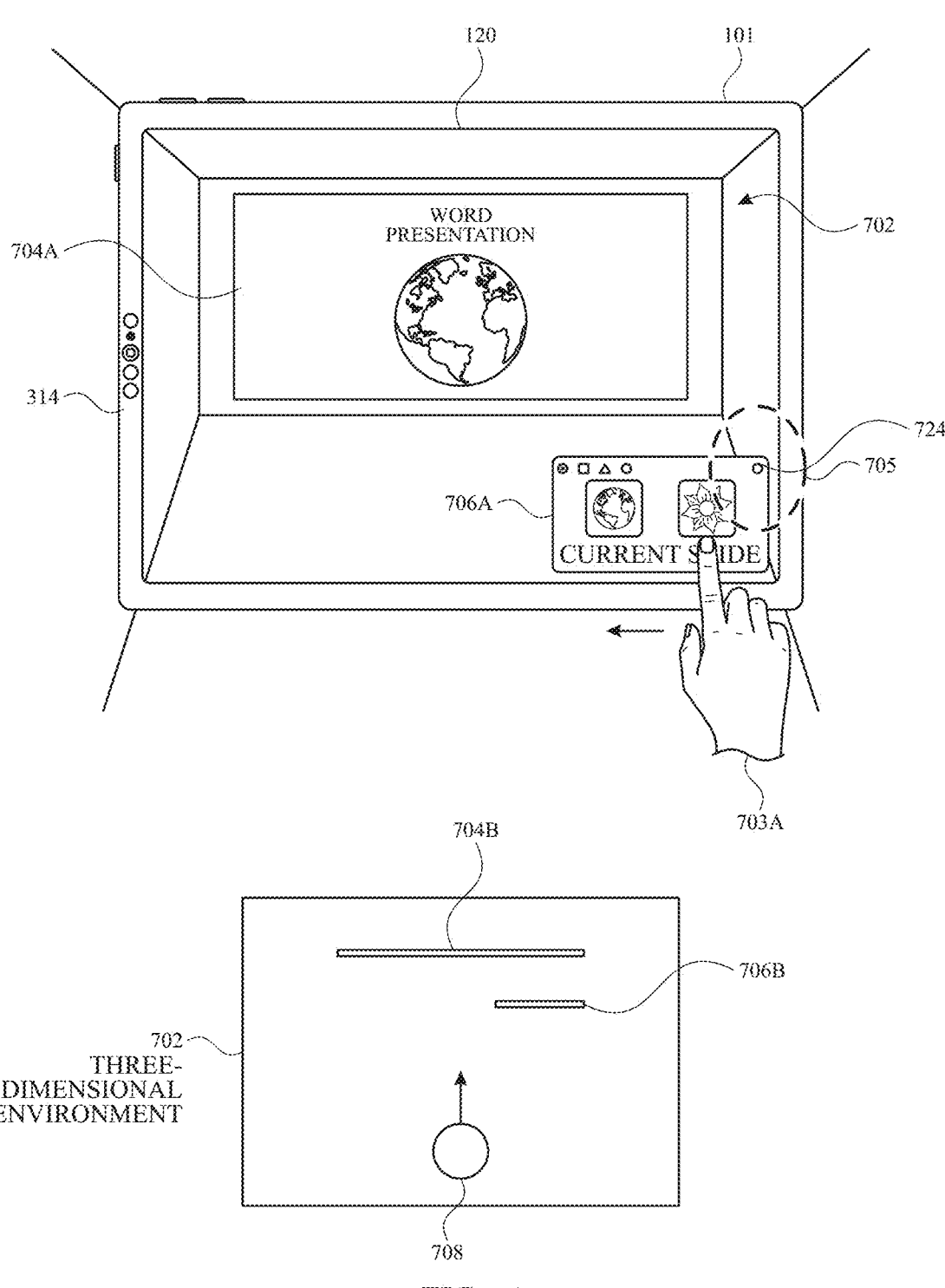

FIG. 7A illustrates a computer system (e.g., an electronic device) 101 displaying, via a display generation component (e.g., display generation component 120 of FIG. 1), a three-dimensional environment 702 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 7A, the computer system 101 displays a virtual presentation 704A in a three-dimensional environment 702 (e.g., corresponding to 704B in the overhead view of the three-dimensional environment 702). In some embodiments, the virtual presentation 704A includes a plurality of virtual slides, with one or more slides of the virtual presentation including one or more visual content items (e.g., text, photos, etc.) that are displayed within the three-dimensional environment 702. In some embodiments, the slides of the virtual presentation are displayed in the three-dimensional environment one at a time with the user of the computer system controlling which slide of the virtual presentation is being displayed in the three-dimensional environment at any given time (described in further detail below).

Figure 7B:
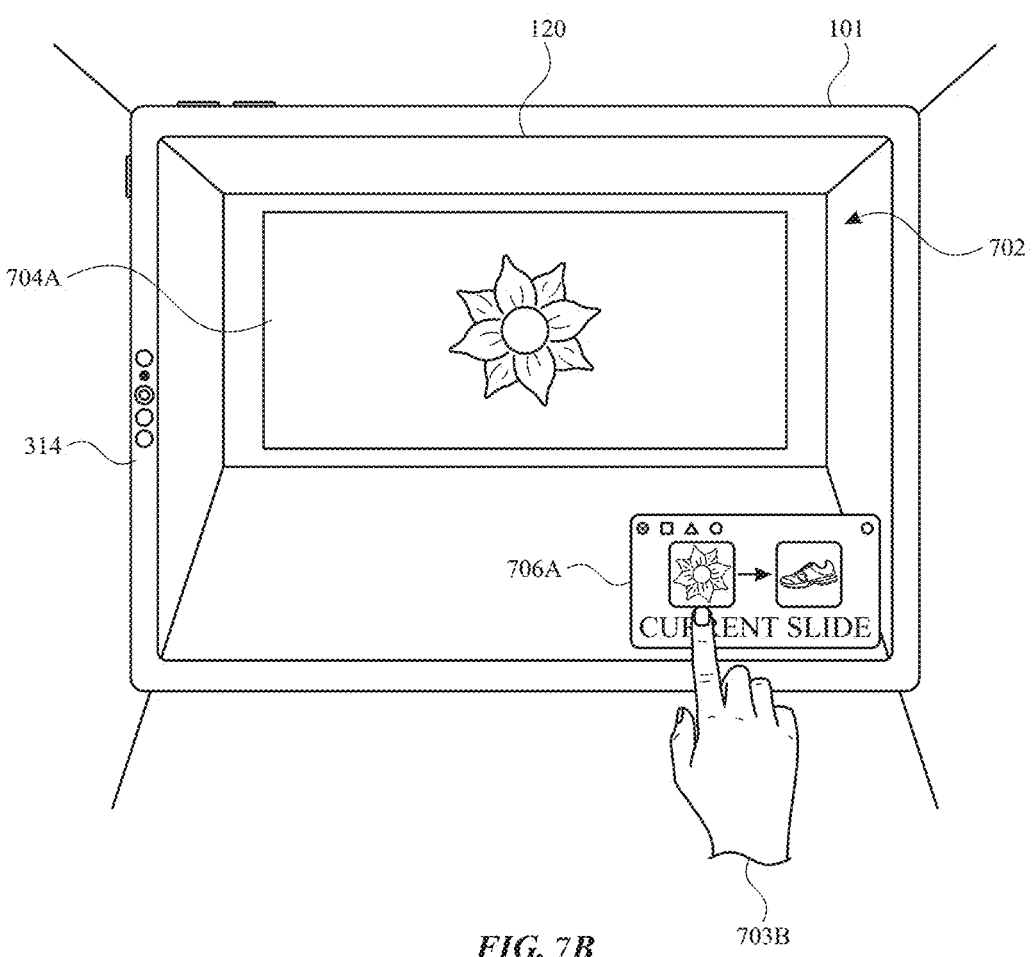

In some embodiments, and in order to facilitate user control of the virtual presentation, the computer system 101 displays a speaker notes user interface 706A (e.g., corresponding to 706B in the overhead view of the three-dimensional environment 702). Speaker notes user interface 706A includes one or more selectable options for controlling the virtual presentation (described further below). In some embodiments, as shown in the overhead view in FIG. 7A, the speaker notes user interface 706B is displayed in front of and to a side of the virtual presentation 704B in order to allow the user to view both the virtual presentation and the simultaneously from their current viewpoint. In some embodiments, the computer system 101 facilitates user control of the slides that are displayed on the virtual presentation. In some embodiments, the computer system 101 facilitates user control of the slides of the virtual presentation via the speaker notes user interface 706A. For example, while detecting that the user's gaze is directed to the speaker notes user interface 706A, and in response to detecting the user's hand 703A performing an air gesture input, the computer system changes the slide displayed on the virtual presentation 704A as shown in FIG. 7B. In some embodiment, the air gesture input includes the computer system 101 detecting hand 703A moving in a particular direction (e.g., right or left) while the hand 703A is performing/holding the air pinch gesture. Based on the detected direction, the computer system either advances the slide being displayed on virtual presentation 704A (e.g., displays the next slide in the progression of slides of the virtual presentation) or reverses the slide being displayed on virtual presentation 704A (e.g., displays the previous slide in the progression of slides of the virtual presentation). Additionally or alternatively, the device advances or reverses the slides of the virtual presentation in response to detecting that the user's gaze is directed to the virtual presentation 708A and detecting the user's hand 703A performing an air gesture input as described above with respect to advance and reversing slides using the speaker notes user interface 706A.

In some embodiments, the user is able to move within their physical environment, which corresponds to a request to correspondingly move their viewpoint in the three-dimensional environment, and in response to detecting that the user has moved, the computer system modifies the viewpoint of the user as illustrated in FIG. 7C. As shown in FIG. 7C, in response to detecting that the user 708 provides input to change their viewpoint of the three-dimensional environment 702, for instance by turning their body or head to face in a different direction, the computer system modifies the viewpoint of three-dimensional environment 702 commensurate with the detected movement of the user. For instance, in the example of the FIG. 7C, as the user 708 changes their viewpoint to look to the left of the virtual presentation 704A, the computer systems modifies the displayed viewpoint of the virtual environment 702 such that virtual presentation 704A is displayed as appearing to the right of the viewpoint of the user. In some embodiments, speaker notes 706A is also displayed as appearing to the right of the viewpoint of the user commensurate with the change in the user's viewpoint. In some embodiments, virtual presentation 704A and speaker notes 706A are world-locked. Additionally or alternatively, and as shown in FIG. 7C, the speaker notes 706A moves with the user's viewpoint (e.g., the speaker notes 706A are viewpoint-locked).

Figure 7D:
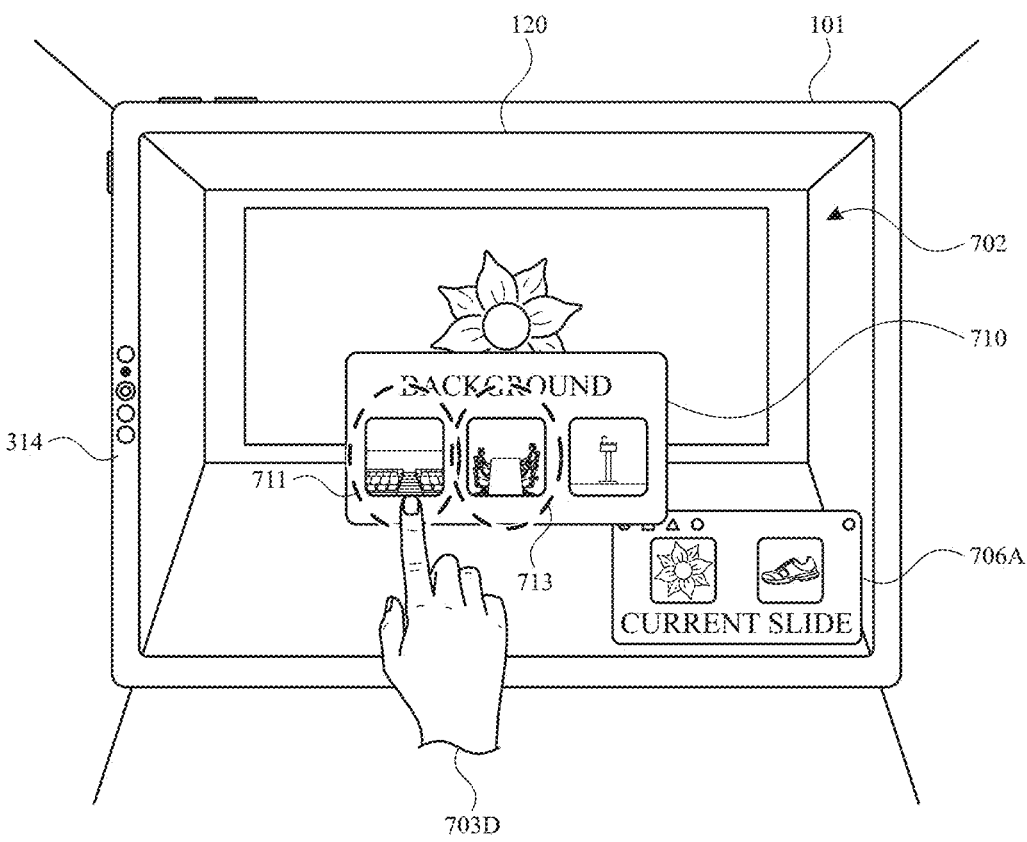

Returning to the example of FIG. 7A, in some embodiments, the computer system 101 facilitates the display of one or more rehearsal virtual environments (e.g., such as described in more detail with reference to method 800). A rehearsal virtual environment refers to a three-dimensional environment displayed by the computer system that mimics a real-world physical presentation environment. In some embodiments, the computer system facilitates selection by the user of a rehearsal virtual environments via speaker notes user interface 706A. For instance, speaker notes user interface 706A includes one or more selectable options 724 for selecting a rehearsal virtual environment. In some embodiments, in response to detecting selection 705 of selectable option 724 in FIG. 7A, the computer system 101 displays a rehearsal virtual environment selection user interface 710 as shown in FIG. 7D. In some embodiments, the computer system detects selection of selectable option 724 by detecting the user's hand 703A providing an air pinch gesture while the attention of the user 708 is directed to the selectable option 724.

As illustrated in FIG. 7D, in response to detecting selection of selectable option 724, the computer system 101 displays rehearsal virtual environment selection user interface 710 in the three-dimensional environment 702. In some embodiments, rehearsal virtual environment selection user interface 710 includes one or more selectable options for selecting a rehearsal virtual environment from one or more pre-determined rehearsal virtual environments stored on the computer system. One or more of the pre-determined rehearsal virtual environments optionally correspond to a representation of a real-world physical environment. For instance, the pre-determined rehearsal virtual environments include, but are not limited to, a conference room, a lecture hall, and/or an auditorium. In some embodiments, rehearsal virtual environment selection user interface 710 includes a visual indicator associated with a pre-determined rehearsal virtual environment that is available for selection on the computer system 101. For instance, the visual indicator includes an image associated with the pre-determined rehearsal virtual environment (e.g., a picture of a conference room associated with the conference room rehearsal virtual environment). One or more of the visual indicators associated with a pre-determined rehearsal virtual environment included in rehearsal virtual environment selection user interface 710 is optionally selectable such that in response to detecting one of the selectable visual indicators, the computer system 101 displays the rehearsal virtual environment associated with the selected option. For instance, in response to detecting selection 711 of the visual indicator associated with the auditorium rehearsal virtual environment, the computer system 101 displays an auditorium rehearsal virtual environment as illustrated in FIG. 7E. In some embodiments, the computer system 101 detects selection 711 of the selectable option by detecting the user's hand 703D providing an air pinch gesture while the attention of the user 708 is directed to the selectable option.

FIG. 7E illustrates an exemplary auditorium rehearsal virtual environment. In some embodiments, the computer system 101 displays auditorium rehearsal virtual environment within the three-dimensional environment 702. The auditorium rehearsal virtual environment includes a visual appearance that mimics a real-world auditorium in which a real-world presentation could be presented. For instance, the auditorium rehearsal virtual environment includes seats and stairs as illustrated in FIG. 7E. In some embodiments, the computer system 101 initially displays a rehearsal virtual environment such as the auditorium rehearsal virtual environment of FIG. 7E in a "presenter viewpoint." The presenter viewpoint refers to a viewpoint that a presenter standing at the front of the auditorium and facing an audience would see in a real-world physical auditorium. Thus, in some embodiments, and as illustrated in the overhead view, the auditorium rehearsal virtual environment is displayed such that from the viewpoint of user 708, the virtual presentation 704B is behind the user 708 while the speaker notes user interface 706B is in front of the user. In some embodiments, the auditorium rehearsal environment is displayed such that the viewpoint of the user is facing the audience and the speaker notes 706B, while the virtual presentation 704B is behind the user's viewpoint. In some embodiments, in response to detecting that the user has turned their head in the physical space, the computer system 101 updates the orientation of the user's viewpoint thereby displaying different perspectives of the auditorium rehearsal virtual environment.

Figure 7F:
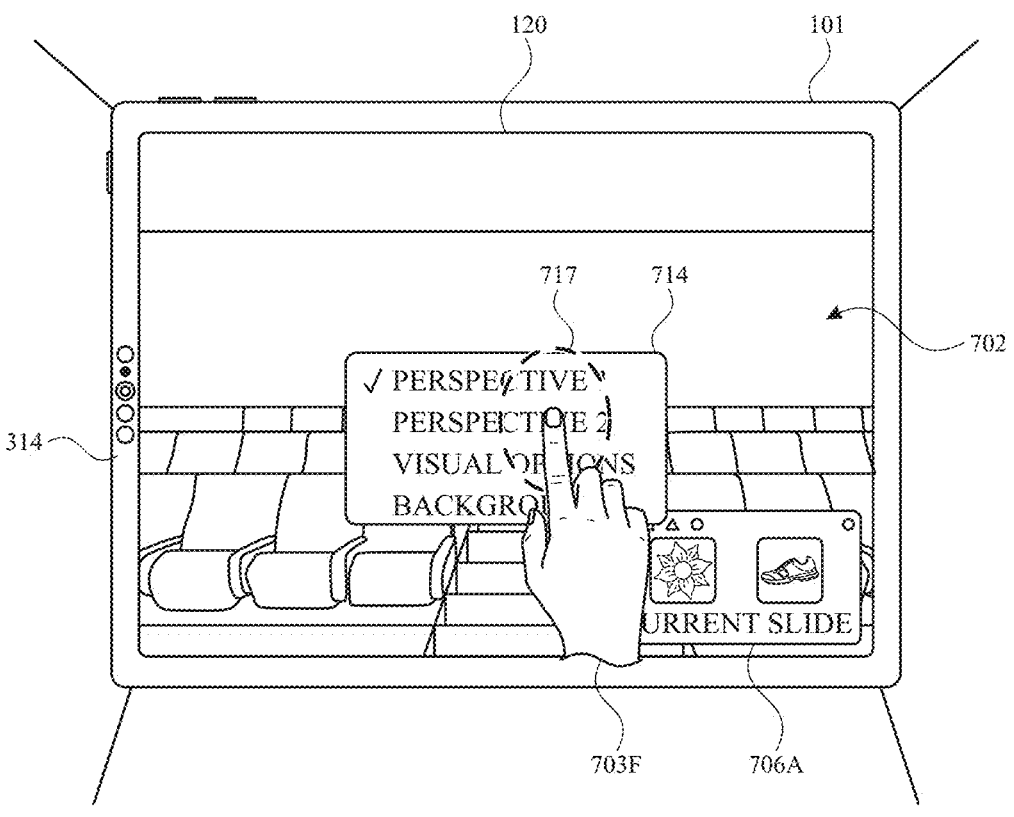

In some embodiments, the computer system 101 facilitates changing the viewpoint from which a rehearsal virtual environment is displayed. For instance, in addition to displaying the rehearsal virtual environment from the presenter viewpoint as described above, the computer system 101 can display the rehearsal virtual environment from alternative viewpoints including but not limited to an "audience viewpoint." In some embodiments, the audience viewpoint refers to a viewpoint that an audience member sitting in the auditorium and facing the virtual presentation would see in a real-world physical auditorium. In some embodiments, the computer system 101 facilitates changing the viewpoint of a rehearsal environment by displaying one or more selectable options for changing the viewpoint of the rehearsal virtual environment. For instance, in response to detecting selection 715 of selectable option 726 included at speaker notes 706A in FIG. 7E, the computer system 101 displays rehearsal virtual environment settings user interface 714 as illustrated in FIG. 7F.

In some embodiments, virtual environment settings user interface 714 includes one or more selectable options for adjusting one or more settings associated with the rehearsal virtual environment. For example, rehearsal virtual environment settings user interface includes selectable options for changing the viewpoint, light settings, and audio settings associated with the rehearsal virtual environment. In some embodiments, the light settings refer to the brightness of the rehearsal virtual environment. In some embodiments, the audio settings refer to how audio is presented in the virtual environment (e.g., volume, treble, bass, etc.) In some embodiments, in response to detecting selection 717 of virtual environment settings user interface 714, the computer system 101 displays the rehearsal virtual environment from a different viewpoint as illustrated in FIG. 7G. In some embodiments, the computer system 101 detects selection 717 of the selectable option by detecting the user's hand 703F providing an air pinch gesture while the attention of the user 708 is directed to the selectable option.

FIG. 7G illustrates the auditorium rehearsal virtual environment displayed from the audience viewpoint (described above). In some embodiments, and as illustrated in overhead view FIG. 7F, when displaying the rehearsal virtual environment from the audience viewpoint, both the virtual presentation 704B and the speaker notes 706B are displayed in front of the viewpoint of the user 708. In some embodiments, the user can modify the viewpoint by changing position, as described with respect to FIG. 7B. Thus, optionally, the user 708 can modify the viewpoint to view the virtual environment from the perspective from a specific audience position (e.g., seat) in the virtual environment.

Referring back to the example of FIG. 7D, in response to detecting selection 713 of the selectable option of rehearsal virtual environment selection user interface 710 associated with a conference room rehearsal virtual environment, the computer system 101 displays a conference room rehearsal virtual environment as illustrated in FIG. 7H. In some embodiments, the conference room rehearsal virtual environment is configured to have the visual appearance of a real-world conference room. For instance, as illustrated in FIG. 7H, the conference rehearsal virtual environment includes a conference table and chairs that are displayed in front of the viewpoint of the user. In some embodiments, the viewpoint associated with the conference room rehearsal virtual environment includes displaying the virtual presentation 704A and the speaker notes user interface 706A in front of the viewpoint of the user as further illustrated in the overhead view of FIG. 7H. Similar to the example of the auditorium rehearsal environment, the viewpoint of the conference room rehearsal virtual environment can also be changed/modified according to the methods described above. In some embodiments, in response to detecting that the user has turned their head in the physical space, the computer system 101 updates the orientation of the user's viewpoint thereby displaying different perspectives of the auditorium rehearsal virtual environment. In comparison to the auditorium rehearsal virtual environment, the conference room rehearsal virtual environment is spatially smaller and thus, the virtual presentation 704A appears closer to the viewpoint of the user 708 than it does in the audience viewpoint of the auditorium rehearsal virtual environment.

Figure 7I:
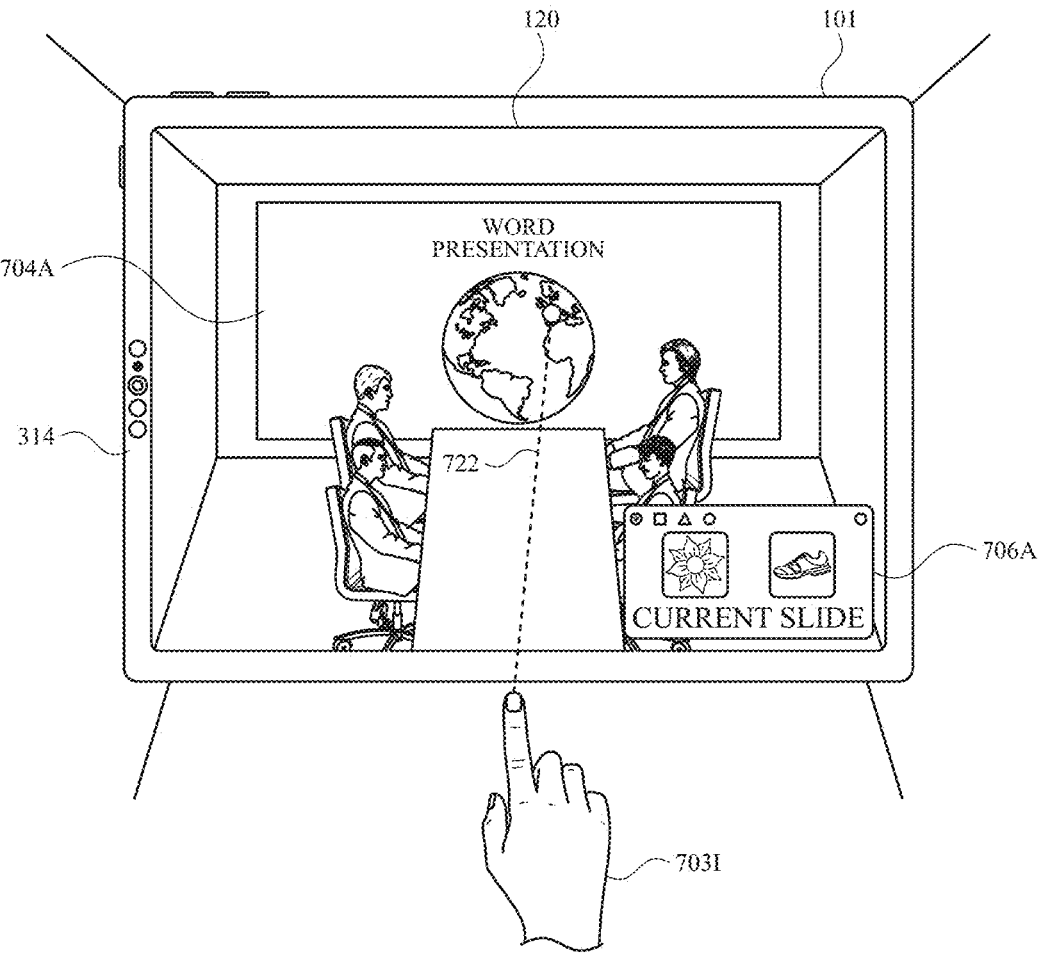

In some embodiments, the speaker notes user interface 706A, in addition to facilitating navigation of the virtual presentation and rehearsal environments as described above, can also include one or more selectable tools for interacting with the virtual presentation in the rehearsal virtual environment. For instance, the speaker notes user interface 706A, as illustrated in FIG. 7H, includes a selectable option 728 for engaging a virtual laser pointer. In some embodiments, and in response to detecting selection 719 of selectable option 728, the computer system 101 displays a virtual laser pointer that is moveable by the user as illustrated in FIG. 7I. In some embodiments, the computer system 101 detects selection 719 of selectable option 728 by detecting the user's hand 703F providing an air pinch gesture while the attention of the user 708 is directed to the selectable option 728.

Figure 7J:
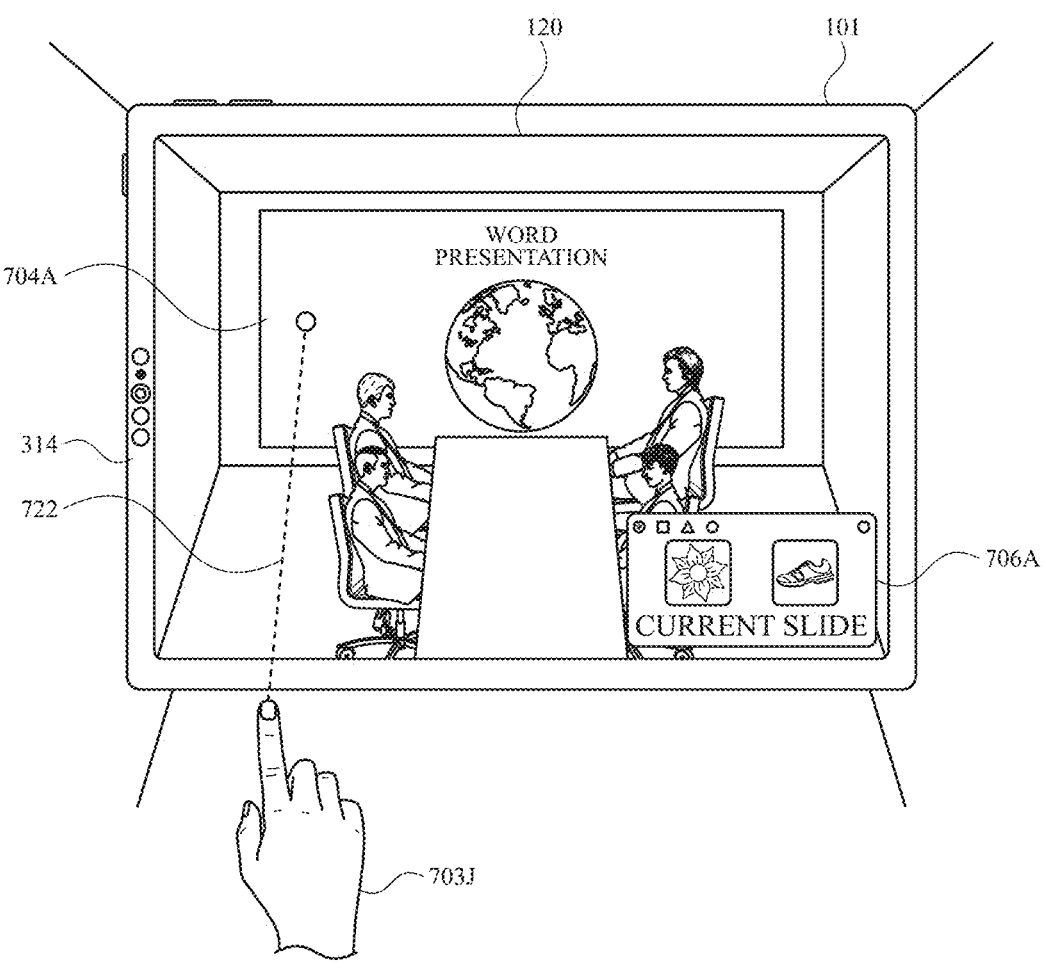

As illustrated in FIG. 7I, the computer system 101 displays a virtual laser pointer 722 in response to the selection 719 of selectable option 728. In some embodiments, the computer system 101 displays a visible line from the user's viewpoint (and/or as if emanating from a hand or finger of the user) to a portion of the virtual presentation when the virtual laser pointer is activated. Additionally or alternatively, the computer system 101 displays a dot on the presentation at a location where the line would hit the virtual presentation. In some embodiments, the position of the visible line and/or dot within the rehearsal virtual environment is modified when the computer system 101 detects movement of a portion of the user's body (such as movement of the user's hand). In some embodiments, the position/orientation of the line and/or dot corresponds to the position and or orientation of the user's hand. For instance, and as illustrated in FIG. 7J, if the user's hand 703J is detected as moving to the left, then the position of the visible line will also move to the left commensurate with the detected motion of the user's hand. Additionally or alternatively, a visible point is displayed on the virtual presentation at a location that is based on a position of the portion of the user's body thereby visually indicating that the virtual laser pointer is pointed at the specific portion of the virtual presentation. In some embodiments, the line is generated as if it is extending through/from the forearm of the user and out of the palm or other portion of the user's hand. In some embodiments, and while the virtual laser pointer is engaged by the user, the computer system 101 does not navigate through the slides of the virtual presentation in response to detecting an air pinch and drag gesture while the attention of the user is directed to the virtual presentation. Optionally, such air gestures directed to the speaker notes 706A will cause the slides of the virtual presentation 704A to advance or reversed depending on the detected motion of the user's hand.

FIG. 8 is a flow diagram illustrating a process for displaying virtual environments associated with a presentation application in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a handheld input device, such as a remote control or stylus.

In some embodiments, while displaying, via the display generation component, a virtual presentation associated with a presentation application (such as virtual presentation 704A in FIGS. 7A-7J) in a first three-dimensional environment, wherein the first three-dimensional environment includes a portion of a physical environment of a user of the computer system and the virtual presentation is presented in a first mode of the presentation application, the computer system receives (802a), via the one or more input devices, a first input (e.g., an air pinch, a gaze, a tap on a touchscreen) corresponding to a request to display the virtual presentation in a second mode of the presentation application such as in FIG. 7D, different from the first mode of the presentation application. In some embodiments, the first three-dimensional environment at least partially incorporates a representation of the real-world physical environment of the user while using the computer system (e.g., via active or passive passthrough). In some embodiments, presenting the virtual presentation in the first mode of the presentation application includes presenting the virtual presentation in the three-dimensional environment that includes a portion of the physical environment of the user. Optionally, when in the first mode, the virtual presentation is editable by the user. Additionally or alternatively, when in the first mode, the virtual presentation is displayed as a slide show and is not editable by the user. In some embodiments, the first input corresponding to the request to display the virtual presentation in the second mode is detected by the device via a selectable option presented in a user interface displayed in the first three-dimensional environment while the presentation application is in the first mode. In some embodiments, the second mode includes displaying the virtual presentation in a rehearsal virtual environment (described in further detail below). Optionally, the rehearsal environment is configured to emulate a real-world physical environment in a virtual three-dimensional environment.

In some embodiments, in response to receiving the first input (802b), the computer system initiates (802c) a process to display the virtual presentation in a respective (optionally rehearsal) virtual environment such as in FIG. 7E, different from the first three-dimensional environment, wherein while displaying the virtual presentation in the respective (optionally rehearsal) virtual environment, the portion of the physical environment of the user is not visible via the display generation component. In some embodiments, the three-dimensional environment is an extended reality (XR) environment, such as a virtual reality (VR) environment, a mixed reality (MR) environment, or an augmented reality (AR) environment, and the virtual presentation is displayed within the three-dimensional environment. In some embodiments, displaying the virtual presentation in the first mode of presentation includes displaying the virtual presentation at less than full immersion. A level of immersion includes an associated degree to which the virtual content displayed by the computer system obscures background content (e.g., the three-dimensional environment including the physical environment) around/behind the virtual content—the background content is optionally virtual content and/or a representation of the physical environment of the user—optionally including a number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the virtual content (e.g., 33% of the field of view consumed by the virtual content at low immersion, 66% of the field of view consumed by the virtual environment at medium immersion, and/or 100% of the field of view consumed by the virtual content at high immersion). In some embodiments, at a first (e.g., high) level of immersion, the background, virtual and/or real objects are displayed in an obscured manner. For example, respective virtual content with a high level of immersion is displayed without concurrently displaying the background content (e.g., in a full screen or fully immersive mode). In some embodiments, at a second (e.g., low) level of immersion, the background, virtual and/or real objects are displayed in an unobscured manner (e.g., not dimmed, not blurred, and/or not removed from display). For example, virtual content with a low level of immersion is optionally displayed concurrently with the background content, which is optionally displayed with full brightness, color, and/or translucency. As another example, virtual content displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, the rehearsal virtual environment is displayed at full immersion. In some embodiments, the rehearsal virtual environment includes a virtual three-dimensional representation of a physical environment in which the virtual presentation could be presented. For instance, example rehearsal virtual environments include a virtual conference room, a virtual auditorium, and a virtual classroom. In some embodiments, the computer system displays a user interface that includes multiple selectable options, with each selectable option corresponding to a type of rehearsal virtual environment. When the device detects that user has selected one of the selectable options, the device optionally displays the rehearsal virtual environment associated with the selectable option selected by the user. Additionally or alternatively, in some embodiments, initiating the process to display the virtual presentation in the respective rehearsal virtual environments includes ceasing to display the first three-dimensional environment, and displaying a second three-dimensional environment (e.g., the rehearsal virtual environment) associated with the selectable option that was selected by the user as detected at the computer system. Optionally, ceasing to display the first three-dimensional environment includes ceasing to display the portion of the physical environment of the user. For instance, in response to the first input, the computer system ceases to display (either actively or passively) the physical environment of the user and initiates the process to display a fully virtual three-dimensional environment based on the detected input. In some embodiments, the rehearsal virtual environment is displayed so that the virtual presentation appears behind the viewpoint of the user (e.g., outside of the field of view of the viewpoint of the user) of the computer system. Optionally, the rehearsal virtual environment is displayed so that the virtual presentation appears in front of the viewpoint of the user (e.g., inside the field of view of the viewpoint of the user) of the computer system. Optionally, while in the second mode, the device causes the presentation to not be editable by a user of the device. Displaying rehearsal virtual environments when selected by the user allows for the device to minimize the amount of time rendering fully virtual environments, thereby conserving computing resources of the computing system.

In some embodiments, in response to receiving the first input, the computer system displays, via the display generation component, a (optionally rehearsal) virtual environment selection user interface for selecting one or more pre-determined (optionally rehearsal) virtual environments of the presentation application such as interface 710 in FIG. 7D. In some embodiments, the rehearsal virtual environment selection user interface includes an image and/or other identifying information associated with each pre-determined rehearsal virtual environment of the one or more pre-determined rehearsal virtual environments that are selectable. Examples of pre-determined rehearsal virtual environments include, but are not limited to, an auditorium, a conference room, and a lecture hall.

In some embodiments, while displaying the (optionally rehearsal) virtual environment selection user interface, the computer system receives, via the one or more input devices, a second input corresponding to a selection of a (optionally rehearsal) virtual environment of the one or more pre-determined (optionally rehearsal) virtual environments such as user input 711 in FIG. 7D. In some embodiments, the device detects the selection (e.g., a tap or air gesture/pinch) of the identifying information associated with a pre-determined rehearsal virtual environment.

In some embodiments, in response to receiving the second input, the computer system displays the virtual presentation in the selected (optionally rehearsal) virtual environment of the one or more (optionally rehearsal) virtual environments such as in FIG. 7E. In some embodiments, once the device has detected selection of one of the selectable options of the rehearsal virtual environments, the device ceases to display the current three-dimensional environment in which the virtual presentation is displayed and instead displays a three-dimensional environment that is associated with the selected pre-determined rehearsal virtual environment. In some examples, the virtual presentation when first displayed in the selected rehearsal virtual environment is presented in an editing mode, wherein the user is able to edit the contents of the presentation. Alternatively, the virtual presentation is displayed in a presentation mode, wherein the user is not able to edit the contents of the virtual presentation. Providing pre-determined rehearsal virtual environments, reduces the need for the user to create custom virtual environments in which to present a virtual presentation, thereby preserving both computing resources and memory resources associated with creating custom rehearsal virtual environments.

In some embodiments, the computer system displays the virtual presentation in the selected pre-determined (optionally rehearsal) virtual environment includes displaying the selected pre-determined (optionally rehearsal) virtual environment from a viewpoint corresponding to a presenter viewpoint in the selected pre-determined (optionally rehearsal) virtual environment such as in FIG. 7E. In some embodiments, the presenter viewpoint includes displaying the rehearsal environment from the perspective of the presenter of the virtual presentation, such that the virtual audience of the virtual presentation is in front of the user while the virtual presentation is placed behind the viewpoint of the user, thereby simulating a real-world scenario in which a presenter is presenting a presentation to an audience. In some embodiments, while initially in the presenter viewpoint, the device detects movement of the user's viewpoint/perspective in the rehearsal virtual environment and adjusts the viewpoint of the virtual environment accordingly. Thus, if the rehearsal virtual environment is displayed at the presenter viewpoint and the computing system detects the user has turned around or has moved in their physical space so that their viewpoint has changed to face the virtual presentation, the computing system will display the virtual presentation in front of the user, and the audience will be behind the user. Displaying the presentation initially in the presenter viewpoint when initially displaying a rehearsal virtual environment reduces the likelihood that the user will need to change the viewpoint once the rehearsal virtual environment is displayed thereby conserving both computing resources and memory resources of the computer system.

In some embodiments, displaying the virtual presentation in the selected pre-determined (optionally rehearsal) virtual environment in response to the second input includes displaying, via the display generation component, a virtual environment settings user interface for changing one or more settings associated with the selected pre-determined (optionally rehearsal) virtual environment such as user interface 714 in FIG. 7F. In some embodiments, the virtual environment settings user interface includes one or more selectable options for changing one or more settings associated with the rehearsal environment. For instance, when the device detects selection of a selectable option included in the virtual environment settings user interface, the device modifies an aspect of the rehearsal virtual environment associated with the selectable option. In some embodiments, the settings user interface includes selectable options to change an appearance of the rehearsal virtual environment, the audio presented in the rehearsal virtual environment, as well as viewpoint of the rehearsal virtual environment. In some embodiments, the settings user interface is displayed automatically when the device initially displays the rehearsal virtual environment. Additionally or alternatively, the settings user interface is displayed in response to the device detecting an input from the user. Displaying a settings user interface in the rehearsal virtual environment minimizes the amount of user input required to modify the rehearsal environment thereby conserving computing resources associated with modification of the rehearsal environment.

In some embodiments, while displaying the virtual environment settings user interface, the computer system receives, via the one or more input devices, a third input directed to the virtual environment settings user interface to change one or more virtual light settings associated with the selected pre-determined (optionally rehearsal) virtual environment. In some embodiments, in response to receiving the third input to change the one or more virtual light settings, the computer system adjusts a virtual lighting characteristic of the selected pre-determined (optionally rehearsal) virtual environment in accordance with the third input such as if the device detected selection of the "visual options" selectable option illustrated in FIG. 7F as part of user interface 714. In some embodiments, the virtual light settings include a brightness (e.g., a virtual light characteristic) of the rehearsal virtual environment associated with an amount of lighting present in the rehearsal virtual environment. In some embodiments, the device detects a modification of the light settings of the rehearsal virtual environment and modifies the brightness of the virtual environment in accordance with the detected modification. For instance, the device modifies the brightness of the virtual environment by adjusting an intensity of one or more virtual lights in the rehearsal virtual environment, thereby adjusting the overall brightness of the rehearsal virtual environment. In some embodiments, the location of the one or more virtual lights is based on a real-world physical environment associated with the rehearsal virtual environment. Including light settings as part of the virtual environment settings user interface minimizes the amount of user input required to modify light settings of the rehearsal virtual environment, thereby conserving computing resources associated with modification of the rehearsal environment.

In some embodiments, while displaying the virtual environment settings user interface, the computer system receives, via the one or more input devices, a third input corresponding to a request to change a viewpoint of the selected pre-determined (optionally rehearsal) virtual environment to be a presenter viewpoint such as in FIG. 7F. In some embodiments, in response to receiving the third input, and in accordance with a determination that the (optionally rehearsal) virtual environment is displayed from a viewpoint that is different from the presenter viewpoint, the computer system displays the selected pre-determined (optionally rehearsal) virtual environment from the presenter viewpoint, wherein displaying the selected pre-determined (optionally rehearsal) virtual environment from the presenter viewpoint includes placing the virtual presentation behind the viewpoint of the user in the selected (optionally rehearsal) virtual environment such as in FIG. 7E. In some embodiments, the virtual environment settings user interface includes a selectable option to display the rehearsal virtual environment from a presenter viewpoint (described in detail above). In some embodiments, and in the event that rehearsal virtual environment is not already in the presenter viewpoint (described in detail above), the device detects selection of the selectable option associated with displaying the rehearsal virtual environment in the presenter viewpoint and modifies the viewpoint of the rehearsal virtual environment in accordance with the presenter viewpoint described above. Including a selectable option on the virtual environment settings interface to display the rehearsal virtual environment in the presenter viewpoint minimizes the amount of user input required to modify the viewpoint of the rehearsal environment thereby conserving both computing resources and memory resources of the computer system.

In some embodiments, while displaying the virtual environment settings user interface, the computer system receives, via the one or more input devices, a fourth input corresponding to a request to change a viewpoint of the selected pre-determined (optionally rehearsal) virtual environment to be an audience viewpoint such as the user input 717 applied to user interface 714 in FIG. 7F. In some embodiments, in response to receiving the fourth input, and in accordance with a determination that the (optionally rehearsal) virtual environment is displayed from a viewpoint that is different from the audience viewpoint, the computer system displays the selected pre-determined (optionally rehearsal) virtual environment from the audience viewpoint, wherein displaying the selected pre-determined (optionally rehearsal) virtual environment from the audience viewpoint includes displaying the virtual presentation in front of the viewpoint of the user in the selected (optionally rehearsal) virtual environment. In some embodiments, the virtual environment settings user interface includes a selectable option to display the rehearsal virtual environment from an audience viewpoint. In some embodiments the audience viewpoint includes displaying the virtual presentation at a location that is in front of the user (from the viewpoint of the user) so as to emulate how a member of the audience of the virtual presentation would view the presentation as it was being presented. In some embodiments, and in the event that rehearsal virtual environment is not already in the audience viewpoint, the device detects selection of the selectable option associated with displaying the rehearsal virtual environment in the audience viewpoint and modifies the viewpoint of the rehearsal virtual environment in accordance with the audience viewpoint described above. Including a selectable option on the virtual environment settings interface to display the rehearsal virtual environment in the audience viewpoint minimizes the amount of user input required to modify the viewpoint of the rehearsal environment thereby conserving both computing resources and memory resources of the computer system.

In some embodiments, the virtual environment settings user interface includes one or more interactable options that are interactable in response detecting input from a first portion of the user while attention of the user is directed to the selectable option such as if user interface 714 illustrated in FIG. 7F was interactable. In some embodiments, the virtual environment settings user interface can be navigated using the user's gaze and/or using one or more air gestures such as an air pinch (described above). For instance, in order to select a selectable option on the settings user interface, the device can detect that the user is performing an air pinch while gazing at the selectable option. The computing system on which the presentation application is being executed optionally includes components that are able to detect a user's real-world movements and gaze (described above) and when the computing system determines that the user is interacting with the virtual environment settings user inter-face, the system performs an action commensurate with the detected interaction. Detecting input from a portion of the user while the attention of the user is directed to a selectable option, minimizes the number of input devices required to receive input from the user and minimizes the likelihood of erroneous user input, thereby conserving computing resources associated with administering input devices and correcting erroneous input.

In some embodiments, while displaying the virtual set-tings user interface in an expanded state, the computer system receives, via the one or more input devices, a third input directed to the virtual settings user interface, wherein the third input includes input from a first portion of the user directed to a first portion of the virtual settings user interface followed by movement of the first portion of the user in a downward direction such as if user interface 714 of FIG. 7F were interactable and the user minimized or collapsed the user interface. In some embodiments, the virtual settings user face is interactable to expand and minimize the user interface. In some embodiments, the interactions include detecting the user pinching and puling the user interface while gazing at a portion of the settings user interface that is visible so as to expand and minimize the interface. For instance, if the virtual settings user interface is minimized and the computing system detects the user gazing at and pinching and pulling up the user interface, then the com-puting system expands the user settings interface to display the one or more selectable/interactable options associated with the interface. Optionally, if the virtual settings user interface is expanded and the computing system detects the user pinching and pulling down the user interface, then the computing system minimizes the user settings interface thereby ceasing to display at least some or all of the selectable/interactable options associated with the interface. Allowing the user to expand and minimize the virtual environment settings user interface, ensures that portions of the rehearsal virtual environment are not obscured or cov-ered by the interface when the user tries to interact with those portions, thereby minimizing erroneous user input and conserving computing system resources associated with correcting erroneous user input.

In some embodiments, while displaying the virtual envi-ronment settings user interface, the computer system receives, via the one or more input devices, a third input to activate a virtual laser pointer in the selected (optionally rehearsal) virtual environment such as input 728 on speaker notes interface 706A in FIG. 7H. In some embodiments, in response to receiving the third input to activate the virtual laser pointer, the computer system displays, via the display generation component, a virtual laser point such as in FIG. 7I, wherein virtual laser pointer moves within the selected (optionally rehearsal) virtual environment in accordance with a detected movement of a first portion of the user such as in FIG. 7J. In some embodiments a virtual laser when activated displays a visible line from the user's viewpoint to a portion of the virtual presentation. Additionally or alter-natively, the device does not display a visible line, and instead displays a dot on the presentation at a location where the line would hit the virtual presentation. In some embodi-ments, the position of the visible line is modified when the device detects movement of a portion of the user's body (such as movement of the user's hand). For instance if the user's hand is detected as moving to the left, then the position of the visible line will also move to the left commensurate with the detected motion of the user's hand. Additionally or alternatively, a visible point is displayed on the virtual presentation at a location that is based on a position of the portion of the user's body thereby visually indicating that the virtual laser pointer is pointed at the specific portion of the virtual presentation. In some embodi-ments, the line is generated as if it is extending through/from the forearm of the user and out of the palm or other portion of the user's hand. In some embodiments, the one or more visual indicators associated with the virtual laser pointer (e.g., the visible line and the visible point) are displayed according to how a real-world physical laser point would appear when presenting a real-world presentation. In some embodiments, while the virtual laser pointer is engaged by the user, the virtual laser can be moved independent of the state of the hand of the user (e.g., the hand of the user can be in "ready state" or another state or hand shape). In some embodiments, when the hand is detected as being pinched by the device, the device displays the virtual laser pointer line with a higher visual prominence than when the hand is detected as not being pinched. Providing a virtual laser pointer allows the computing device to more closely mimic how a presentation would be presented in a real-world setting and by providing a selectable option on the virtual environment settings user interface to activate the virtual laser pointer minimizes the amount of user input required to activate the virtual laser pointer, thereby minimizing erro-neous user input, and thus conserving computing resources associated with correcting erroneous user input.

In some embodiments, the computer system receives, via the one or more input devices, a fourth input including an air gesture from the first portion of the user directed to the virtual presentation. In some embodiments, in response to detecting the fourth input, in accordance with a determina-tion that the virtual laser pointer is not activated, the computer system navigates through the virtual presentation in accordance with the fourth input such as in FIG. 7B. In some embodiments, in accordance with a determination that the virtual laser point is activated, the computer system forgoes navigating through the virtual presentation in accor-dance with the fourth input. In some embodiments, and as the virtual laser pointer is moved in the rehearsal virtual environment by detecting movement of a portion of the user's body, the device prevents the user from using air gestures to navigate through the virtual presentation so as to minimize any errors associated with the user intending to move the virtual laser pointer and instead interpreting the movement as navigating the content of the virtual presen-tation. For instance, when the virtual laser pointer is not engaged, the user navigates the presentation by gazing at the virtual presentation or the speaker notes associated with the virtual presentation, performing an air gesture such as an air pinch, and drag in a given direction. However, when the virtual laser pointer is engaged, the user will be unable to navigate the presentation using the above described gestures (e.g., the computer system will not navigate through the virtual presentation in response to detecting such gestures while the laser pointer is engaged). In some embodiments, when the virtual laser pointer is not activated, any air gestures detected by the computer system are interpreted as a request to navigate the content of the virtual presentation since the likelihood of mischaracterization of the user's movement is minimized. Preventing users from using air gestures to navigate the content of a virtual presentation when a virtual laser pointer is activated, minimizes the likelihood of misinterpreting air gestures by the device and thereby conserves computing resources associated with cor-recting any misinterpretations of air gestures.

In some embodiments, displaying the virtual presentation in the respective (optionally rehearsal) virtual environment includes, in accordance with a determination that the virtual presentation is in a presentation mode, displaying, via the display generation component, a speaker notes user interface for displaying information associated with the virtual presentation such as speaker notes user interface 706A in FIG. 7A. In some embodiments, when the device detects that the virtual presentation is in a presentation mode, the virtual presentation is displayed in a non-editable format so as to emulate a real-world scenario in which the presentation would be delivered. In a real-world scenario, the presenter may have speaker notes available to them that they can reference to provide information about the presentation (such as the content of the slides of the presentation) and other notes that the presenter doesn't want an audience to view. In some embodiments, the speaker notes user interface includes one or more visual representations of the slides associated with a virtual presentation. In order to further emulate a real-world presentation, the device displays a speaker notes user interface that displays information similar to the information that would be available to a presenter using real-world speaker notes. In some embodiments, and as described in further detail below, the speaker notes user interface includes one or more interactable/selectable options that when selected causes the device to advance or reverse the slide being displayed on the virtual presentation. Providing a speaker notes user interface that the user can interact with the advance and reverse slides on the virtual presentation minimizes erroneous user input associated with not being able to view content of the presentation other than the slide that is being displayed on the virtual presentation thereby conserving computing resources associated with correcting erroneous user input.

In some embodiments, the speaker notes user interface is displayed at a location within the respective (optionally rehearsal) virtual environment that is different than a location at which the virtual presentation is displayed within the respective (optionally rehearsal) virtual environment such as in FIG. 7A. In some embodiments, the speaker notes are placed in a location that is different from a location where the virtual presentation is being displayed in the rehearsal virtual environment so as to prevent the speaker notes user interface from occluding any portions of the virtual presentation. By placing the speaker notes user interface in a location that different from the location of the virtual presentation in the rehearsal virtual environment, the user is able to view the speaker notes and the virtual presentation simultaneously in the same manner as they would in a real-world presentation scenario. In some embodiments, the speaker notes user interface is displayed to the side of the virtual presentation, below the virtual presentation, or above the virtual presentation so that the user can view both the virtual presentation and the speaker notes user interface simultaneously without one occluding the other. Additionally or alternatively, the speaker notes user interface is displayed at a location that only partially occludes the virtual presentation, thereby allow the user to view both the speaker notes and the majority of the virtual presentation simultaneously. Displaying the speaker notes user interface in a location that is different from a location where the virtual presentation is displayed in the rehearsal virtual environment minimizes erroneous user input associated with the speaker notes occluding the user's view of the virtual presentation when viewing the speaker notes user interface, and thereby conserving memory and computing resources associated with correcting the erroneous user input.

In some embodiments, while displaying the speaker notes user interface, the computer system receives, via the one or more input devices, a second input from a first portion of the user, including a first air pinch directed to a portion of the speaker notes user interface followed by movement of the first portion of the user. In some embodiments, in response to receiving the second input, the computer system moves the speaker notes user interface within the respective (optionally rehearsal) virtual environment in accordance with the detected movement of the first portion of the user such as if the computer system moved speaker notes 706A in FIG. 7A in response to detecting an air pinch while the attention of the user was directed to speaker notes 706A followed by movement of the user's hand. In some embodiments, while the speaker notes user interface is initially displayed in a location within the rehearsal virtual environment that is different from the location of the virtual presentation so that the user can view both the speaker notes user interface and the virtual presentation simultaneously, the speaker notes are moveable within the rehearsal virtual environment. In some embodiments, the speaker notes user interface is moved when the device detects the user gazing at the speaker notes user interface, and performing an air pinch directed to a portion of the speaker notes user interface and detects subsequent movement of a portion of the user's body (such as the user's hand). The device moves the location of the speaker notes user interface in accordance with the movement of the portion of the user's body (e.g., in a direction and/or with a magnitude corresponding to a direction and/or magnitude of the movement of the portion of the user's body). Allowing the speaker notes user interface to be moveable within the rehearsal virtual environment allows for user customization of the rehearsal virtual environment with minimal user input and minimal erroneous user input, thus conserving computing resources associated with customization of the rehearsal virtual environment. In some embodiments, while displaying the virtual presentation, the computer system receives, via the one or more input device, a second input from a portion of the user, including a first air gesture from a first portion of the user that includes movement of the first portion in a respective direction. In some embodiments, in response to receiving the second input, in accordance with a determination that the respective direction is a first direction, the computer system navigates through the virtual presentation in a first corresponding direction such as in FIG. 7B.

In some embodiments, in accordance with a determination that the respective direction is a second direction, different from the first direction, the computer system navigates through the virtual presentation in a second corresponding direction, different from the first corresponding directions such as if the user reversed the slide by moving their hand in the opposite direction instead of advancing the slide in FIG. 7A. In some embodiments, the device advances or reverses slides based on detection of an air gesture from a portion of the user's body (such as the user's hands). In some embodiments, if the user's gazed is detected as being directed to the virtual presentation, and while gazing at the presentation, the device detects an air pinch from the user's hand, and if the user's hand is detected (while maintaining the air pinch) moving from left to right, then the device advances the slide being displayed on the virtual presentation (e.g., the next slide in the series of slides associated with virtual presentation). In some embodiments, the slides are not advanced simply due to detected motion of the user's hand. In some embodiments, if the user's hand is detected moving from right to left (e.g., in the opposite direction), the device reverses the slide being displayed on the virtual presentation (e.g., the previous slide in the series of slides associated with the virtual presentation). Using detected air gestures to navigate the content being displayed on a virtual presentation in a rehearsal virtual environment minimizes the number of input devices needed to interact with the virtual presentation, thereby conserving computing resources associated with accepting inputs from multiple input devices.

In some embodiments, the first input is directed to a speaker notes user interface that is displayed concurrently with the virtual presentation in the respective (optionally rehearsal) virtual environment such as in FIG. 7A. In some embodiments, the device advances or reverses the slides displayed on a virtual presentation based on the user's gaze and air gestures (described above) that are directed to the speaker notes user interface. As described above, the speaker notes user interface includes one or more visual representations of the slides associated with a virtual presentation, and thus the device navigates the contents of the virtual presentation (e.g., advance and reverse slides) by detecting air gestures directed to the speaker notes user interface and specifically to the visual representation of the slides included on the speaker notes user interface. Detecting air gestures directed to the speaker notes user interface and displaying a slide on the virtual presentation in accordance with the detected air gesture, allows the device to minimize the number of input devices required to navigate a virtual presentation, thereby conserving computing resources associated with accepting inputs from multiple input devices.

In some embodiments, the first input is directed to the virtual presentation in the respective (optionally rehearsal) virtual environment such as if the user directed the input in FIG. 7A to the virtual presentation 704A in FIG. 7A. In some embodiments, the device advances or reverses the slides displayed on a virtual presentation based on the user's gaze and air gestures (described above) that are directed to the virtual presentation. As described above, the device displays a slide associated with the virtual presentation. In some embodiments, the device navigates the contents of the virtual presentation (e.g., advance and reverse slides) by detecting air gestures directed to the display of the virtual presentation in the rehearsal virtual environment. Detecting air gestures directed to the virtual presentation and displaying a slide on the virtual presentation in accordance with the detected air gesture, allows the device to minimize the number of input devices required to navigate a virtual presentation, thereby conserving computing resources associated with accepting inputs from multiple input devices.

FIGS. 9A-9E illustrate examples of a computer system displaying three-dimensional virtual representations of virtual objects associated with a presentation application in accordance with some embodiments.

Figure 9A:
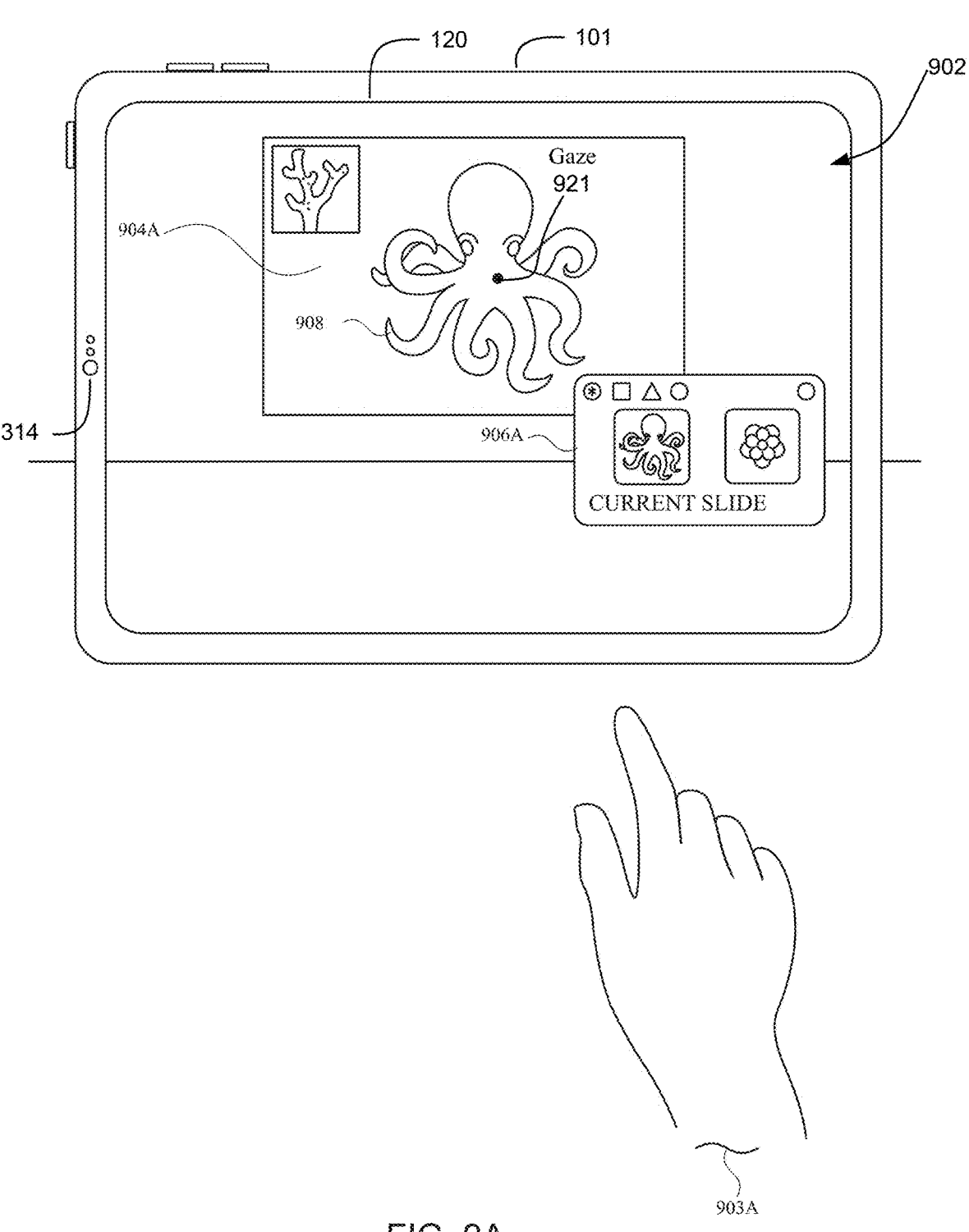

FIG. 9A illustrates a computer system (e.g., an electronic device) 101 displaying, via a display generation component (e.g., display generation component 120 of FIG. 1), a three-dimensional environment 902 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 9A, the computer system 101 displays a virtual presentation 904A (e.g., as described with respect to methods 800 and 1000) in a three-dimensional environment 902 (e.g., corresponding to 904B in the overhead view of the three-dimensional environment 902). In some embodiments, the virtual presentation 904A includes a plurality of virtual slides, with each slide of the virtual presentation including one or more visual content items (e.g., text, photos, etc.) that are displayed within the three-dimensional environment 902. In some embodiments, the slides of the virtual presentation are displayed in the three-dimensional environment one at a time with the user of the computer system controlling which slide of the virtual presentation is being displayed in the three-dimensional environment at any given time.

In some embodiments, and in order to facilitate user control of the virtual presentation, the computer system 101 displays a speaker notes user interface 906A (e.g., corresponding to 906B in the overhead view of the three-dimensional environment 902). Speaker notes user interface 906A includes one or more selectable options for controlling the virtual presentation (described further below). In some embodiments, the virtual presentation 904A is displayed on a three-dimensional or two-dimensional surface that is displayed within the three-dimensional environment 902 as illustrated in FIG. 9A. Thus, the content displayed on the virtual presentation 904A will be displayed in two-dimensions. However, in some embodiments, the virtual presentation 904A includes one or more three-dimensional objects that can be displayed within the three-dimensional environment 902. Since the content of virtual presentation 904A is displayed in two-dimensions, the virtual presentation 904A can include one or more two-dimensional representations of three-dimensional virtual objects that can displayed in three-dimensions in response to inputs from the user in one or more user interfaces associated with the virtual presentation 904A (described in further detail below). For instance, the virtual object 908 displayed as part of virtual presentation 904A (e.g., the octopus) is a two-dimensional representation of a three-dimensional object (displayed from a side perspective of the three-dimensional octopus).

Figure 9B:
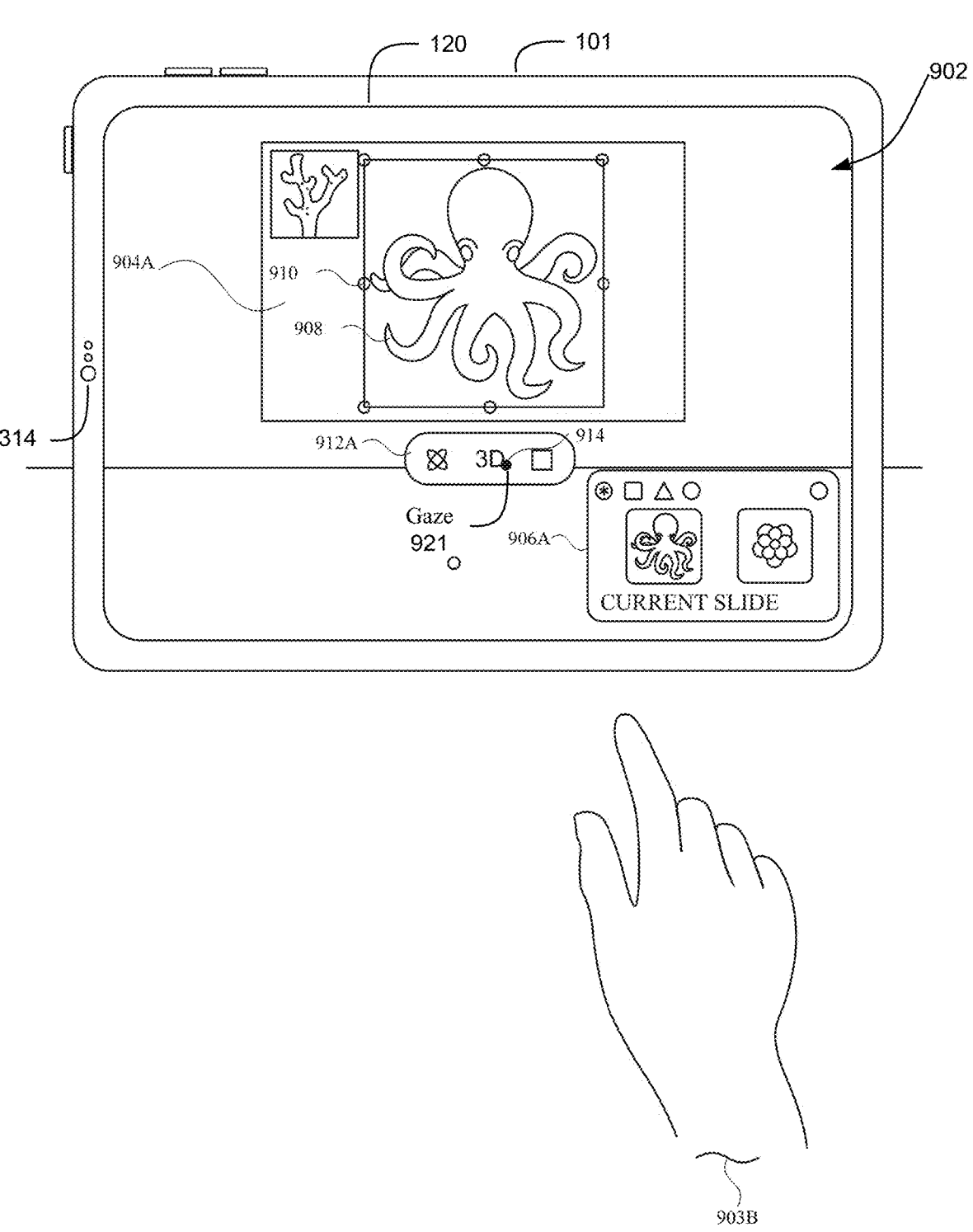

In some embodiments, the computer system 101, in response to detecting certain user inputs, can display the virtual object 908 using a three-dimensional representation alternatively to and/or in addition to the two-dimensional representation of the virtual object 908 displayed on virtual presentation 904A. For instance, in response to detecting the user's hand 903A providing an air pinch gesture while the attention of the user (e.g., gaze 921) is directed to the virtual object 908, as shown in FIG. 9A, the computer system displays a visual indicator at and/or around the virtual object 908 as illustrated in FIG. 9B. In some embodiments, and as illustrated in FIG. 9B, visual indicator 910 is configured to provide a visual representation that the virtual object 908 is a two-dimensional representation of a three-dimensional virtual object that can be displayed using a three-dimensional representation in addition to indicating that the virtual object 908 has been selected. In the event that the user selects a virtual object that is not a three-dimensional virtual object, then optionally no visual indicator will be displayed for the virtual object. In some embodiments, the visual indicator 910 includes a box that surrounds the virtual object as illustrated in FIG. 9B. However, the example of visual indicator 910 should not be seen as limiting, and other visual indicators (such as color, highlighting, or text) can be applied to a three-dimensional virtual object to indicate that the virtual object is a three-dimensional virtual object. In some embodiments, the user can manipulate the virtual object 908 using the visual indicator 910 so as to change the orientation in which the virtual object 908 is displayed on the virtual presentation 904A. For instance, in some embodiments, in response to detecting the user input (e.g., an air pinch gesture while the attention of the user (e.g., gaze 921) is directed to the virtual object 908, and movement of the user's hand 903B), the computer system 101 displays the virtual object 908 in a new orientation commensurate with the detected movement of the user. For instance, the two-dimensional representation of the three-dimensional object is displayed from a new perspective (shown in two-dimensions) based on the user input. In some embodiments, and while the two-dimensional representation (e.g., virtual object 908) is selected, the device facilitates the user performing other manipulations of the displays of the virtual object 908 such as resizing the object, moving the object in the virtual presentation 904A, deleting the virtual object, etc.

In some embodiments, in addition to the displaying the visual indicator 910 at virtual object 908, and in response to the user input described above (e.g., an air pinch gesture while the attention of the user (e.g., gaze 921) is directed to the virtual object 908), the computer system 101 displays a "3D view button" for initiating a process to display a three-dimensional representation of the virtual object 908. In some embodiments, the "3D view button" is displayed as part of a three-dimensional play user interface 912 as illustrated in FIG. 9B that is displayed in response to the user input described above (e.g., an air pinch gesture while the attention of the user (e.g., gaze 921) is directed to the virtual object 908). In some embodiments, three-dimensional play user interface includes the "3D view button" as selectable option 914 on the interface 912. Additionally or alternatively, the computer system 101 displays the "3D view button" on the virtual object. In some embodiments, in response to detecting user input (e.g., an air pinch gesture while the attention of the user (e.g., gaze 921) is directed to the selectable option 914), the computer system 101 displays a three-dimensional representation of virtual object 908 in the three-dimensional environment 902 as illustrated in FIG. 9C.

In some embodiments, and in response to detecting the user input as described above, the computer system displays a three-dimensional representation 916A of virtual object 908 (e.g., corresponding to 916B in the overhead view of the three-dimensional environment 902). As shown in the overhead view of three-dimensional environment, the three-dimensional representation 916B is displayed in front of the virtual presentation 904B at a location that is different than virtual presentation 904B such that the user can simultaneously view both the virtual presentation 904A and the three-dimensional representation 916A. In some embodiments, while the virtual object 908 is displayed inside the presentation (e.g., the three-dimensional representation is not displayed) the virtual object 908 and the virtual presentation 904A are displayed at the same distance from the viewpoint of the user. Optionally, when the three-dimensional representation 916A is displayed, the three-dimensional representation and the virtual presentation 904A are displayed at different distances from the viewpoint of the user. In some embodiments, the computer system 101 displays the three-dimensional representation 916A in the same orientation that the virtual object was displayed in when the user initiated the display of the three-dimensional representation. For example, if the two-dimensional representation corresponded to a first perspective view of the virtual object 908, the three-dimensional representation 916A is displayed such that the view of the object from the current viewpoint of the user is the first perspective view. Optionally, if the two-dimensional representation corresponded to a second perspective view of the virtual object 908 (different from the first perspective view), the three-dimensional representation 916A is displayed such that the view of the object from the current viewpoint of the user is the second perspective view. In some embodiments, the three-dimensional representation can be moved around the three-dimensional environment, however when the three-dimensional view is terminated (described below) the virtual object 908 appears in its original position in the virtual presentation 904A.

Additionally or alternatively, in response to detecting the user input as described above with respect to FIG. 9B the computer system 101 displays one or more user interfaces for providing information about the three-dimensional representation 916A as well as facilitate interaction with the three-dimensional representation, such as shown in FIG. 9C. For instance, in some embodiments, the one or more user interfaces described above include a control user interface 920A (e.g., corresponding to 916B in the overhead view of the three-dimensional environment 902) for controlling the three-dimensional representation 916A. In some embodiments, the control user interface 920A includes one or more selectable options for facilitating user interaction with the three-dimensional representation 916A. For instance, control user interface 920A includes a "close" button to terminate display of the three-dimensional representation 916A. Additionally or alternatively, control user interface 920A includes a "play" button for animating the three-dimensional representation 916A. In some embodiments, and in response to detecting user input directed to the play button (e.g., an air pinch gesture while the attention of the user is directed to the play button), the computer system 101 continuously rotates the three-dimensional representation 916A through different perspective views of the representation 916A. In some embodiments, the control user interface 920A includes an orientation information portion 918A for displaying a numerical or other representation of the three-dimensional orientation of the three-dimensional representation 916A. In some embodiments, orientation information portion 918A numerically or otherwise represents (in degrees) the orientation of the three-dimensional representation 916A along the X, Y, and/or Z axes (e.g., the three-dimensions). In some embodiments, the computer system facilitates user interaction with the orientation information portion 918A so as to change the orientation of the three-dimensional representation 916A. For instance, the numerical representations are editable by the user, and in response to detecting that the numerical representation has been edited by the user, the computer system 101 changes the orientation of the three-dimensional representation commensurate with the edited numerical representation. In some embodiments, and as illustrated in the overhead view of three-dimensional environment of FIG. 9C, the control user interface 920B including orientation information portion 918B are displayed in front of (e.g., closer to the viewpoint of the user) and at a location different from the three-dimensional representation 916A (e.g., relative to the viewpoint of the user) so that the user can view the control user interface and the three-dimensional representation simultaneously. In some embodiments, while the three-dimensional representation 916A is displayed, the virtual object 908 (e.g., the two-dimensional representation on the virtual presentation) is not displayed. Additionally or alternatively, the two-dimensional representation is optionally displayed and updated in accordance with the displayed three-dimensional representation.

In some embodiments, the computer system 101 facilitates changing the orientation at which the three-dimensional representation 916A is displayed via user interaction with the three-dimensional representation. For instance, in response to a user input (e.g., an air pinch gesture while the attention of the user (e.g., gaze 921) is directed to the three-dimensional representation 916A, and movement of the user's hand 903C while engaged in the air pinch), the computer system changes the orientation of the three-dimensional representation 916A as illustrated in FIG. 9D. As illustrated in FIG. 9D, the orientation of three-dimensional representation 916A has been modified by the computer system 101 commensurate with the movement of the user's hand 903C. For instance, as illustrated in FIG. 9D, the three-dimensional representation 916A is now shown from a bottom perspective. In some embodiments, in response to the detecting that the orientation of the three-dimensional object has been changed, the computer system 101 updates orientation portion 918A to display a numerical representation of the new orientation of the three-dimensional representation 916A commensurate with the changed orientation. In some embodiments, the control user interface can include a "revert" button that when selected by the user can revert the orientation of the three-dimensional representation 916A back to the orientation it was in prior to the user's change.

Figure 9E:
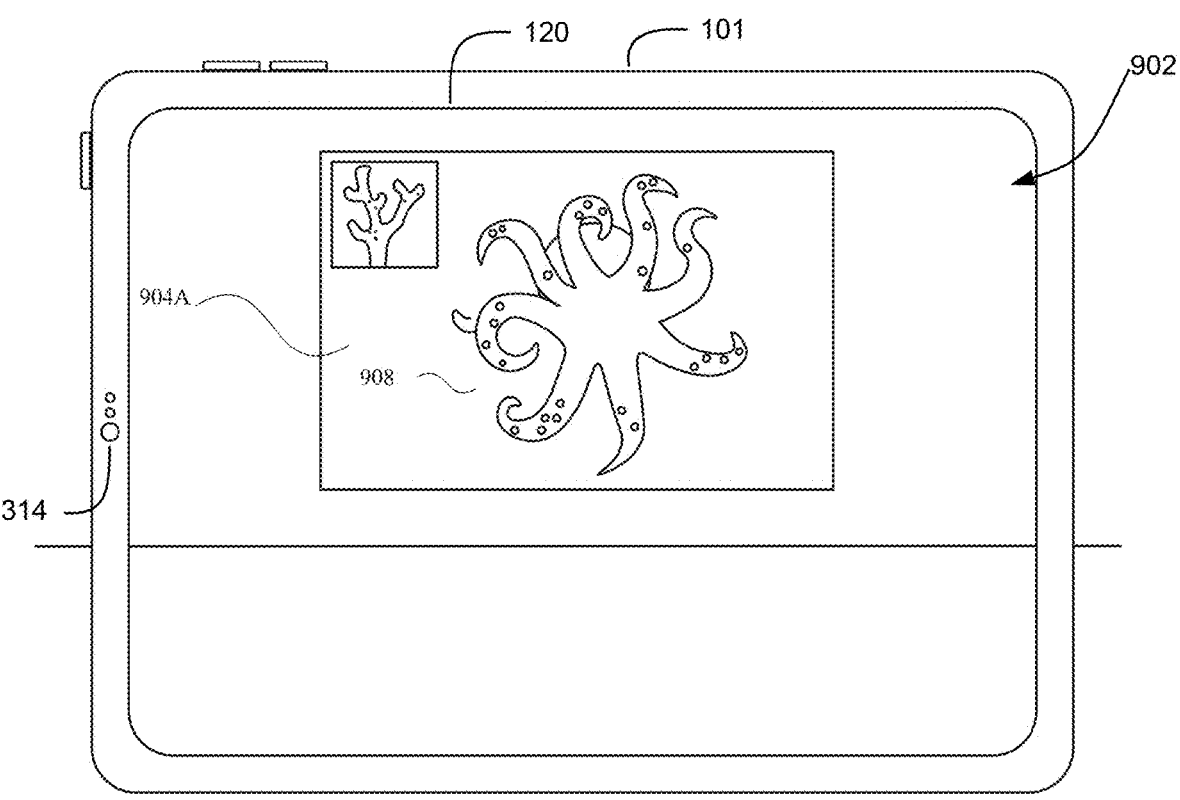

In some embodiments, control user interface 920A includes a selectable option 922 for terminating the display of the three-dimensional representation 916A. In some embodiments, in response to detecting selection of selectable option 922 (e.g., an air pinch gesture while the attention of the user is directed to selectable option 922), the computer system terminates the display of three-dimensional representation 916A as illustrated in FIG. 9E. In some embodiments, and in response to the user's selection of selectable option 922, the computing system displays virtual object 908 (e.g., the two-dimensional representation of the virtual object) in the same orientation that the three-dimensional representation 916A was in at the time that user selected selectable option 922. For instance, and as illustrated in FIG. 9E, the virtual object 908 is now displayed from a bottom perspective since the orientation of the three-dimensional representation 916A was terminated when the representation was displayed in the bottom view perspective. In contrast to the three-dimensional representation 916A, the virtual object 908 displayed on the virtual presentation 904A is displayed at the same distance from the viewpoint as the virtual presentation 904A.

FIG. 10 is a flowchart illustrating a method 1000 of displaying and controlling three-dimensional representations of virtual object in a presentation application according to some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system in communication with a display generation component and one or more input devices. In some embodiments, the computer system has one or more of the characteristics of the computer system of method 800. In some embodiments, the display generation component has one or more of the characteristics of the display generation component of method 800. In some embodiments, the one or more input devices have one or more of the characteristics of the one or more input devices of method 800.

In some embodiments, while displaying, via the display generation component, a virtual presentation (e.g., such as described with reference to method 800), associated with a presentation application (e.g., such as described with reference to method 800), at a first location in a three-dimensional environment, wherein the virtual presentation includes a two-dimensional representation of a first three-dimensional virtual object (such as virtual object 908 in FIG. 9A), the computer system receives (1002a), via the one or more input devices, a first input directed to the two-dimensional representation of the first three-dimensional virtual object. In some embodiments, the two-dimensional representation of the first three-dimensional virtual object is displayed on a (virtual or physical) surface included in the first three-dimensional environment associated with the displayed virtual presentation. In some embodiments, the two-dimensional representation is included and/or contained within a virtual slide of the virtual presentation. Optionally, the virtual presentation is displayed in the three-dimensional environment on or as a two-dimensional surface. In some embodiments, the virtual presentation is editable by the user using the presentation application. For instance, the computer system optionally moves a position of the two-dimensional representation of the virtual object on the virtual presentation upon receiving an indication to edit the virtual presentation. In some embodiments, the two-dimensional representation of the virtual object is based on the three-dimensional virtual object it is meant to represent. For example, the two-dimensional representation of the virtual object is an image of the three-dimensional virtual object rendered in two dimensions and corresponding to a view of the three-dimensional virtual object from a particular perspective. In some embodiments, the three-dimensional environment has one or more of the characteristics of the first three-dimensional environment and/or the respective rehearsal virtual environment described with reference to method 800. In some embodiments, a selectable button is displayed with the two-dimensional representation, and the first input includes the system detecting selection of the selectable button (e.g., via tap or pinch of the selectable button.) In some embodiments, receiving the first input directed to the two-dimensional representation includes detecting that a user's gaze is directed to the two-dimensional representation. Additionally or alternatively, receiving the first input includes detecting an air pinch gesture directed to a location of the three-dimensional environment associated with the two dimensional representation. In some embodiments, while maintaining the air pinch, the computer system detects the hand of the user moving away from the virtual presentation/object (e.g., to put the object out). In some embodiments, the first input is received while the virtual presentation is displayed in a presentation mode of the presentation application. The presentation mode optionally displays the virtual presentation in a non-editable form. Additionally or alternatively, the first input is received while the presentation is displayed in a second mode that is different from the presentation mode. For instance in some embodiments, the second mode includes displaying the virtual presentation in a rehearsal virtual environment (e.g., as described with respect to method 800.) Optionally, when the virtual presentation is displayed in the second mode, the virtual presentation is editable by the user of the computing system via the presentation application.

In some embodiments, in response to receiving the first input, the computer system displays (1002*b*) a three-dimensional representation of the three-dimensional virtual object at a second location in the three-dimensional environment, different from the first location in the three-dimensional environment, wherein the second location is outside of the virtual presentation such as in FIG. 9C. In some embodiments, displaying the three-dimensional representation of the three-dimensional virtual object includes simultaneously displaying the two-dimensional representation and the three-dimensional representation in the three-dimensional environment. Optionally, displaying the three-dimensional representation of the three-dimensional virtual object includes ceasing the display by the computer system of the two-dimensional representation while the three-dimensional representation is being displayed. In some embodiments, the second location in the three-dimensional environment where the three-dimensional representation is displayed is outside of and separate from a surface in the three-dimensional environment where the virtual presentation is displayed. Optionally, the second location in the three-dimensional environment where the three-dimensional representation of the virtual object is displayed is in front of the surface of the virtual presentation where the two-dimensional representation of the virtual object is displayed. For instance, from the perspective of the user in the three-dimensional, the three-dimensional representation of the virtual object appears in front of the virtual presentation and therefore appears closer to the user (e.g., closer to the viewpoint of the user) in the three-dimensional environment than the virtual presentation (which includes the two-dimensional representation of the virtual object). Optionally, at least a portion of the virtual presentation is occluded by the three-dimensional representation of the virtual object from the viewpoint of the user since the three-dimensional object being in front of the virtual presentation can block the user from seeing the occluded portion of the virtual presentation. Displaying a two-dimensional representation of a three-dimensional virtual object and only rendering a three-dimensional representation of the virtual object when prompted by the user, allows the device to minimize the amount of time that it displays a three-dimensional representation of the virtual object, thereby conserving computing resources of the computer system required to display three-dimensional objects in a three-dimensional environment.

In some embodiments, the two-dimensional representation of the first three-dimensional virtual object of the virtual presentation is displayed, in the virtual presentation, with a first visual indicator for indicating that the virtual object is a three-dimensional virtual object such as visual indicator 910 in FIG. 9B. In some embodiments, the device displays a virtual presentation in the three-dimensional environment on a two-dimensional surface. Accordingly, the contents of the visual presentation are represented in the three-dimensional environment in two dimensions. Thus, in order to distinguish two-dimensional representations of three-dimensional objects on the virtual presentation from ordinary two-dimensional objects that are displayed on the virtual presentation, the device optionally displays a visual indicator with the two-dimensional representation to indicate that the virtual object is viewable in three-dimensions. In some embodiments, the one or more visual indicators include text indicating that the virtual object is a three-dimensional object. Additionally or alternatively, the one or more visual indicators include a box or other shape that is overlaid on the two-dimensional representation to indicate that the object is viewable in three-dimensions. In some embodiments, the visual indicators are not displayed on the virtual presentation unless the user's gaze is detected as being directed to the two-dimensional representation of the three-dimensional object on the virtual presentation. Displaying a two-dimensional representation of a three-dimensional virtual object, displaying a visual indicator to indicate that the object can be viewed in three-dimensions and only rendering a three-dimensional representation of the virtual object when prompted by the user, allows the device to minimize the amount of time that it displays a three-dimensional representation of the virtual object, thereby conserving computing resources of the computer system required to display three-dimensional objects in a three-dimensional environment.

In some embodiments, while displaying the virtual presentation including the two-dimensional representation of the first three-dimensional virtual object, wherein the two-dimensional representation of the first three-dimensional virtual object is a first perspective view of the first three-dimensional virtual object, the computer system receives, via the one or more input devices, a second input from a first portion of the user, including a first air gesture directed to the first visual indicator of the two-dimensional representation of the first three-dimensional virtual object followed by movement of the first portion of the user such as in FIG. 9B. In some embodiments the second input includes detecting the user's attention (e.g., gaze) directed to the two-dimensional representation of the virtual object, and while the user's attention is directed at the object, detecting an air pinch followed by movement of the user's hand in the air pinch hand shape. In some embodiments, the direction/amount of the hand movement determines the way in which the perspective of the virtual object is updated.

In some embodiments, in response to receiving the second input, the computer system updates the two-dimensional representation within the virtual presentation in accordance with the detected movement of the first portion of the user, wherein the updated two-dimensional representation of the first three-dimensional virtual object is a second perspective view, different from the first perspective view, of the first three-dimensional virtual object such as if the user rotated virtual object 908 of virtual presentation 904 in FIG. 9B. In some embodiments, the visual indicator used to identify the two-dimensional representation of a three-dimensional virtual object is interactable. When the device detects that the user has interacted with the visual indicator (e.g., by detecting that an air pinch and movement of the user's hand), the device optionally rotates the two-dimensional representation of the three-dimensional virtual object in accordance with the detection motion of the user's hand. In some embodiments, the two-dimensional representation is rotated using a three-dimensional manipulation and represents a two-dimensional view of how the three-dimensional object will look from different perspectives. As will be described in further detail below, when the device displays the three-dimensional virtual object in a three-dimensional format, the device displays the object in accordance with the current orientation of the two-dimensional representation of the object on the presentation. Thus, allowing the user to change the orientation of two-dimensional representation of the virtual object ensures that the three-dimensional object is initially displayed in the preferred orientation of the user. Allowing the user to rotate the two-dimensional representation of the virtual object, minimizes the likelihood that the user will rotate the three-dimensional representation of the virtual object when displayed, thereby conserving computing and memory resources associated with rotating three-dimensional objects in a three-dimensional environment.

In some embodiments, the two-dimensional representation of the first three-dimensional virtual object of the virtual presentation is displayed, in the virtual presentation, with a second visual indicator for initiating the process to display the three-dimensional representation of the first three-dimensional virtual object such as if virtual object 708 is FIG. 7B included a visual indicator in addition to visual indicator 910 in FIG. 9B. In some embodiments, while displaying the virtual presentation including the two-dimensional representation of the first three-dimensional virtual object, the computer system receives, via the one or more input devices, the first input directed to the second visual indicator corresponding to a request to display the three-dimensional representation of the first three-dimensional virtual object. In some embodiments, the first input directed to the visual indicator includes one or more characteristics of the inputs described above.

In some embodiments, in response to receiving the first input directed to the second visual indicator, the computer system displays the three-dimensional representation of the three-dimensional virtual object at the second location outside of the virtual presentation such as in FIG. 9C. In some embodiments, in addition to the visual indicator that identifies two-dimensional representations of virtual objects as described above, the two-dimensional representation is displayed with a second visual indicator that is also interactable. When the computer system detects interaction with the second visual indicator, the device optionally renders a three-dimensional representation of the virtual object (described in further detail below). In some embodiments, the second visual indicator is not displayed until the computer system detects that the user's attention is directed to the object. In some embodiments, the second visual indicator includes but is not limited to, a "play" symbol, text indicating 3D play, or any other visual indicator designed to signal to the user that if they interact with the visual indicator a three-dimensional representation of a virtual object will be rendered in the three-dimensional environment. Displaying an interactable visual indicator to initiate display of a three-dimensional representation of a three-dimensional virtual object minimizes the amount of user input required to display the three-dimensional representation thereby preserving computing resources associated with additional user input.

In some embodiments, the second location is in front of the virtual presentation relative to a viewpoint of a user of the computer system such as in FIG. 9C. In some embodiments, the device displays the three-dimensional representation of the virtual object in front of the virtual presentation from the viewpoint of the user in a manner that makes it appears as if the three-dimensional representation of the object comes out of the virtual presentation. In some embodiments, the three-dimensional representation when displayed, occludes a portion of the virtual presentation since the three-dimensional representation is in front of the virtual presentation from the perspective of the user. Optionally, the three-dimensional representation is displayed in front of the virtual presentation from the viewpoint of the user, but is also displayed to the side of the virtual presentation such that no portion of the three-dimensional representation occludes any portion of the virtual presentation. In some embodiments, the three-dimensional representation is closer to the viewpoint of the user than the virtual presentation. Displaying the three-dimensional representation of the virtual object in front of the virtual increases the visual prominence of the three-dimensional representation in the three-dimensional environment, thereby decreasing the likelihood of erroneous interactions with the three-dimensional representation and thereby preserving computing resources associated with correcting erroneous user input.

In some embodiments, while displaying the virtual presentation including the two-dimensional representation of the first three-dimensional virtual object and without displaying the second visual indicator, the computer system receives, via the one or more input devices, a third input directed to the two-dimensional representation. In some embodiments, in response to receiving the third input, the computer system displays the second visual indicator with the two-dimensional representation of the first three-dimensional virtual object in the virtual presentation such as if the user directed an input to virtual object 908 in FIG. 9B. In some embodiments, the second visual indicator described above (e.g., the visual indicator that is interactable and when selected or interacted with initiates display of the three-dimensional representation of the virtual object) appears with the two-dimensional representation of the virtual object when the computer system detects that the user has manipulated (e.g., via an air pinch or other air gesture) the two-dimensional representation of the virtual object. In some embodiments, the second visual indicator appears when the device detects that the user's attention is directed to the two-dimensional representation of the virtual object (optionally without requiring any other input from the user). In some embodiments, the second visual indicator is displayed for a pre-determined amount time after the computer system detects that the user has manipulated the two-dimensional representation. Once the device detects that the pre-determined amount of time has expired, the device ceases displaying the second visual indicator. The device will again display the second visual indicator upon detection of the user manipulating the second visual indicator for a second time. Displaying the second visual indicator (that when manipulated initiates display of the three-dimensional representation of the virtual object) only when a user manipulates the two-dimensional representation of the virtual object preserves computing resources associated with permanently displaying the second visual indicator on the visual presentation.

In some embodiments, the two-dimensional representation of the three-dimensional virtual object is a first perspective view of the first three-dimensional virtual object. In some embodiments, in response to receiving the first input, the computer system displays the three-dimensional representation of the three-dimensional virtual object from the first perspective relative to a current viewpoint of the user such as in FIG. 9C. In some embodiments, and as described above, the device allows the user to manipulate the two-dimensional representation of the virtual object to change its orientation on the virtual presentation. In some embodiments, when the device initiates display of the three-dimensional representation of the virtual object, the device displays the three-dimensional representation in the same orientation that the two-dimensional representation of the virtual object was in when the process to display the three-dimensional representation was initiated. In some embodiments, if the two-dimensional representation was from a second perspective view (different from the first perspective), the three-dimensional representation will be from the second perspective rather than the first perspective. Displaying the three-dimensional representation of the virtual object in the same orientation as the two-dimensional representation of the virtual object on the virtual presentation, minimizes the likelihood that the user will rotate the three-dimensional representation of the virtual object when displayed, thereby conserving computing and memory resources associated with rotating three-dimensional objects in a three-dimensional environment.

In some embodiments, while displaying the three-dimensional representation of the first three-dimensional virtual object, the computer system displays, in the three-dimensional environment, a control user interface for controlling the three-dimensional representation at a third location in the three-dimensional environment, wherein the third location is different from the first location and the second location such as control user interface 920A in FIG. 9C. In some embodiments, along with displaying the three-dimensional representation of the virtual object, the device displays a control user interface for controlling one or more aspects of the three-dimensional representation (described in detail below). In some embodiments, the control user interface is displayed in a location that is different from the location where the three-dimensional representation is displayed so that the user is able to view both the control user interface and the three-dimensional of the virtual object simultaneously without one occluding the view of the other. In some embodiments, the control user interface, the three-dimensional representation, and the virtual presentation are different or the same distances from the viewpoint of the user. Displaying the control user interface in a different location from the three-dimensional representation of the virtual object minimizes erroneous user input by allowing the user to view both simultaneously, thereby minimizing the likelihood of erroneous user input and conserving computing resources associated with correcting erroneous user input.

In some embodiments, while displaying the control user interface, and in accordance with a determination that the control user interface has been displayed longer than a pre-determined time threshold after a time when the control user interface was displayed without input directed to the control user interface, the computer system ceases display of the control user interface such as if control user interface 920a in FIG. 9C ceased being displayed due to lack of input. In some embodiments, the device ceases display of the control user interface if the device detects that the user has not interacted with the control user interface for longer than a pre-determined time threshold. Optionally the pre-determined time threshold can be from 1 second to 1 hour. In some embodiments, the device rather than abruptly ceasing to display the control user interface when the pre-determined time threshold has been surpassed, instead fades the display of the control user interface (e.g., gradually reduced the visual prominence of the control user interface in the three-dimensional environment) until the control user interface is no longer visible in the three-dimensional environment. Displaying the control user interface for a pre-determined time without user interaction preserves computing and memory resources that would otherwise be expended if the control user interface was persistently displayed.

In some embodiments, while displaying the three-dimensional representation of the three-dimensional virtual object, and while the control user interface is not being displayed, the computer system receives, via the one or more input devices, a fourth input from a first portion of the user while attention of the user is directed to the three-dimensional representation of the first three-dimensional virtual object. In some embodiments, in response to receiving the fourth input, displaying the control user interface at the third location such as control user interface 920a in FIG. 9C. In some embodiments, once the control user interface is no longer displayed by the device or has been faded due to a lack of user interaction with the interface as described above, the device re-displays the control user interface in response to detecting an input from the user. For instance, the device detects an air pinch and/or the gaze of the user at the location where the control user interface was previously displayed, and in response re-displays the control user interface at the location in the three-dimensional environment that the control user interface was previously displayed. Displaying the control user interface when the device detects user input directed to the location where the control user interface was previously displayed preserves computing and memory resources that would otherwise be expended if the control user interface was persistently displayed.

In some embodiments, while displaying the three-dimensional representation of the first three-dimensional virtual object, and while displaying the control user interface, the computer system receives, via the one or more input devices, a fifth input directed to the control user interface to cease displaying the three-dimensional representation. In some embodiments, in response to receiving the fifth input, ceasing display of the three-dimensional representation in the three-dimensional environment such as in FIG. 9D. In some embodiments, the control user interface includes one or more selectable options for closing (e.g., cease displaying) the three-dimensional representation of the virtual object. In response to detecting selection of the one or more selectable options, the device optionally ceases display of the three-dimensional representation and optionally re-displays the two-dimensional representation on the virtual presentation. In some embodiments the device re-displays the two-dimensional representation of the virtual object in the same orientation as the three-dimensional representation was in when it was closed by the device in response to the user input at the control user interface. For instance, if the perspective of the three-dimensional representation was a first perspective, when the three-dimensional representation is closed by the user, then the two-dimensional representation of the virtual object on the virtual presentation is presented in the first perspective. Likewise, if the perspective of the three-dimensional representation was a second perspective (different from the first perspective), when the three-dimensional representation is closed by the user, then the two-dimensional representation of the virtual object on the virtual presentation is presented in the second perspective. In some embodiments, the perspective of the two-dimensional representation is different from the originally displayed perspective, due for instance to the user modifying the perspective. Ceasing display of the three-dimensional representation of the virtual when an indication is received that the user no longer desires to have the three-dimensional representation displayed preserves computing and memory resources that would otherwise be expended if the control user interface was persistently displayed.

In some embodiments, while displaying the three-dimensional representation of the three-dimensional object from a first perspective, the computer system receives, via the one or more input devices, an indication to change the displayed perspective of the three-dimensional representation such as input 921 in FIG. 9C. In some embodiments, in response to receiving the indication to the change the displayed perspective of the three-dimensional representation, the computer system displays the three-dimensional representation from a second perspective, different from the first perspective such as in FIG. 9D. In some embodiments, while displaying the three-dimensional representation of the first three-dimensional object from the second perspective, the computer system receives a sixth input, via the one or more input devices, directed to the control user interface to change the perspective of the three-dimensional representation back to a default perspective, such as the user selecting a selectable option on control user interface 920 for reverting the orientation of the three-dimensional representation 916A to a previous statin in FIG. 9D.

In some embodiments, in response to receiving the sixth input, the computer system displays the three-dimensional representation of the three-dimensional object from the default perspective such as if the user control interface 920A included a selectable option for returning the three-dimensional representation 916*a* to its default orientation. In some embodiments, the control user interface includes one or more selectable options for reverting the orientation of three-dimensional object back to the orientation that the three-dimensional representation of the virtual object was initially displayed in when display of the three-dimensional representation was initiated. The user thus is able to manipulate the orientation of the three-dimensional object without being required to remember the original orientation of the three-dimensional representation so that they can place the representation back to its original orientation. Providing a selectable option on the control user interface for displaying the three-dimensional representation in its original orientation reduces the amount of user input needed to modify the orientation of the three-dimensional representation, thereby conserving computing resources.

In some embodiments, while displaying the three-dimensional representation of the three-dimensional virtual object, the computer system receives, via the one or more input devices, a seventh input directed to the control user interface to animate the three-dimensional representation such as the "play" button included in control user interface 920*a* in FIG. 9D. In some embodiments, in response to receiving the seventh input, the computer system animates the three-dimensional representation according to a pre-determined animation sequence. In some embodiments, the control user interface includes one or more selectable options for animating the three-dimensional representation of the virtual object. In response to detecting selection of the one or more selectable options, the device animates the three-dimensional representation according to a pre-determined animation sequence associated with the virtual object. In some embodiments, the animated three-dimensional representation is able to move (e.g., animate) in the three-dimensional environment in three dimensions. Additionally or alternatively, the animated three-dimensional representation remains at a fixed location in the three-dimensional environment commensurate with the location of the three-dimensional location when it is not animated. In some embodiments, the selectable option used to animate the three-dimensional representation is also used to cease the animation. In some embodiments, the animated three-dimensional representation is an animated progress through different orientations of the virtual object. Providing a selectable option on the control user interface for animating the three-dimensional representation and ceasing animation conserves computing and memory resources associated with persistently animating the three-dimensional representation in the three-dimensional environment.

In some embodiments, the control user interface includes one or more orientation information portions for indicating an orientation of the three-dimensional representation of the three-dimensional object relative to the three-dimensional environment such as orientation information portion 918*a* in FIG. 9D. In some embodiments, the device displays one or more numerical representations of the orientation of the three-dimensional representation of the virtual object as part of the control user interface. For instance, the one or more numerical representations includes a degree of rotation in each of the X, Y, and Z axes. In some embodiments, the device updates the one or more numerical representations in response to change in the orientation of the three-dimensional representation. Providing a numerical representation of the orientation of the three-dimensional object relative to the three-dimensional environment minimizes erroneous user input associated with rotating the three-dimensional object into a specific orientation, thereby conserving computing resources associated with correcting erroneous user input.

In some embodiments, while displaying the control user interface including the one or more orientation information portions, the computer system receives, via the one or more input devices, an eighth input directed to the one or more orientation information portions. In some embodiments, in response to receiving the eighth input, the computer system modifies the orientation of the three-dimensional representation relative to the three-dimensional environment in accordance with the received eighth input such as if the user directed an input to orientation portion 918*a* in FIG. 9D to modify the orientation of the three-dimensional representation 916*a* in FIG. 9D. In some embodiments, the one or more numerical representations (described above) are selectable and modifiable by the user. In response to detecting that that a user has selected and modified one or more of the numerical representations, the device changes the orientation of the three-dimensional representation of the virtual object in accordance with the modified numerical representation. Allowing for the numerical representation to be modified by the user, allows for the user to more precisely modify the orientation of the three-dimensional representation of the virtual object, thereby minimizing erroneous modification of the orientation and thus preserving computing resources associated with correcting erroneous modification of the orientation.

In some embodiments, while displaying the three-dimensional representation of the first three-dimensional virtual object, the computer system receives, via the one or more input devices, a ninth input from a second portion of the user, including a second air gesture directed to the three-dimensional representation followed by movement of the second portion of the user. In some embodiments, in response to receiving the ninth input, the computer system rotates the three-dimensional representation relative to the three-dimensional environment in accordance with the detected movement of the second portion of the user such as if the user changed the orientation of the three-dimensional representation 916A by directing the input to the representation in FIG. 9C. In some embodiments, the device modifies the orientation (e.g., rotates) the three-dimensional representation of the virtual object in response to detecting the attention of the user and an air gesture (e.g., an air pinch) directed to the three-dimensional representation followed by detecting movement of a portion of the user's body (e.g., the user's hand, while remaining air pinched). In some embodiments, the amount of rotation corresponds to the amount of hand movement detected, the axes of rotation correspond to the direction of the hand movement, and the speed of the rotation corresponds to the detected speed of the hand movement. In some embodiments, the three-dimensional representation is rotated in accordance with a detected direction of movement of the portion of the user's body. Allowing the user to modify the orientation of the three-dimensional representation of the virtual object by manipulating the representation can lead to a more accurate modification of the representation's orientation thereby minimizing erroneous modification of the orientation and thus preserving computing resources associated with correcting erroneous modification of the orientation.

In some embodiments, the three-dimensional representation of the three-dimensional virtual object is displayed while the presentation application is in an editing mode for instance if the presentation application were in an editing mode in FIGS. 9A-9E. In some embodiments, an "editing mode" refers to a mode of the presentation application in which the user is able to edit the content of the virtual presentation. In some embodiments, and while in the editing mode, the device displays the three-dimensional representation of the virtual object in accordance with the embodiments described above. For instance, the three-dimensional representation is displayed by the device in response to one or more user inputs as described above. In some embodiments, and while the three-dimensional representation is displayed, the device also displays the control user interface while the presentation application is in the editing mode. In some embodiments, in the editing mode, the user can utilize one or more tools to edit the presentation. For instance, in the editing mode, the user is able to add and/or delete content, and modify existing content. Displaying the three-dimensional representation while the presentation application is in editing mode, allows the user to accurately edit the virtual presentation, thereby minimizing erroneous user input associated with inaccurate modification of the virtual presentation and thus conserving computing resources associated with correcting erroneous input.

In some embodiments, the three-dimensional representation of the three-dimensional virtual object is displayed while the presentation application is in a presentation mode for instance if the presentation application were in a presentation mode in FIGS. 9A-9E. In some embodiments, an "presentation mode" refers to a mode of the presentation application in which the device displays the virtual presentation, and the user is unable to edit the content of the virtual presentation (e.g., the user is unable to add and/or delete content, and/or modify existing content). In some embodiments, and while in the presentation mode, the device displays the three-dimensional representation of the virtual object in accordance with the embodiments described above. For instance, the three-dimensional representation is displayed by the device in response to one or more user inputs as described above. In some embodiments, and while the three-dimensional representation is displayed, the device also displays the control user interface while the presentation application is in the editing mode. Displaying the three-dimensional representation while the presentation application is in presentation mode, allows the user to accurately view the contents of the presentation virtual presentation, thereby minimizing erroneous user input associated with inaccurate modification of the virtual presentation and thus conserving computing resources associated with correcting erroneous input.

In some embodiments, in accordance with a determination that a viewpoint of a user of the computer system when the first input is detected is a first viewpoint location, the second location in the three-dimensional environment is a first corresponding location. In some embodiments, in accordance with a determination that the viewpoint of the user of the computer system when the first input is detected is a second viewpoint location, different from the first viewpoint location, the second location in the three-dimensional environment is a second corresponding location, different from the first corresponding location such as if virtual presentation 904A were displayed in a presenter or audience viewpoint described above with respect to method 800. In some embodiments, the location at which the three-dimensional representation is displayed depends on whether the virtual presentation is being displayed in an audience or presenter viewpoint. In some embodiments, if the device displays the virtual presentation from the audience viewpoint (described above with respect to method 800) then the three-dimensional representation of the virtual object is displayed both in front of the virtual presentation as well as in front of the user from the user's perspective. In some embodiments, if the device displays the virtual presentation from the presenter viewpoint (described above with respect to method 800) then the three-dimensional representation of the virtual object is displayed in front of the virtual presentation but behind the user from the user's perspective in accordance. In some embodiments, the first corresponding location is based on the position of the viewpoint of the user in the three-dimensional environment. For instance, if the user is to the off-center and to the left of the virtual presentation, then the first corresponding location will be off-center and to the left of the virtual presentation, and if the user is off-center and to the right of the virtual presentation, then the corresponding location will be off-center and to the right of the virtual presentation. Displaying the three-dimensional representation in accordance with the viewpoint that the virtual presentation is being displayed in, minimizes the amount of user input required to place the three-dimensional representation in the three-dimensional environment, thereby preserving computing resources.

FIGS. 11A-11D illustrate examples of audio models that are presented within one or more virtual environments associated with a presentation application in accordance with some embodiments.

FIG. 11A illustrates an overhead perspective of a three-dimensional environment 1102 associated with a presentation application in which audio is being presented according to an audio model (described in detail below). The three-dimensional environment 1102 illustrated in FIG. 11A represents the auditorium rehearsal virtual environment described above with respect to FIG. 7E (and described with respect to method 800) for exemplary purposes, but the concepts described with respect to FIGS. 11A-11D can be applied to any three-dimensional environment associated with a presentation application. In some embodiments, the computer system displays the three-dimensional environment in the "presenter viewpoint" (described with respect to method 800). Thus, the virtual presentation 1112 (described above with respect to methods 800 and 1000) is positioned behind the user 1104, while the audience is positioned in front of the user as illustrated in FIG. 11A.

In some embodiments, and in order to mimic a real-world auditorium environment, the three-dimensional environment 1102 includes one or more virtual audio speakers 1106A-D. The virtual audio speakers 1106A-D, are optionally placed in the three-dimensional environment based on where physical real-world audio speakers would have been placed in a real-world auditorium. In some embodiments, the device presents audio in the three-dimensional environment as if the audio was being emitted from the locations in the three-dimensional environment 1102 associated with the virtual audio speakers 1106A-D, without displaying any representations of the virtual audio speakers. In some embodiments, the device displays representations of the virtual audio speakers 1106A-D within the three-dimensional environment 1102 (in addition to presenting audio as if the audio is being emitted from the locations associated with the virtual audio speakers 1106A-D).

In some embodiments, the virtual speakers 1106A-D, emit audio associated with the virtual presentation 1112. For instance, if virtual presentation 1112 includes audio content, then the audio content is optionally emitted from the virtual speakers 1106A-D. Additionally or alternatively, the computer system via the virtual speakers 1106A-D optionally emit audio associated with the user (e.g., the presenter of the virtual presentation). For instance, in a real-world auditorium environment, the presenter can speak to the audience through a microphone which is then amplified and presented to the audience via speakers placed throughout the auditorium. Thus, in some embodiments, and in order to mimic a real-world auditorium environment, the computer system optionally collects audio from the user (via a microphone or other audio collection device) and transmits the collected audio through the virtual audio speakers 1106A-D.

In one or more examples, the computer system presents the audio emitted by the user 1104 as well as the audio emitted at the virtual audio speakers 1106A-D according to an audio model 1110. In some embodiments, an audio model refers to one or more characteristics applied to the audio presented by the computer system in the three-dimensional environment 1102. In some embodiments, the audio characteristics associated with an audio model include spatial audio characteristics. Examples of spatial audio characteristics optionally include, but are not limited to, audio characteristics associated the directionality of sound, reverb (e.g., echo), tone, etc. For instance, as illustrated in FIG. 11A, audio from the user 1104 and/or the virtual audio speakers 1106a-d bounces of objects represented in the three-dimensional environment. For instance, with respect to the auditorium virtual environment illustrated in FIG. 11A, the audio reflects off the walls of the environment as illustrated at 1108. Additionally or alternatively, the audio reflects off objects in the environment such as the chairs or other objects found in the virtual environment. The spatial audio characteristics of an audio model optionally incorporate spatial features of the three-dimensional environment 1102 described above. In some embodiments, the audio characteristics associated with an audio model include ambient audio characteristics. Examples of ambient audio characteristics include white noise or other noises associated with the real-world environment that the three-dimensional environment 1102 is meant to emulate. In some embodiments, the ambient audio characteristics are based on a recording of ambient noises from a physical corresponding to the three-dimensional environment 1102.

In some embodiments, the audio model 1110 includes one or more audio parameters associated with both the spatial and ambient audio characteristics (and associated with other audio characteristics of the audio model). As illustrated in FIG. 11A, the one or more audio parameters of audio model 1110 are illustrated using slide bars to illustrate a value associated with each parameter so as to represent the value of each parameter that the computer system would set when presenting audio according to an audio model. In some embodiments, presenting audio according to an audio model encompasses the computer system setting the values of each audio parameter to pre-determined values commensurate with the audio characteristics (e.g., spatial and ambient) associated with a particular three-dimensional environment. Thus, the audio model 1110 optionally is based on the three-dimensional environment 1102 in which the virtual presentation is being presented in. As described below, in response to changes to the three-dimensional environment, the computer system optionally changes the audio model used to present audio in the three-dimensional environment.

FIG. 11B illustrates an audio model applied to the three-dimensional environment of FIG. 11A when the device displays the environment from a different viewpoint. As described above with respect to method 800, the device can display different viewpoints of the three-dimensional environments associated with the presentation application. For instance, instead of the "presenter" viewpoint displayed at FIG. 11A, the device displays the three-dimensional environment 1102 from the "audience" viewpoint (described above with respect to method 800.) In some embodiments, the device applies an audio model 1114 to the audio presented in three-dimensional environment 1102 in response to changes in the viewpoint displayed on the computer system. In some embodiments, audio model 1114 is different from the audio model 1110 of FIG. 11A to account for the differences in audio characteristics associated with the different viewpoints of the three-dimensional environment 1102. For instance, in the audience viewpoint of FIG. 11B, the audio emitted from the user 1104 reflects off different objects and at different distances when compared to the presenter viewpoint of FIG. 11A. Additionally or alternatively, the audio emitted from virtual audio speakers 1106a-d, may be heard by the user 1104 differently from the audience viewpoint versus the presenter viewpoint of FIG. 11A. Thus, the audio model 1114 is different (e.g., the value of one or more of the parameters associated with the audio model) from audio model 1110 to account for audio differences associated with the presenter and audience viewpoints of the three-dimensional environment 1102.

In some embodiments, in addition to accounting for audio characteristic differences relating to different viewpoints in the same three-dimensional environment, the audio model accounts for differences between three-dimensional environments themselves. FIG. 11C illustrates an exemplary "conference room" virtual environment (described above with respect to method 800). In some embodiments, the conference room virtual environment is spatially smaller than the auditorium virtual environment described above with respect to FIGS. 11A-11B. Optionally, the conference room environment includes different objects in the environment. For instance, the conference room environment includes a conference table, chairs, and other virtual objects that are not present in the auditorium virtual environment. In some embodiments, because the conference room is spatially smaller than an auditorium, the conference room virtual environment does not include virtual audio speakers since the user's audio does not optionally require amplification (e.g., like a real-world conference room in which the speaker does not require a microphone to be heard by the audience). In order to account for the characteristics of the conference room virtual environment, in some embodiments, the computer system presents audio in the three-dimensional environment 1118 (different from three-dimensional environment 1102) according to audio model 1116. In some embodiments, audio model 1116 is different from audio models 1114 and 1110 to account for the audio characteristic differences between the three-dimensional virtual environments and viewpoints associated with the three-dimensional virtual environments. Thus, in some embodiments, the one or more parameters associated with the audio model 1116 are collectively set by the device to different values versus the settings of the parameters in audio models 1110 and 1114.

As described above, an audio model includes ambient audio characteristics associated with a three-dimensional environment. In some embodiments, and as part of presenting audio according to an audio model that includes ambient audio characteristics, the computer system presents audio of ambient noise to the three-dimensional environment as illustrated in FIG. 11D. In some embodiments, the ambient noise presented in the three-dimensional environment 1118 is audio that is recorded from a real-world physical environment that the three-dimensional environment 1118 is meant to emulate. As illustrated in FIG. 11D, in some embodiments, the ambient audio 1120 is presented within the three-dimensional environment so to surround the user (e.g., from the user's perspective the ambient audio is not coming for any particular direction). In some embodiments, and in three-dimensional environments that include virtual audio speakers (e.g., such as three-dimensional environment 1102), the ambient noise presented is not presented as if coming from the virtual audio speakers.

FIG. 12. is a flowchart illustrating a method 1200 of presenting audio in a three-dimensional environment of a presentation application, in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system in communication with a display generation component and one or more input devices. In some embodiments, the computer system has one or more of the characteristics of the computer system of methods 800 and/or 1000. In some embodiments, the display generation component has one or more of the characteristics of the display generation component of methods 800 and/or 1000. In some embodiments, the one or more input devices have one or more of the characteristics of the one or more input devices of methods 800 and/or 1000.

In some embodiments, while displaying, via the display generation component, a virtual presentation (e.g., such as described with respect to method 800 and 1000) associated with a presentation application in a first three-dimensional environment (e.g., as described with respect to method 800 and 1000), including presenting audio corresponding to the virtual presentation according to a first audio model associated with the first three-dimensional environment, the computer system receives (1202a), via the one or more input devices, a first input corresponding to a request to display the virtual presentation in a second three-dimensional environment such as input 705 in FIG. 7A.

In some embodiments, in response to receiving the first input, the computer system displays (1202b) the virtual presentation in the second three-dimensional environment such as in FIG. 7E, (e.g., the one or more rehearsal environments described with respect to methods 800 and/or 1000) including presenting audio corresponding to the virtual presentation according to a second audio model, different from the first audio model, associated with the second three-dimensional environment such as in FIG. 11B. In some embodiments, the first audio model includes one or more audio characteristics used to present the audio of the virtual presentation. Optionally, the one or more audio characteristics of the first audio model are based on the first three-dimensional environment. For instance, the audio characteristics associated with the first audio model are based on one or more spatial characteristics of the first three-dimensional environment, including but not limited to, the size of the first three-dimensional environment, the presence of one or more virtual objects in the first three-dimensional environment, and the perspective of the viewpoint of the user within the first three-dimensional environment. In some embodiments, the audio corresponding to the virtual presentation includes the voice of the user of the computing system received by one or more microphones or audio sensing devices that are communicatively coupled or are a part of the computer system. Optionally, the voice of the user received at the computer system is modified and subsequently output by the computer system according to the one or more audio characteristics of the first audio model. In some embodiments, the second three-dimensional virtual environment is one of one or more rehearsal virtual environments. For instance, the rehearsal environments optionally include a virtual conference room, a virtual auditorium, and/or a virtual classroom. Optionally, the second audio model is based on the selected rehearsal environment. In some embodiments, for instance, if the selected rehearsal environment is a virtual conference room, then optionally the second audio model includes one or more audio characteristics that are configured to emulate one or more audio characteristics associated with a real-world physical conference room. Optionally, the one or more audio characteristics associated with the second environment are different than the audio characteristics associated with the first environment. In some embodiments, the first three-dimensional environment is associated with an editing mode of presentation application, while the second three-dimensional environment is associated with a presentation mode of the presentation application (e.g., as described with respect to methods 800 and/or 1000). In some embodiments, the presentation mode includes displaying the virtual presentation in a rehearsal environment as described with respect to methods 800 and/or 1000. In some embodiments, presenting audio according the second audio model includes modifying and subsequently outputting by the computer system audio received by or generated by the computer system (e.g., corresponding to the voice of the user of the computer system) according to one or more audio characteristics associated with the second audio model. Changing the audio model according to the three-dimensional environment that is being used to display a virtual presentation allows for the device to more accurately emulate real-world environments on a virtual platform, and provides feedback about a current state of the computer system, thus reducing likelihood in errors in interaction with the computer system and thereby conserving computing resources and memory required to rectify any errors in interaction with the computer system.

In some embodiments, the first audio model includes one or more first spatial audio parameters, wherein the second audio model includes one or more second spatial audio parameters different from the one or more first spatial audio parameters such as audio model 1114 in FIG. 11B. In some embodiments, in response to receiving the first input, the computer system presents audio corresponding to the virtual presentation associated with the second three-dimensional environment according to the one or more second spatial audio parameters. In some embodiments, while the device displays the first three-dimensional environment, the device presents audio corresponding to the one or more first spatial audio parameters. In response to receiving the first input to display the second three-dimensional environment, the device presents audio according to the second audio model which includes presenting the audio according to the one or more second spatial audio parameters. In some embodiments, the one or more spatial audio parameters include a directionality of the audio from the user viewpoint. For instance, if a virtual speaker is located to one side of the user in the second three-dimensional environment, then the audio is presented so that the audio is presented to the user as coming from the side of the second three-dimensional environment where the virtual speaker is located. Optionally, the directionality of the audio moves as the user moves within the three-dimensional environment. Presenting audio according the one or more spatial audio parameters associated with the three-dimensional environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the one or more first spatial audio parameters includes one or more first reverb parameters, wherein the one or more second spatial audio parameters includes one or second reverb parameters different from the one or more first reverb parameters such as in FIG. 11B. In some embodiments, in response to receiving the first input, the computer system presents audio corresponding to the virtual presentation associated with the second three-dimensional environment according to the one or more second reverb parameters such as in FIG. 11B. In some embodiments, while the device displays the first three-dimensional environment, the device presents audio corresponding to the one or more first reverb parameters. In response to receiving the first input to display the second three-dimensional environment, the device presents audio according to the second audio model which includes presenting the audio according to the one or more second reverb parameters. In some embodiments, the one or more reverb parameters are based on a real-world physical environment that the three-dimensional virtual environment is meant to emulate. For instance, if the three-dimensional virtual environment is an indoor environment, then the one or more reverb parameters will be commensurate with an audio environment in which there is more reverb versus an outdoor environment in which there is less reverb. Outputting audio according the one or more reverb parameters associated with the three-dimensional environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the one or more second spatial audio parameters are based on a physical environment associated with the second three-dimensional environment such as a real-world auditorium environment associated with the auditorium environment of FIG. 7B. In some embodiments, and as described above the one or more spatial audio parameters associated with a three-dimensional environment are based on the real-world physical environment that the virtual environment is meant to emulate. For instance, the spatial audio parameters take into account the size of the real-world environment, the location of audio speakers in the real-world environment, and other features of the real-world environment that would have an effect on the spatial audio parameters of the environment. Outputting audio in the virtual according the one or more spatial audio parameters that are based on the spatial audio parameters associated with a real-world environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the first audio model includes a first ambient audio model, wherein the second audio model includes a second ambient audio model different from the first ambient audio model. In some embodiments, in response to receiving the first input, the computer system presents audio corresponding to the virtual presentation associated with the second three-dimensional environment according to the second ambient audio model such as in FIG. 11D. In some embodiments, while the device displays the first three-dimensional environment, the device presents audio corresponding to the one or more first ambient audio model. In response to receiving the first input to display the second three-dimensional environment, the device presents audio according to the second ambient audio model. In some embodiments, the ambient audio model includes presenting audio in the three-dimensional that emulates the ambient audio found in a real-world physical environment that the three-dimensional virtual environment is meant to emulate. Optionally, an ambient audio model includes white noise associated with the real-world physical environment. For instance, if the three-dimensional environment is designed to emulate an outdoor real-world environment, then the ambient audio model presented in the virtual environment can account for the increased wind found in an outdoor environment. Outputting audio according to an ambient audio model associated with the three-dimensional environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the second ambient model is based on one or more audio recordings of a physical environment associated with second three-dimensional environment such as real-world conference room environment associated with the conference room environment of FIG. 11D. In some embodiments, the ambient audio model presented while a three-dimensional environment is displayed is generated by recording a real-world physical environment associated with the three-dimensional virtual environment and using the recording to generate the ambient model. For instance, the white noise of a real-world physical environment is recorded and then used by the device to generate the ambient audio model for the three-dimensional virtual environment that configured to emulate the real-world physical environment. Outputting audio according to an ambient audio model associated with the three-dimensional environment that is based on an audio recording of a real-world physical environment that the virtual environment is configured to emulate allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, presenting audio corresponding to the virtual presentation associated with the second three-dimensional environment according to the second ambient audio model includes, in accordance with a determination that a viewpoint of a user of the computer system in the second three-dimensional environment is a first viewpoint, presenting first audio, and in accordance with a determination that the viewpoint of the user of the computer system in the second three-dimensional environment is a second viewpoint, different from the first viewpoint, presenting second audio different from the first audio such as in FIG. 11B. In some embodiments, the three-dimensional environment can be presented from various viewpoints (e.g., such as described with reference to method 800). In some embodiments, the audio presented in the three-dimensional environment is based on the viewpoint being displayed in the three-dimensional environment. For instance, a different ambient audio model is presented for different viewpoint positions and/or orientations in the three-dimensional environment. In some embodiments, the audio presented can include both spatial and ambient audio parameters as described above. Thus, in addition to basing the spatial and ambient parameters on a real-world physical environment, the spatial and ambient parameters are also based on the viewpoint that is being displayed in the three-dimensional environment. Presenting audio based on the viewpoint being displayed in the three-dimensional environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the viewpoint of the second three-dimensional environment is a presenter viewpoint such as in FIG. 11A. In some embodiments, the presenter viewpoint includes displaying the rehearsal environment from the perspective of the presenter of the virtual presentation, such that the virtual audience of the virtual presentation is in front of the user while the virtual presentation is placed behind the viewpoint of the user, thereby simulating a real-world scenario in which a presenter is presenting a presentation to an audience (e.g., such as described with respect to method 800). Displaying the presentation in the presenter viewpoint when displaying the three-dimensional virtual environment and basing the audio model on the presenter viewpoint allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the viewpoint of the second three-dimensional environment is an audience viewpoint such as in FIG. 11B. In some embodiments the audience viewpoint includes displaying the virtual presentation at a location that is in front of the user (from the viewpoint of the user) so as to emulate how a member of the audience of the virtual presentation would view the presentation as it was being presented (e.g., such as described above with respect to method 800). Displaying the presentation from the audience viewpoint when displaying a three-dimensional virtual environment and basing the audio model on the presenter viewpoint allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the second three-dimensional environment includes a first virtual audio speaker at a first location in the second three-dimensional environment. In some embodiments, in response to receiving the first input, the computer system outputs audio associated with a user of the computer system as if emanating from the first virtual audio speaker located at the first location in the second three-dimensional environment such as virtual audio speakers 1106a-d in FIG. 11B (optionally different from a location of a viewpoint of the user in the second three-dimensional environment). In some embodiments, and in order to emulate a real-world environment, the device presents user-generated audio via one or more virtual audio speakers located in the three-dimensional virtual environment. Outputting user-generated audio via a virtual audio speaker emulates the real-world audio associated with a speaker using a microphone to address the audience when presenting a real-world presentation. In some embodiments, the computing system includes or is communicatively coupled to one or more audio capture device such as a microphone that records the user's voice. The recorded audio is then presented in the three-dimensional environment as if it were emanating from a virtual speaker located within the three-dimensional virtual environment. Presenting the user's audio through the one or more virtual speakers, allows the user to hear what their voice will sound like through a microphone that is amplified through a speaker. In some embodiments, the locations and/or orientations of the virtual speakers are different from the location and/or orientation of the viewpoint of the user in the three-dimensional environment. Outputting user-generated audio via a virtual audio speaker allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, the first location in the second three-dimensional environment of the first virtual audio speaker is based on a location of a physical audio speaker in a physical environment associated with the second three-dimensional environment such as a real-world auditorium associated with the auditorium virtual environment of FIG. 11A. In some embodiments, in a real-world environment, the speakers that are used to amplify the presenter's audio are placed in specific locations in the environment so as to ensure that the audience can hear the speaker's audio regardless of their location in the environment. Thus, in some embodiments, a three-dimensional virtual environment that is configured to emulate a real-world environment includes one or more virtual speakers that are located within the virtual environment in the same location as the real-world environment that the virtual environment is mean to emulate. Thus, while the user is presenting in the virtual environment, the device presents the user's audio to the three-dimensional virtual environment in a manner that closely emulates the real-world counterpart to the virtual environment. Outputting user-generated audio via one or more virtual audio speakers whose locations mimic the locations of real-world audio speakers in a real-world environment allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

In some embodiments, outputting audio associated with the user of the computer system as if emanating from the first virtual audio speaker includes outputting an amplified version of audio detected from the user such as in FIG. 11A. In some embodiments, the audio outputted from a virtual audio speaker is an amplified version of the user's audio, thereby emulating what a real-world speaker would output in response to receiving audio from the user (for instance from a microphone). Optionally, the user's audio is presented through virtual audio speaker having other characteristics of amplified audio (e.g., tone, reverb, delay, compression, etc.) In some embodiments, the amount of amplification (e.g., the volume of the audio from the speaker) is controlled by the device. Additionally or alternatively, the amount of amplification the device receives input from the user (for instance at the control user interface) and sets the amount of amplification based on the detected input. Outputting amplified user audio via one or more virtual audio speakers allows the device to more accurately emulate the real-world environment associated with the three-dimensional virtual environment, thereby minimizing erroneous input from the user associated with differences between the virtual environment and the real-world environment, thus conserving computing resources associated with correcting erroneous user input.

It should be understood that the particular order in which the operations in method 1400 have been described is merely exemplary and is not intended to indicate that the described order is the only order in which the operations could be performed. One of ordinary skill in the art would recognize various ways to reorder the operations described herein. In some embodiments, aspects/operations of methods 800, 1000, and/or 1200 may be interchanged, substituted, and/or added between these methods. For example, the three-dimensional environments of methods 800, 1000, and/or 1200, the virtual content of methods 800, 1000, and/or 1200, and/or increase or decrease prominence of virtual content in methods 800, 1000, and/or 1200 are optionally interchanged, substituted, and/or added between these methods. For brevity, these details are not repeated here.

As described above, one aspect of the present technology potentially involves the gathering and use of data available from specific and legitimate sources to display content or suggest content for display to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data in the present technology can be used to the benefit of users. For example, the personal information data can be used to automatically perform operations with respect to interacting with a collaborative playlist on a content application. Accordingly, use of such personal information data enables users to enter fewer inputs to perform an action with respect to displaying and interacting with content. Further, other uses for personal information data that benefit the user are also contemplated by the present disclosure. For instance, user preferences may be used to display virtual environments associated with a presentation application.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's preferences when displaying virtual environments associated with a presentation application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, virtual environments associated with a presentation application can be based on aggregated non-personal information data or a bare minimum amount of personal information, such as the user preferences being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a computer system in communication with a display generation component and one or more input devices:
while displaying, via the display generation component, a virtual presentation associated with a presentation application in a first three-dimensional environment, wherein the first three-dimensional environment includes a portion of a physical environment of a user of the computer system and the virtual presentation is presented in a first mode of the presentation application, receiving, via the one or more input devices, a first input corresponding to a request to display the virtual presentation in a second mode of the presentation application, different from the first mode of the presentation application; and in response to receiving the first input:
initiating a process to display the virtual presentation in a respective virtual environment, different from the first three-dimensional environment, wherein while displaying the virtual presentation in the respective virtual environment, the respective virtual environment replaces the first three-dimensional environment such that the portion of the physical environment of the user is not visible via the display generation component.

2. The method of claim 1, further comprising:
in response to receiving the first input:
displaying, via the display generation component, a virtual environment selection user interface for selecting one or more pre-determined virtual environments of the presentation application; while displaying the virtual environment selection user interface, receiving, via the one or more input devices, a second input corresponding to a selection of a virtual environment of the one or more pre-determined virtual environments; and
in response to receiving the second input, displaying the virtual presentation in the selected virtual environment of the one or more virtual environments.

3. The method of claim 2, wherein displaying the virtual presentation in the selected pre-determined virtual environment includes displaying the selected pre-determined virtual environment from a viewpoint corresponding to a presenter viewpoint in the selected pre-determined virtual environment.

4. The method of claim 2, wherein displaying the virtual presentation in the selected pre-determined virtual environment in response to the second input includes displaying, via the display generation component, a virtual environment settings user interface for changing one or more settings associated with the selected pre-determined virtual environment.

5. The method of claim 4, further comprising:
while displaying the virtual environment settings user interface, receiving, via the one or more input devices, a third input directed to the virtual environment settings user interface to change one or more virtual light settings associated with the selected pre-determined virtual environment; and in response to receiving the third input to change the one or more virtual light settings, adjusting a virtual lighting characteristic of the selected pre-determined virtual environment in accordance with the third input.

6. The method of claim 4, further comprising:
while displaying the virtual environment settings user interface, receiving, via the one or more input devices, a third input corresponding to a request to change a viewpoint of the selected pre-determined virtual environment to be a presenter viewpoint; and
in response to receiving the third input, and in accordance with a determination that the virtual environment is displayed from a viewpoint that is different from the presenter viewpoint, displaying the selected pre-determined virtual environment from the presenter viewpoint, wherein displaying the selected pre-determined virtual environment from the presenter viewpoint includes placing the virtual presentation behind the viewpoint of the user in the selected virtual environment.

7. The method of claim 4, further comprising:
while displaying the virtual environment settings user interface, receiving, via the one or more input devices, a fourth input corresponding to a request to change a viewpoint of the selected pre-determined virtual environment to be an audience viewpoint; and in response to receiving the fourth input, and in accordance with a determination that the virtual environment is displayed from a viewpoint that is different from the audience viewpoint, displaying the selected pre-determined virtual environment from the audience viewpoint, wherein displaying the selected pre-determined virtual environment from the audience viewpoint includes displaying the virtual presentation in front of the viewpoint of the user in the selected virtual environment.

8. The method of claim 4, wherein the virtual environment settings user interface includes one or more interactable options that are interactable in response detecting input from a first portion of the user while attention of the user is directed to the selectable option.

9. The method of claim 4, further comprising:

while displaying the virtual settings user interface in an expanded state, receiving, via the one or more input devices, a third input directed to the virtual environment settings user interface, wherein the third input includes input from a first portion of the user directed to a first portion of the virtual settings user interface followed by movement of the first portion of the user in a downward direction.

10. The method of claim 4, further comprising:

while displaying the virtual environment settings user interface, receiving, via the one or more input devices, a third input to activate a virtual laser pointer in the selected virtual environment; and in response to receiving the third input to activate the virtual laser pointer, displaying, via the display generation component, a virtual laser point, wherein virtual laser pointer moves within the selected virtual environment in accordance with a detected movement of a first portion of the user.

11. The method of claim 10, further comprising:

receiving, via the one or more input devices, a fourth input including an air gesture from the first portion of the user directed to the virtual presentation; and in response to detecting the fourth input:

in accordance with a determination that the virtual laser pointer is not activated, navigating through the virtual presentation in accordance with the fourth input; and in accordance with a determination that the virtual laser point is activated, forgoing navigating through the virtual presentation in accordance with the fourth input.

12. The method of claim 1, wherein displaying the virtual presentation in the respective virtual environment includes:

in accordance with a determination that the virtual presentation is in a presentation mode, displaying, via the display generation component, a speaker notes user interface for displaying information associated with the virtual presentation.

13. The method of claim 12, wherein the speaker notes user interface is displayed at a location within the respective virtual environment that is different than a location at which the virtual presentation is displayed within the respective virtual environment.

14. The method of claim 12, further comprising:

while displaying the speaker notes user interface, receiving, via the one or more input devices, a second input from a first portion of the user, including a first air pinch directed to a portion of the speaker notes user interface followed by movement of the first portion of the user; and in response to receiving the second input, moving the speaker notes user interface within the respective virtual environment in accordance with the detected movement of the first portion of the user.

15. The method of claim 1, further comprising:

while displaying the virtual presentation, receiving, via the one or more input device, a second input from a portion of the user, including a first air gesture from a first portion of the user that includes movement of the first portion in a respective direction; and in response to receiving the second input:

in accordance with a determination that the respective direction is a first direction, navigating through the virtual presentation in a first corresponding direction; and in accordance with a determination that the respective direction is a second direction, different from the first direction, navigating through the virtual presentation in a second corresponding direction, different from the first corresponding directions.

16. The method of claim 15, wherein the first input is directed to a speaker notes user interface that is displayed concurrently with the virtual presentation in the respective virtual environment.

17. The method of claim 15, wherein the first input is directed to the virtual presentation in the respective virtual environment.

18. An electronic device that is in communication with a display generation component and one or more input devices, the electronic device comprising:

one or more processors;

memory; and one or more programs, wherein the one or more programs are stored in the memory and configured to be executed by the one or more processors, the one or more programs including instructions for:

while displaying, via the display generation component, a virtual presentation associated with a presentation application in a first three-dimensional environment, wherein the first three-dimensional environment includes a portion of a physical environment of a user of the electronic device and the virtual presentation is presented in a first mode of the presentation application, receiving, via the one or more input devices, a first input corresponding to a request to display the virtual presentation in a second mode of the presentation application, different from the first mode of the presentation application; and in response to receiving the first input:

initiating a process to display the virtual presentation in a respective virtual environment, different from the first three-dimensional environment, wherein while displaying the virtual presentation in the respective virtual environment, the respective virtual environment replaces the first three-dimensional environment such that the portion of the physical environment of the user is not visible via the display generation component.

19. A non-transitory computer readable storage medium storing one or more programs, the one or more programs comprising instructions, which when executed by one or more processors of a computer system that is in communication with one or more display generation components and one or more input devices, cause the computer system to perform a method comprising:

while displaying, via the display generation component, a virtual presentation associated with a presentation application in a first three-dimensional environment, wherein the first three-dimensional environment includes a portion of a physical environment of a user of the computer system and the virtual presentation is presented in a first mode of the presentation application, receiving, via the one or more input devices, a first input corresponding to a request to display the virtual presentation in a second mode of the presentation application, different from the first mode of the presentation application; and in response to receiving the first input:

initiating a process to display the virtual presentation in a respective virtual environment, different from the first three-dimensional environment, wherein while displaying the virtual presentation in the respective virtual environment, the respective virtual environment replaces the first three-dimensional environment such that the portion of the physical environment of the user is not visible via the display generation component.

* * * * *